(12) United States Patent
Huff

(10) Patent No.: US 11,739,733 B2
(45) Date of Patent: Aug. 29, 2023

(54) DOWN-WIND HORIZONTAL AXIS TURBINE APPARATUS AND METHODS FOR MAKING AND USING SAME

(71) Applicant: WCH ENGINEERING, Houston, TX (US)

(72) Inventor: William C. Huff, Houston, TX (US)

(73) Assignee: WCH Engineering, Houston, TX (US)

( * ) Notice: Subject to any disclaimer, the term of this patent is extended or adjusted under 35 U.S.C. 154(b) by 0 days.

(21) Appl. No.: 17/845,316

(22) Filed: Jun. 21, 2022

(65) Prior Publication Data

US 2023/0003197 A1    Jan. 5, 2023

Related U.S. Application Data

(60) Provisional application No. 63/213,897, filed on Jun. 23, 2021.

(51) Int. Cl.
| | | |
|---|---|---|
| *F03D 15/00* | (2016.01) | |
| *F03D 7/02* | (2006.01) | |
| *F03D 80/80* | (2016.01) | |
| *F03D 9/25* | (2016.01) | |
| *F03D 1/06* | (2006.01) | |

(52) U.S. Cl.
CPC .......... *F03D 15/00* (2016.05); *F03D 1/0666* (2013.01); *F03D 7/0204* (2013.01); *F03D 9/255* (2017.02); *F03D 80/88* (2016.05); *F05B 2260/4031* (2013.01)

(58) Field of Classification Search
CPC ... F03D 1/04; F03D 1/06; F03D 1/065; F03D 1/0666; F03D 3/002; F03D 7/0204; F03D 9/255; F03D 15/00; F03D 80/88; F05B 2260/4031; F05B 2240/2213
See application file for complete search history.

(56) References Cited

U.S. PATENT DOCUMENTS

| | | | |
|---|---|---|---|
| 1,329,299 A | 1/1920 | Foster | |
| 3,942,026 A | 3/1976 | Carter | |
| 7,066,709 B2 | 6/2006 | Kim et al. | |
| 7,448,337 B1 * | 11/2008 | King | F03D 1/0633 |
| | | | 416/132 B |
| 8,134,251 B2 * | 3/2012 | Barber | F03D 13/25 |
| | | | 290/55 |
| 8,328,515 B2 | 12/2012 | Dawoud et al. | |
| 8,482,147 B2 | 7/2013 | Moser et al. | |
| 8,517,669 B2 | 8/2013 | Dotts, III | |
| 8,836,158 B2 | 9/2014 | Cho et al. | |
| 8,922,047 B2 * | 12/2014 | Yoon | F03D 15/00 |
| | | | 290/55 |

(Continued)

*Primary Examiner* — Courtney D Heinle
*Assistant Examiner* — Sang K Kim
(74) *Attorney, Agent, or Firm* — Robert W. Strozier

(57) ABSTRACT

New down-wind horizontal axis turbine (DWHAT) systems or apparatus and methods for making and using same, wherein the DWHAT systems or apparatus include a base structure, a tower assembly or a derrick assembly anchored to the base structure, a drive assembly, a sail assembly, and a generator assembly, wherein the sails of the sail assembly are configured to catch wind downwind of the apparatuses or systems and wherein the drive assembly converts horizontal rotation of the horizontal shaft into vertical rotation of the vertical shaft that turns the generator generating electrical power that is transmitted to a power grid.

20 Claims, 40 Drawing Sheets

(56) References Cited

U.S. PATENT DOCUMENTS

| | | | |
|---|---|---|---|
| 10,337,494 B2 * | 7/2019 | Agtuca | F03D 7/0236 |
| 2010/0303623 A1 * | 12/2010 | Dawoud | F03D 7/0236 |
| | | | 290/55 |
| 2011/0006541 A1 | 1/2011 | Frederiksen | |
| 2013/0016896 A1 | 7/2013 | Dong et al. | |
| 2015/0011805 A1 | 4/2015 | Steinke | |
| 2017/0024811 A1 | 8/2017 | Ivers | |
| 2017/0032834 A1 | 11/2017 | Newell | |
| 2021/0004800 A1 | 2/2021 | Ramirez et al. | |

* cited by examiner

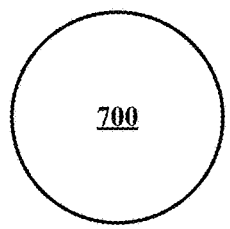
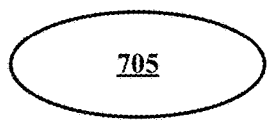
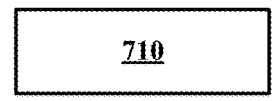
FIG. 7A  FIG. 7B  FIG. 7C
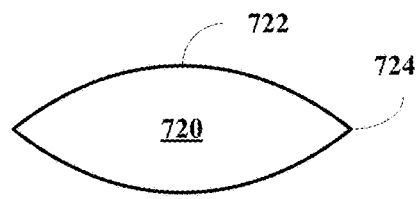
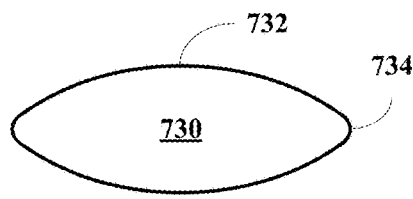
FIG. 7D  FIG. 7E
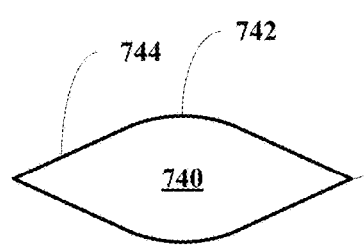
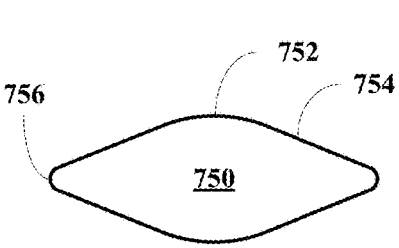
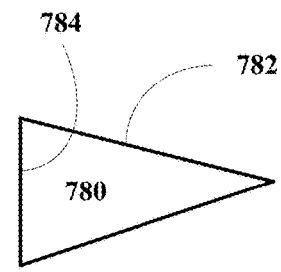
FIG. 7F  FIG. 7G  FIG. 7J
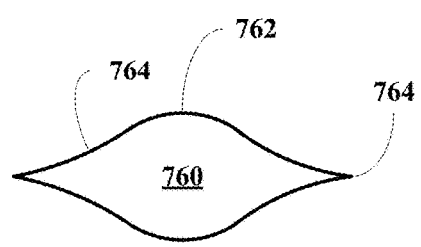
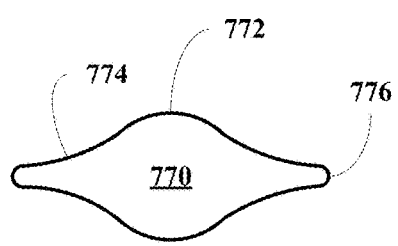
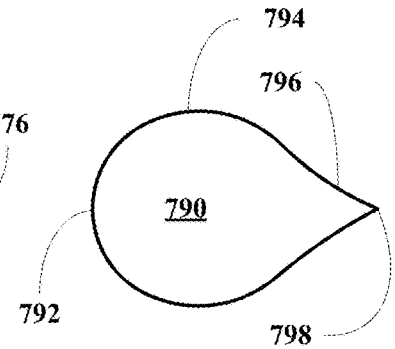
FIG. 7H  FIG. 7I  FIG. 7K

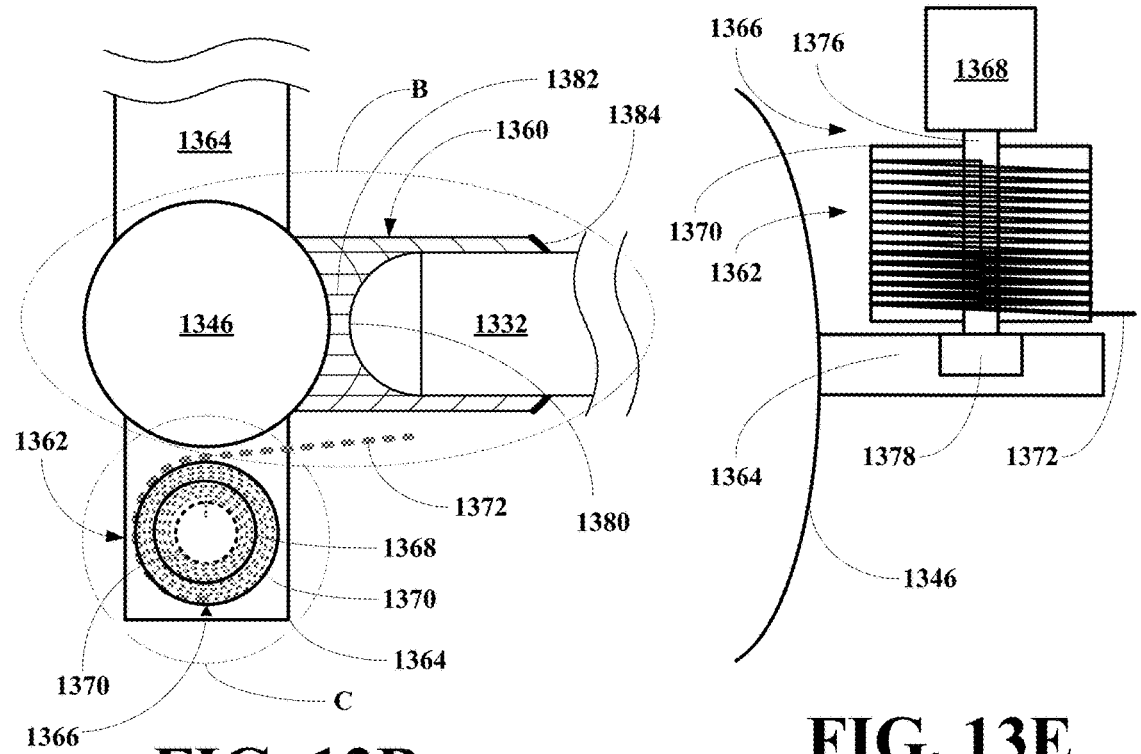
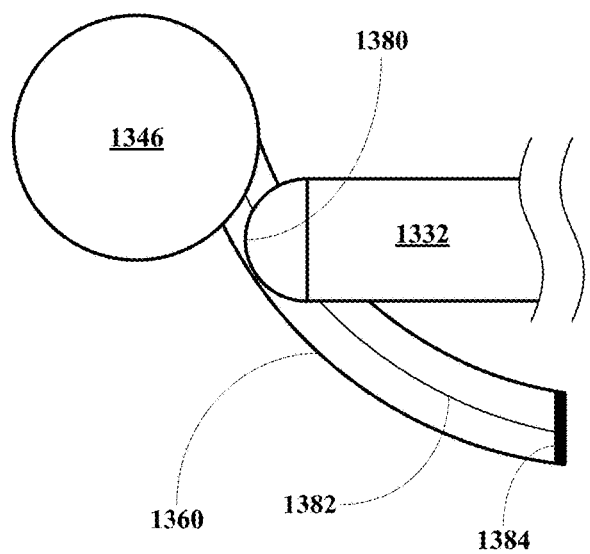
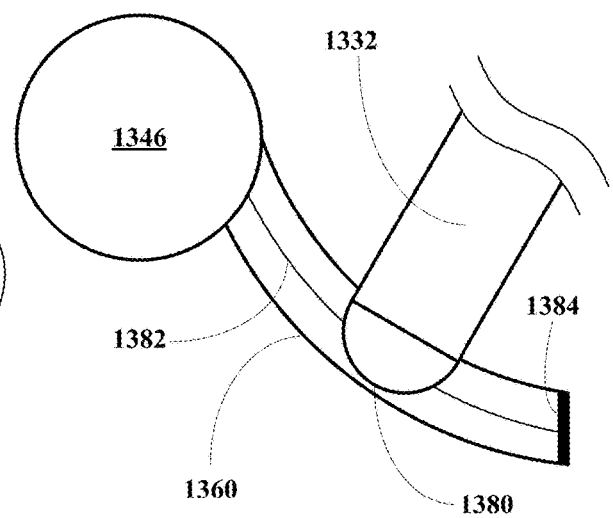
FIG. 13B
FIG. 13E
FIG. 13C
FIG. 13D

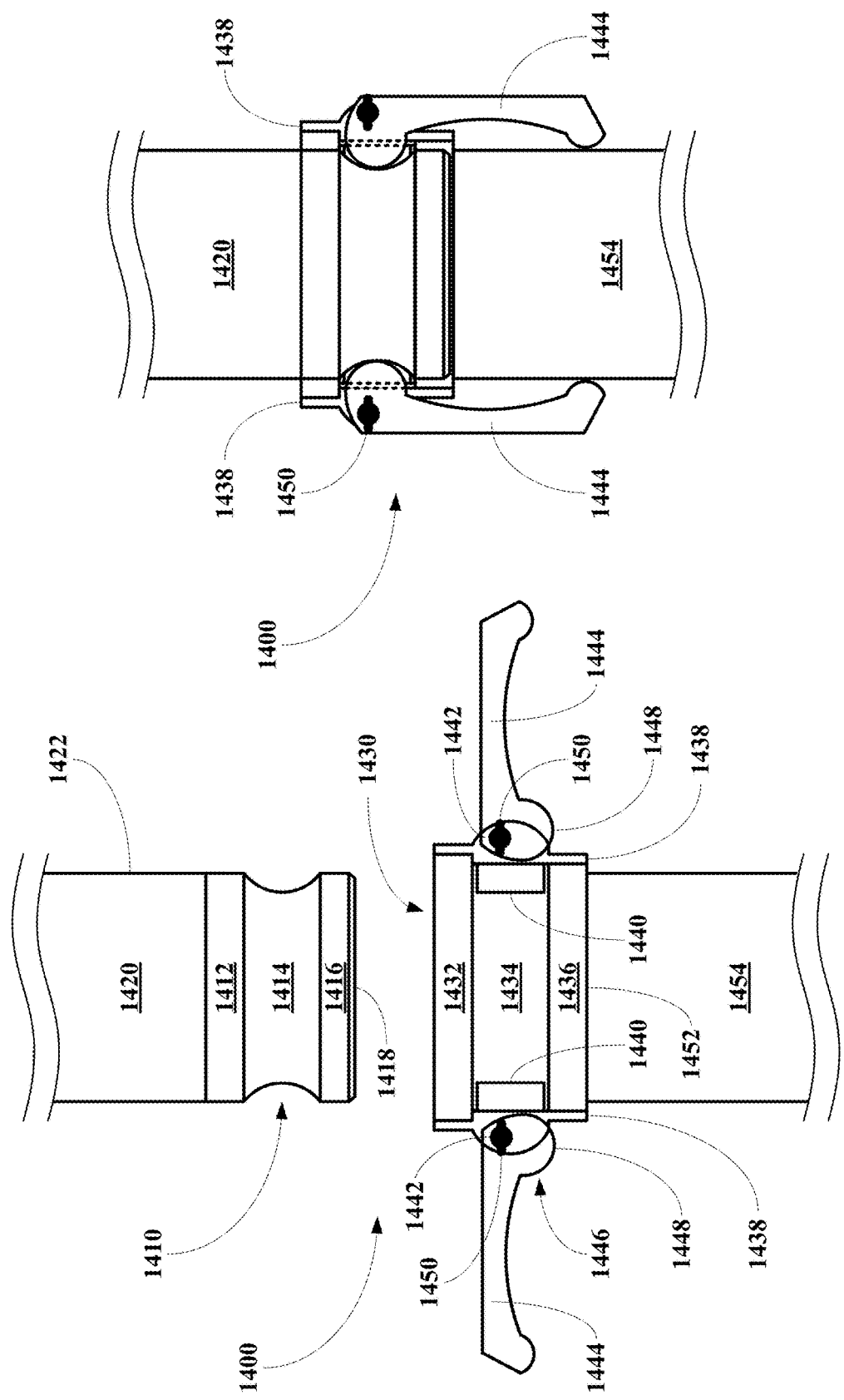

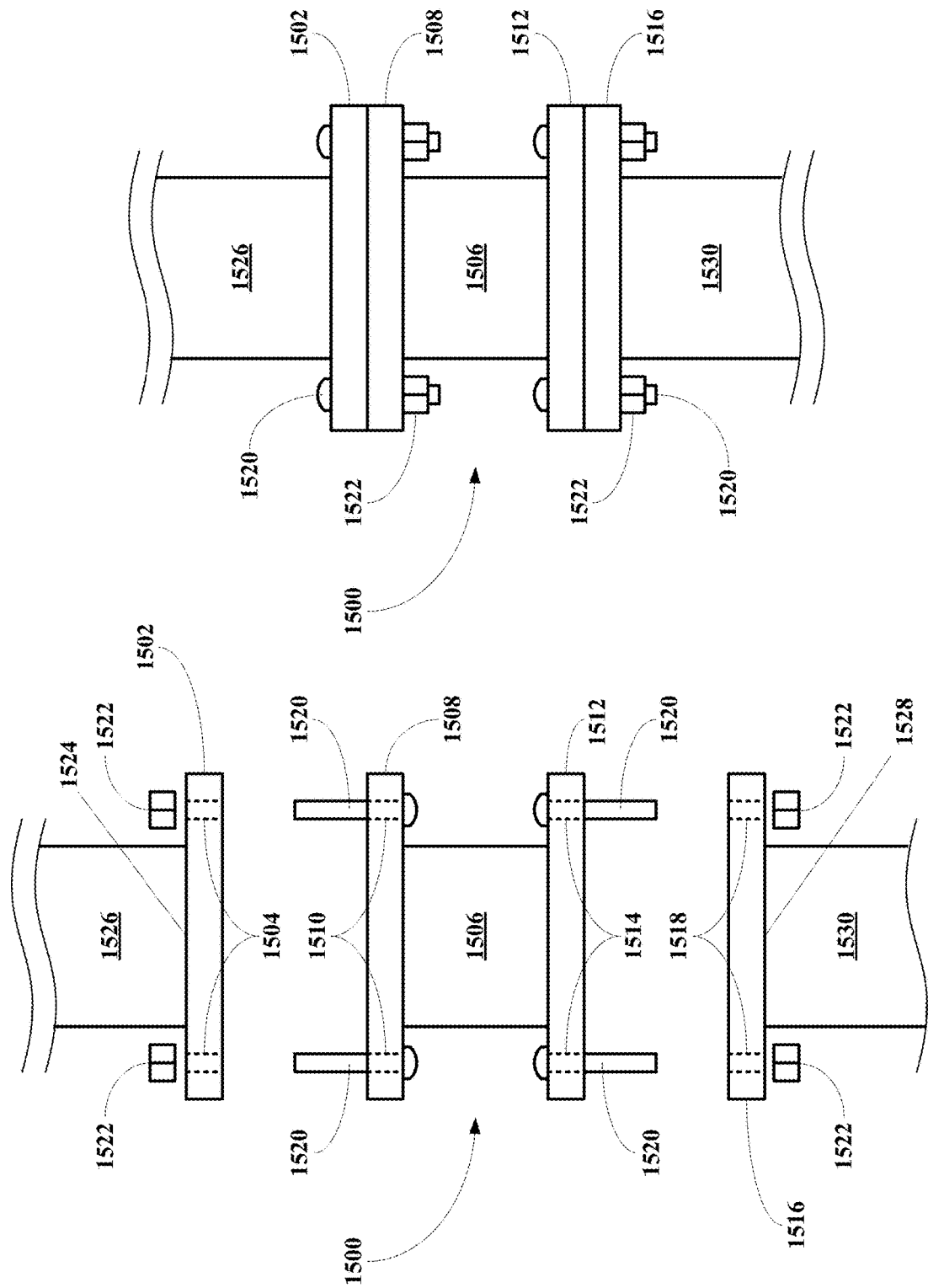

DOWN-WIND HORIZONTAL AXIS TURBINE APPARATUS AND METHODS FOR MAKING AND USING SAME

RELATED APPLICATIONS

This application claims the benefit of and priority to U.S. Provisional Patent Application Ser. No. 63/213,897 filed Jun. 23, 2021 (23 Jun. 2021).

BACKGROUND OF THE DISCLOSURE

1. Field of the Disclosure

Embodiments of the present disclosure relate to a new design for down-wind horizontal axis turbine (DWHAT) systems or apparatus and methods for making and using same.

In particular, embodiments of the present disclosure relate to a new design for down-wind horizontal axis turbine (DWHAT) systems or apparatus and methods for making and using same, wherein the DWHAT systems or apparatus include a base assembly, a tower assembly or a derrick assembly anchored to the base assembly, a drive assembly, a sail assembly, and a generator assembly, wherein the sails of the sail assembly are configured to catch wind downwind of the apparatuses or systems and wherein the drive assembly converts horizontal rotation of the horizontal shaft into vertical rotation of the vertical shaft that turns the generator generating electrical power that is transmitted to a power grid.

2. Description of the Related Art

Current wind turbine technology focuses almost exclusively on so called up-wind horizontal axis turbines ("UWHAT"). Since the 1970's, for a variety of Technical, Supply Chain and other economic reasons, UWHATs have been the dominant design for wind-driven power utilization. UWHATs tend to be large, ungainly, difficult to maintain/operate, expensive, inefficient, noisy and visually disturbing.

While numerous wind generation devices have been invented, there is still a need in the art for improved systems and methods of converting wind energy into electrical energy that are more cost effective, more aesthetically pleasing, and have smaller foot and air prints.

SUMMARY OF THE DISCLOSURE

Tower Embodiments

Embodiments of this disclosure provide down-wind horizontal axis turbine (DWHAT) systems or apparatuses including: a base assembly, a tower assembly, a drive assembly, a sail assembly, and a generator assembly. The base assembly includes one or more base members or slabs. The tower assembly includes a vertical assembly, a bottom member attached to or affixed to one of the base members or slabs, and a top support or platform member. The cylindrical assembly may include a single vertical member or an inner vertical member and outer vertical member. The drive assembly includes a gear box disposed on a top support/platform member of the vertical assembly, a vertical drive shaft connected at its proximal end to the generator assembly and connected to the gear box at it distal end, and a horizontal drive shaft passing through the gear box and having a sail assembly disposed on its proximal end or downwind end and a counterbalance member disposed on its distal end or upwind end. In certain embodiments, the counterbalance member may be replaced by a small UWHAT windmill to increase torque on the drive shaft to supplement the torque added by the DWHAT sails. The drive assembly comprise an indirect drive assembly or a direct drive assembly. The vertical drive shaft is disposed in an interior of the single vertical member or the inner vertical member of the vertical assembly. The vertical drive shaft is rotationally centered in the interior by a plurality of bearing. The gear box may also include a braking unit having a disc brake pad mounted on the horizontal drive shaft, a caliper assembly adapted to engage the disc brake pad, and a brake control unit for controlling the calipers. The gear box may comprise an indirect drive gear assembly or a direct drive assembly. The indirect drive assembly includes a horizontal gear mounted on the horizontal drive shaft, a second horizontal gear mounted on a first transfer drive shaft, and a belt or chain drive member attached to the two horizontal gears. A gear ratio of the gears is between about 3:1 to 7:1, or between 4:1 and 6:1, or 5:1, so that a rotation rate of the second horizontal gear is between 3 and 7 times a rotation rate of the first horizontal gear. The indirect drive assembly also includes a 90° gear assembly connected to the first transfer drive shaft and having a second transfer drive shaft coupled to the vertical drive shaft directly or via universal joint. The 90° or right angle gear assembly includes a horizontal gear and a vertical gear and converts horizontal rotation of the first transfer drive shaft into vertical rotation of the second transfer shaft transferred to the vertical drive shaft for turning the generators. A gear ratio of the horizontal and vertical gears of the 90° gear assembly is 1:1 or about 1:1. The direct drive assembly includes a horizontal gear mounted on the horizontal drive shaft and a vertical gear mounted directly on the vertical drive shaft or via a transfer drive shaft and a universal joint and has a gear ratio between about 3:1 to 7:1, or between 4:1 and 6:1, or 5:1, so that a rotation rate of the second horizontal gear is between 3 and 7 times a rotation rate of the first horizontal gear. The gear box may also include a clutch assembly to disengage the horizontal drive shaft at or in the gear box so that the hub may rotate free of the gears and the vertical drive shaft. The sail assembly includes a sail mounting hub. The sail mounting hub includes a plurality of sail swivel connectors and a plurality of sails including hub connectors and rigging connectors, wherein the hub connectors designed to detachably couple to the sail swivel connectors so that the sails may swivel about the swivel connectors during sheeting operations. The sail mounting hub also includes a sail support ring assembly including a sail support ring, a plurality of radial support members, and radial support member connectors. The sail assembly also includes a sheeting assembly including a sheeting drive member mounted on the horizontal drive shaft and rigging members attached to the sheeting drive member at their proximal ends and attached to the sail rigging connectors at their distal ends. The sheeting assembly adjusts the sheeting of the sails, which are configured to catch the wind downwind of the apparatus, and wherein the gear box converts horizontal rotation of the horizontal shaft into vertical rotation of the vertical shaft that turns the generator generating electrical power. The generator assembly includes one or more generators for generating electrical power that is transmitted to a power grid. The one or more generators are coupled to the distal end of vertical drive shaft for converting rotational energy of the vertical drive shaft into electrical energy. The generator assembly may include a generator gear box for changing the rotation rate of the vertical shaft to conform to the rotation rate requirements of the one or more generators.

Derrick Embodiments

Embodiments of this disclosure provide a down-wind horizontal axis turbine (DWHAT) systems or apparatuses including: a base structure, a derrick assembly anchored to the base structure, a drive assembly, a sail assembly, and a generator assembly anchored to the base structure. The base structure includes one or more base members. The derrick assembly includes at a cylinder assembly having a bottom member anchored to one of the base members and a top platform member, a leg attachment platform. The cylindrical assembly may include a single cylindrical member or an inner cylindrical member and outer cylindrical member. The derrick assembly also includes a plurality of legs having a bottom member anchored to one of the base members and a top support member anchored to the leg attachment platform. The drive assembly includes a gear box disposed on a top support member of the cylindrical member or the outer cylindrical member, a vertical drive shaft connected at its proximal end to the generator assembly and connected to the gear box at it distal end, and a horizontal drive shaft passing through the gear box and having a sail assembly disposed on its proximal end and a counterbalance member disposed on its distal end. In certain embodiments, the counterbalance member may be replaced by a small UWHAT windmill to increase torque on the drive shaft to supplement the torque added by the DWHAT sails. The drive assembly comprise an indirect drive assembly or a direct drive assembly. The vertical drive shaft is disposed in an interior of one or the cylindrical members or stalks or the inner cylindrical member or stalk and engages a plurality of bearing that rotationally center the vertical drive shaft in the interior of the cylindrical member or the inner cylindrical member or stalk. The gear box may also include a braking unit having a disc brake pad mounted on the horizontal drive shaft, a caliper assembly adapted to engage the disc brake pad, and a brake control unit for controlling the calipers. The gear box may comprise an indirect drive gear assembly or a direct drive assembly. The indirect drive assembly includes a horizontal gear mounted on the horizontal drive shaft, a second horizontal gear mounted on a first transfer drive shaft, and a belt or chain drive member attached to the two horizontal gears. A gear ratio of the gears is between about 3:1 to 7:1, or between 4:1 and 6:1, or 5:1, so that a rotation rate of the second horizontal gear is between 3 and 7 times a rotation rate of the first horizontal gear. The indirect drive assembly also includes a 90° gear assembly connected to the first transfer drive shaft and having a second transfer drive shaft coupled to the vertical drive shaft directly or via universal joint. The 90° gear assembly includes a horizontal gear and a vertical gear and converts horizontal rotation of the first transfer drive shaft into vertical rotation of the second transfer shaft transferred to the vertical drive shaft for turning the generators. A gear ratio of the horizontal and vertical gears of the 90° gear assembly is 1:1 or about 1:1. The direct drive assembly includes a horizontal gear mounted on the horizontal drive shaft and a vertical gear mounted directly on the vertical drive shaft or via a transfer drive shaft and a universal joint and has a gear ratio between about 3:1 to 7:1, or between 4:1 and 6:1, or 5:1, so that a rotation rate of the second horizontal gear is between 3 and 7 times a rotation rate of the first horizontal gear. The sail assembly includes a sail mounting hub. The sail mounting hub includes a plurality of sail swivel connectors and a plurality of sails including hub connectors and rigging connectors, wherein the hub connectors designed to detachably couple to the sail swivel connectors so that the sails may swivel about the swivel connectors during sheeting operations. The sail mounting hub also includes a sail support ring assembly including a sail support ring, a plurality of radial support members, and radial support member connectors. The sail assembly also includes a sheeting assembly including a sheeting drive member mounted on the horizontal drive shaft and rigging members attached to the sheeting drive member at their proximal ends and attached to the sail rigging connectors at their distal ends. The sheeting assembly adjusts the sheeting of the sails, which are configured to catch the wind downwind of the apparatus, and wherein the gear box converts horizontal rotation of the horizontal shaft into vertical rotation of the vertical shaft that turns the generator generating electrical power. The generator assembly includes one or more generators for generating electrical power that is transmitted to a power grid. The one or more generators are coupled to the distal end of vertical drive shaft for converting rotational energy of the vertical drive shaft into electrical energy. The generator assembly may include a generator gear box for changing the rotation rate of the vertical shaft to conform to the rotation rate requirements of the one or more generators.

Methods for Making and Using the Apparatuses and Systems

Embodiments of this disclosure provide methods for using the apparatuses or systems of this disclosure comprising installing one or more of the apparatuses or systems of this disclosure in an area for converting wind energy into electrical energy, installing a plurality of electrical conducting conduits between each apparatus or system to one or more power substations connected to a power grid, adjusting the sails to efficiently engage a wind, turning the horizontal drive shaft at a horizontal rotation rate, converting the horizontal rotation rate into a vertical rotation rate of a vertical drive shaft, coupling the vertical drive shaft of one or more generators, converting the vertical rotation rate of the vertical drive shaft into a rotation rate of the one or more generators, transmitting the generated electrical power to the one or more power substations, and distributing the collected electrical power into one or more power grids. In certain embodiments, the methods also include monitoring the generated power from each apparatus or system, adjusting the sheeting of the sails for optimal power generation, and monitoring the power collection and distribution of the generated electrical power from each apparatus or system. In other embodiments, the methods may include changing out the sails for advertisements, for event celebrations, for holiday, etc.

BRIEF DESCRIPTION OF THE DRAWINGS OF THE DISCLOSURE

The disclosure may be better understood with reference to the following detailed description together with the appended illustrative drawings in which like elements are numbered the same:

Figure 5A:
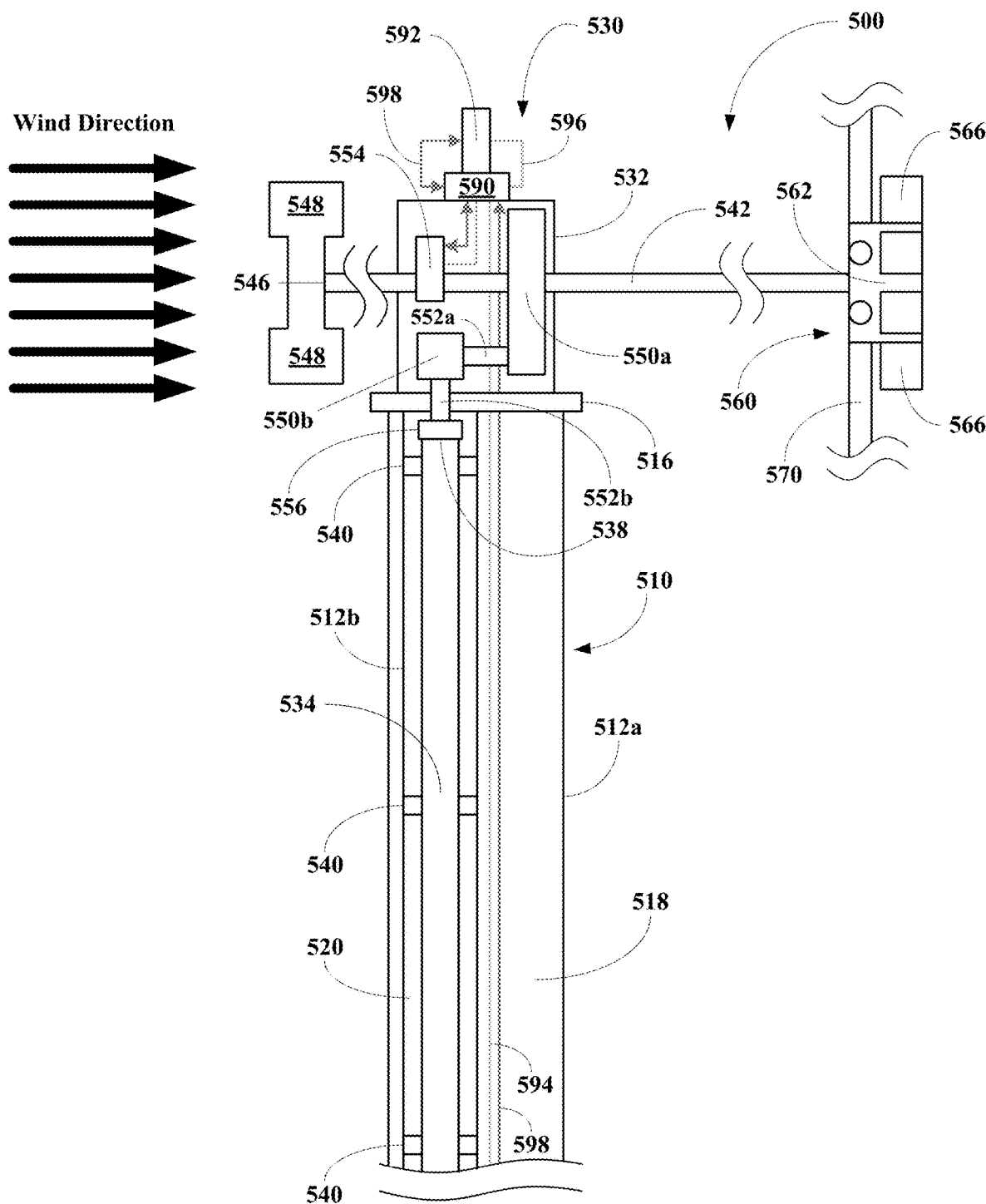
FIG. 5A depicts an embodiment DWHAT with an embodiment of an indirect drive assembly having a counterbalance weight.
Figure 5B:
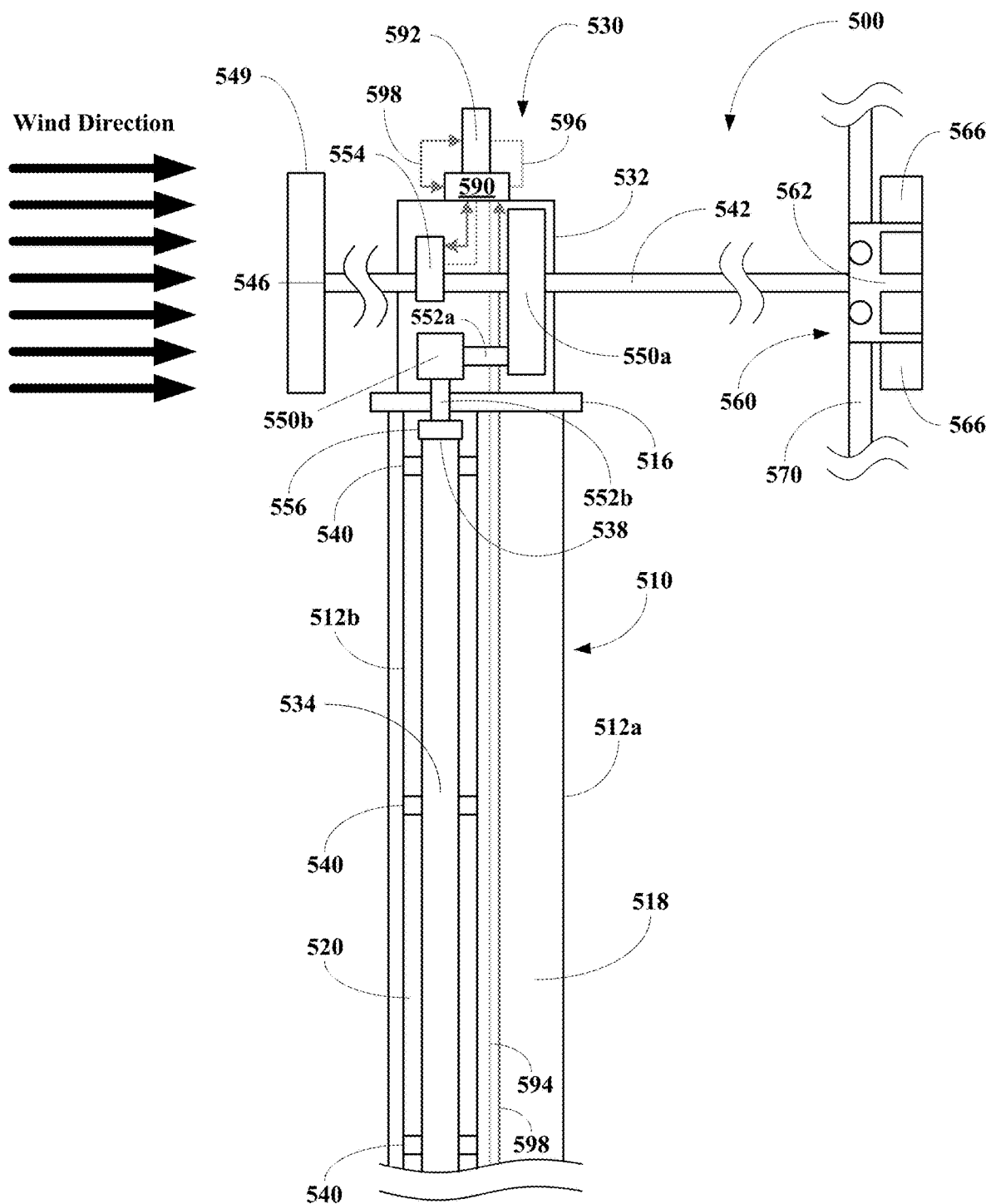

FIGS. 5B&C depicts another embodiment of an indirect drive embodiment having a small UWHAT wind turbine.

Figure 5C:
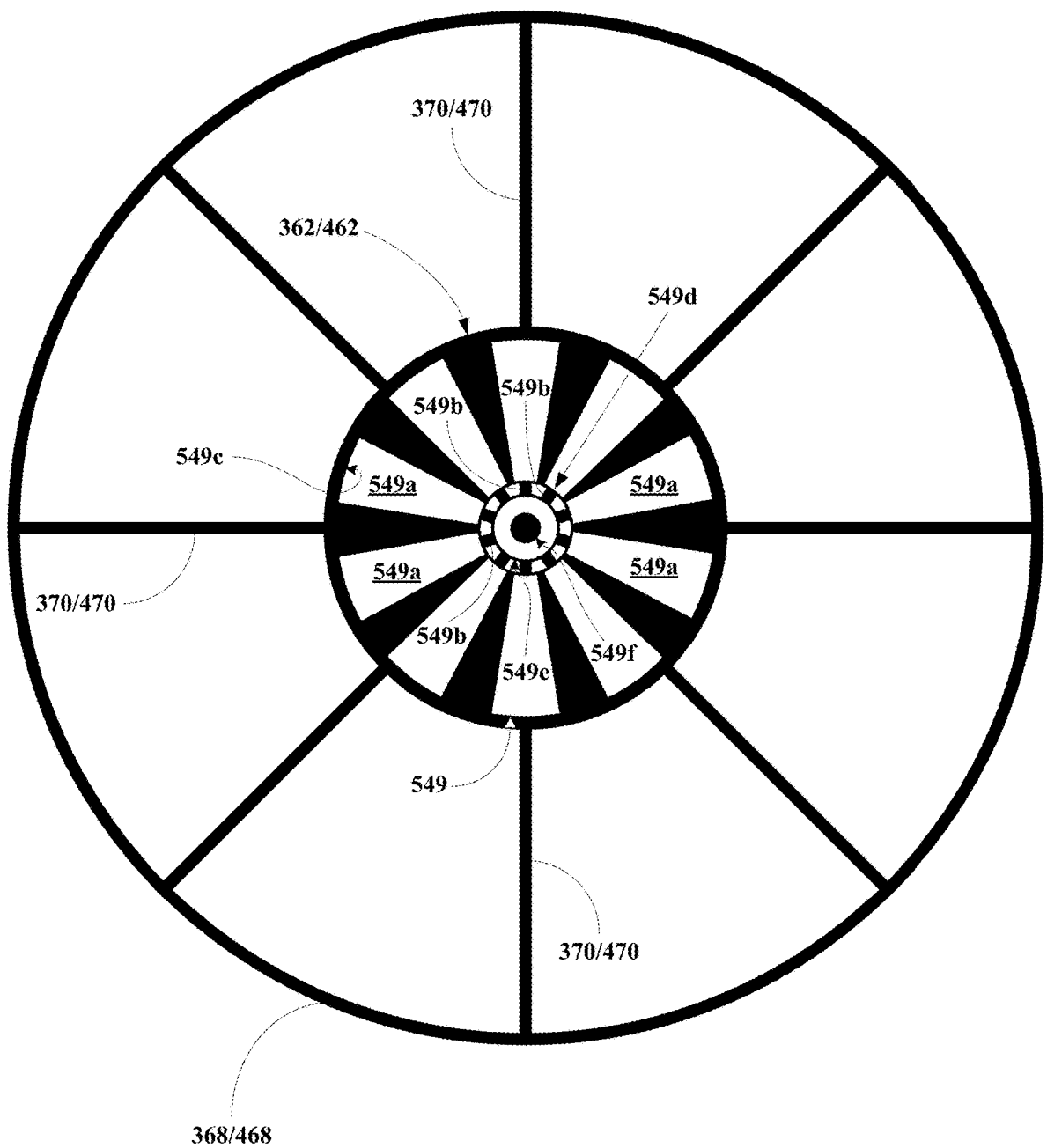
Figure 5D:
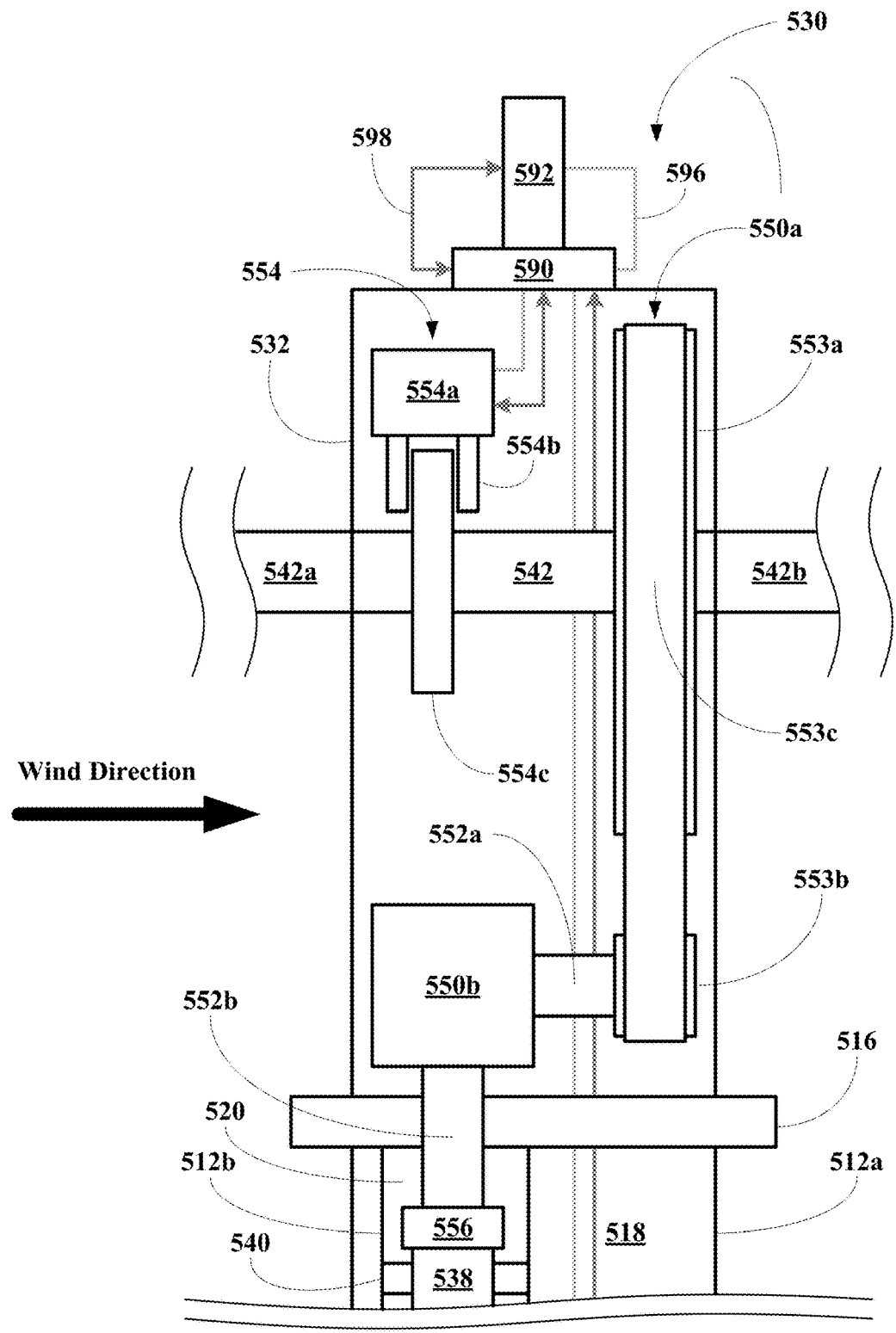

FIG. 5D depicts an embodiment of an indirect drive embodiment.

Figure 5E:
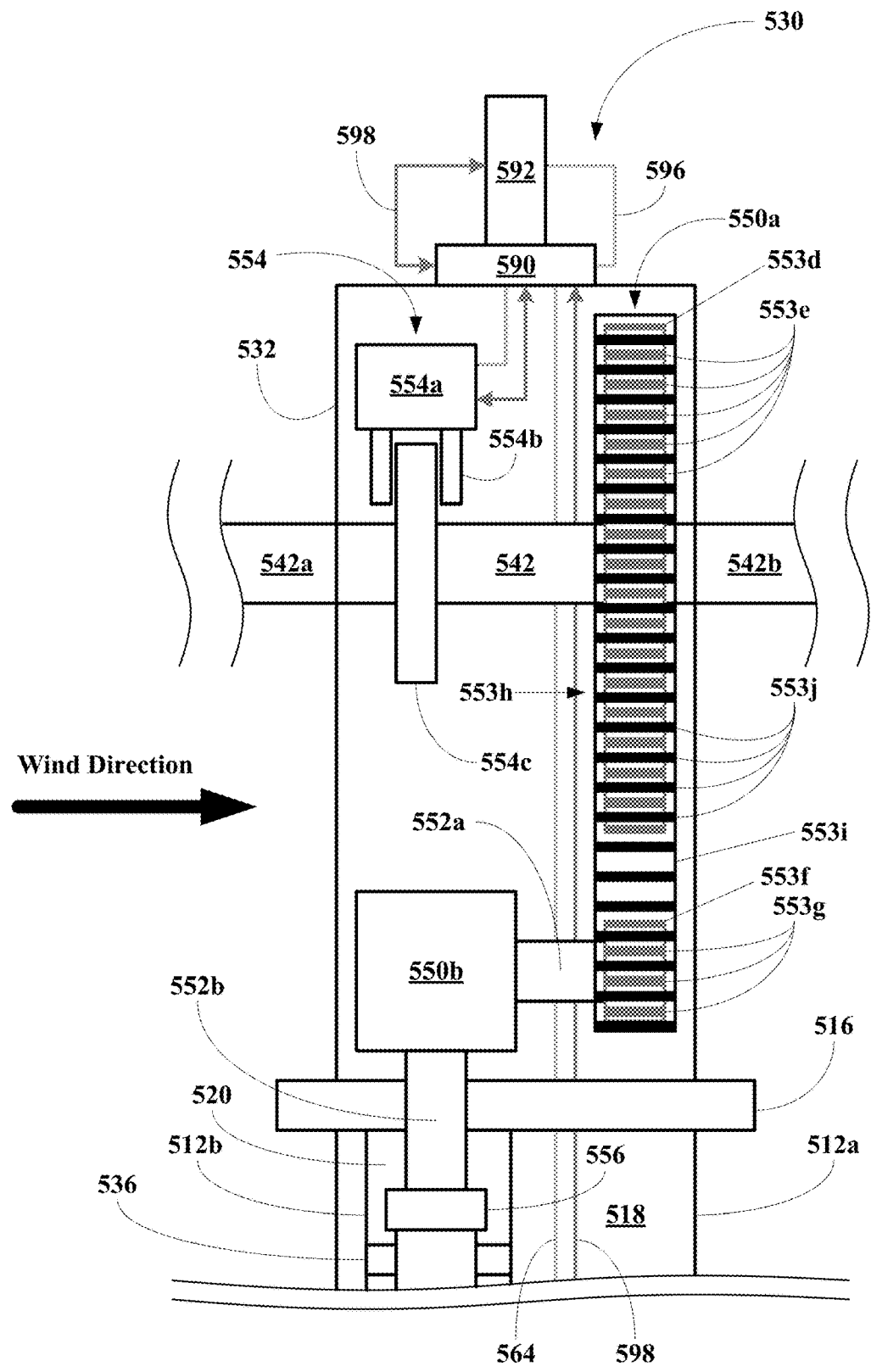

FIG. 5E depicts another embodiment of an indirect drive embodiment.

Figure 5F:
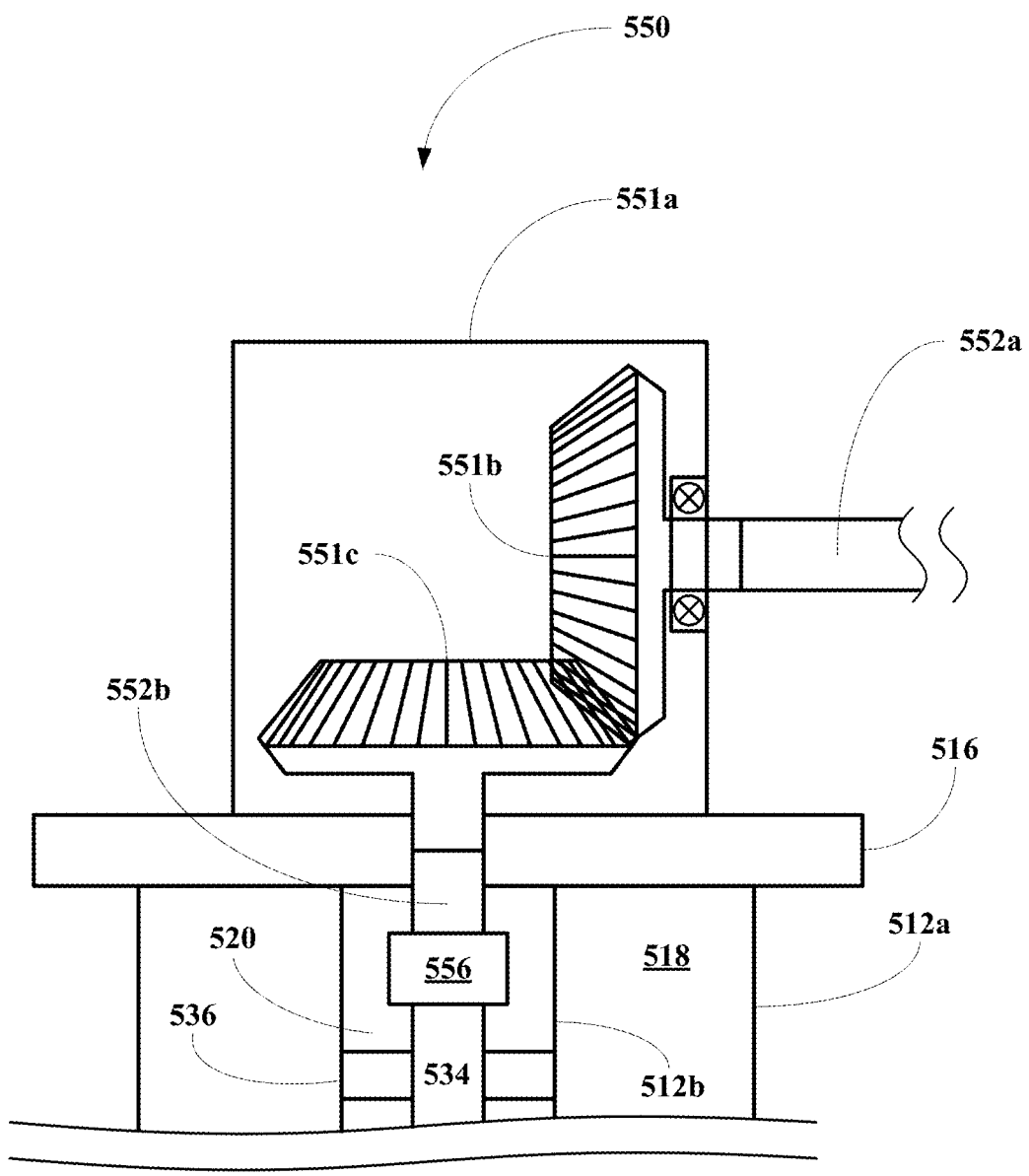

FIG. 5F depicts an embodiment of a 90° transfer box.

Figure 6A:
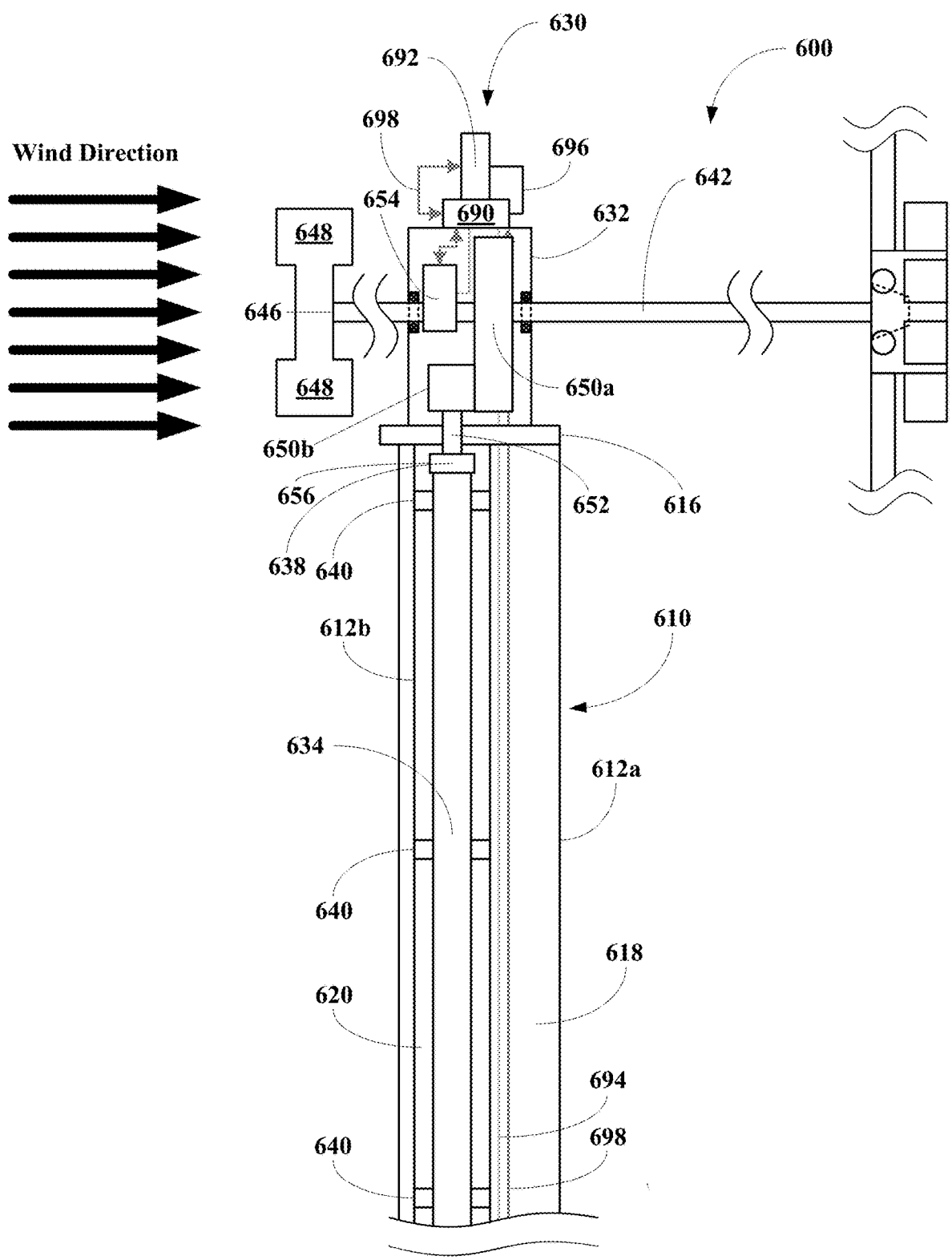

FIG. 6A depicts an embodiment DWHAT with an embodiment of an indirect drive assembly having a counterbalance weight.

Figure 6B:
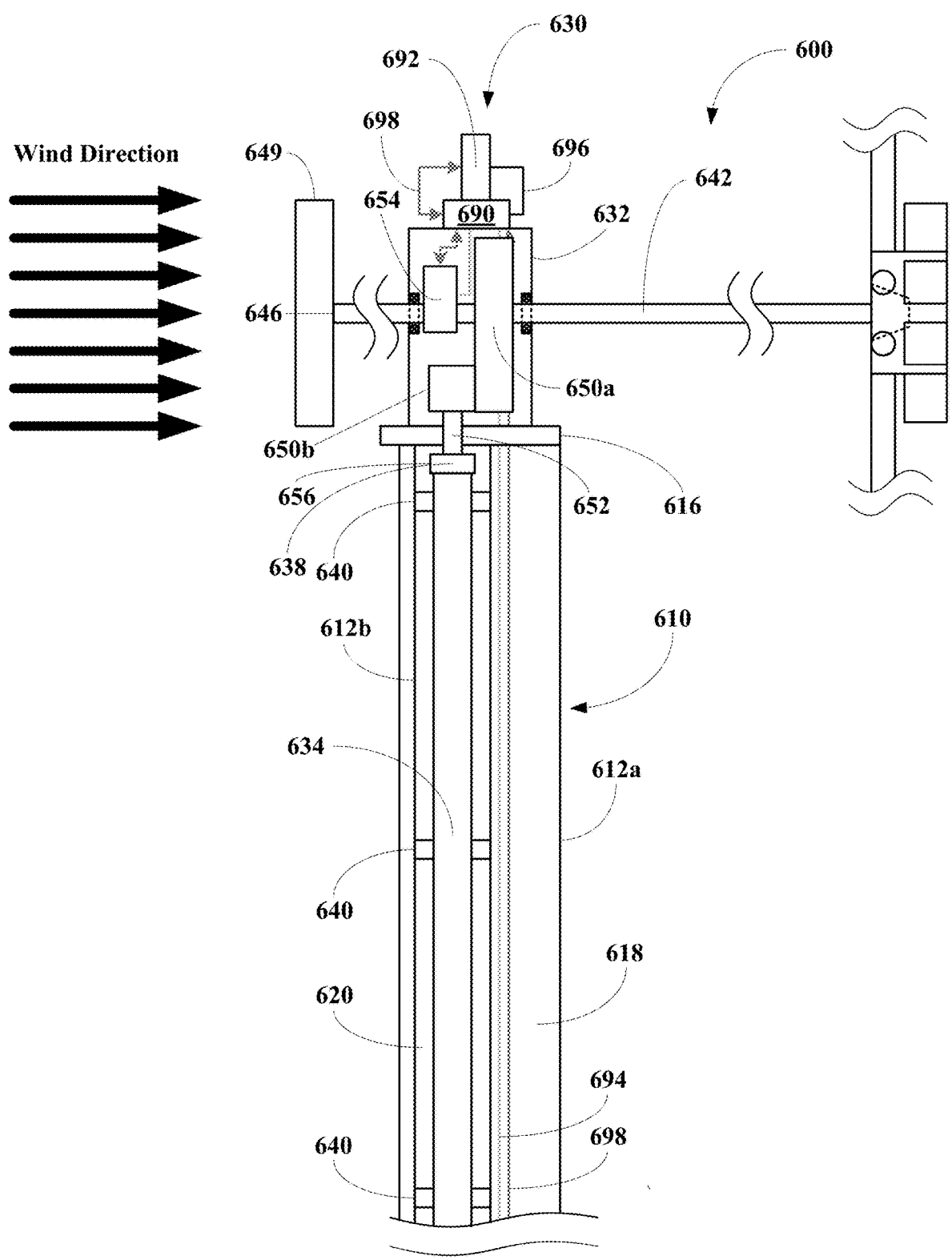
Figure 6C:
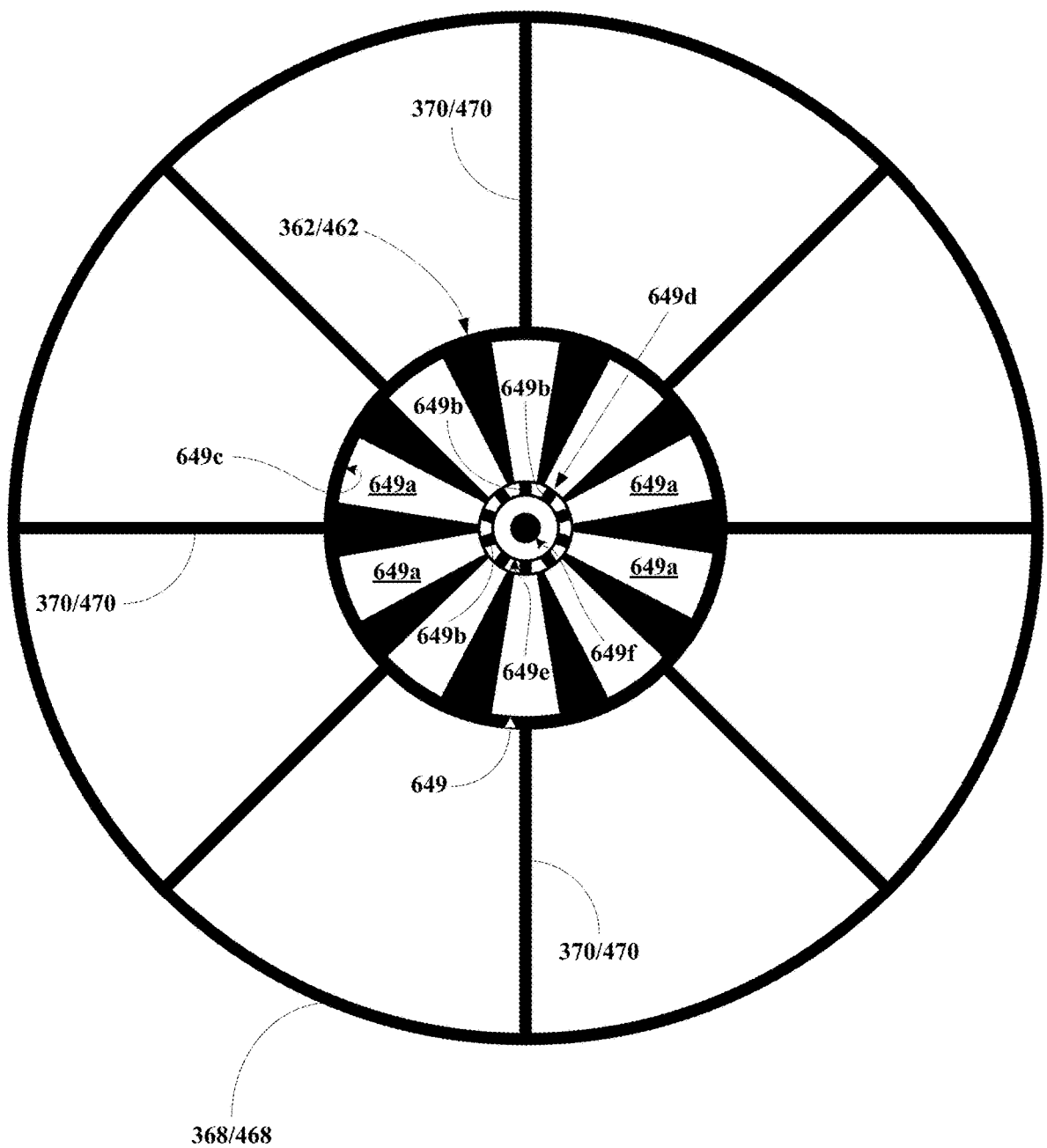

FIGS. 6B&C depicts another embodiment of an indirect drive embodiment having a small UWHAT wind turbine.

Figure 6D:
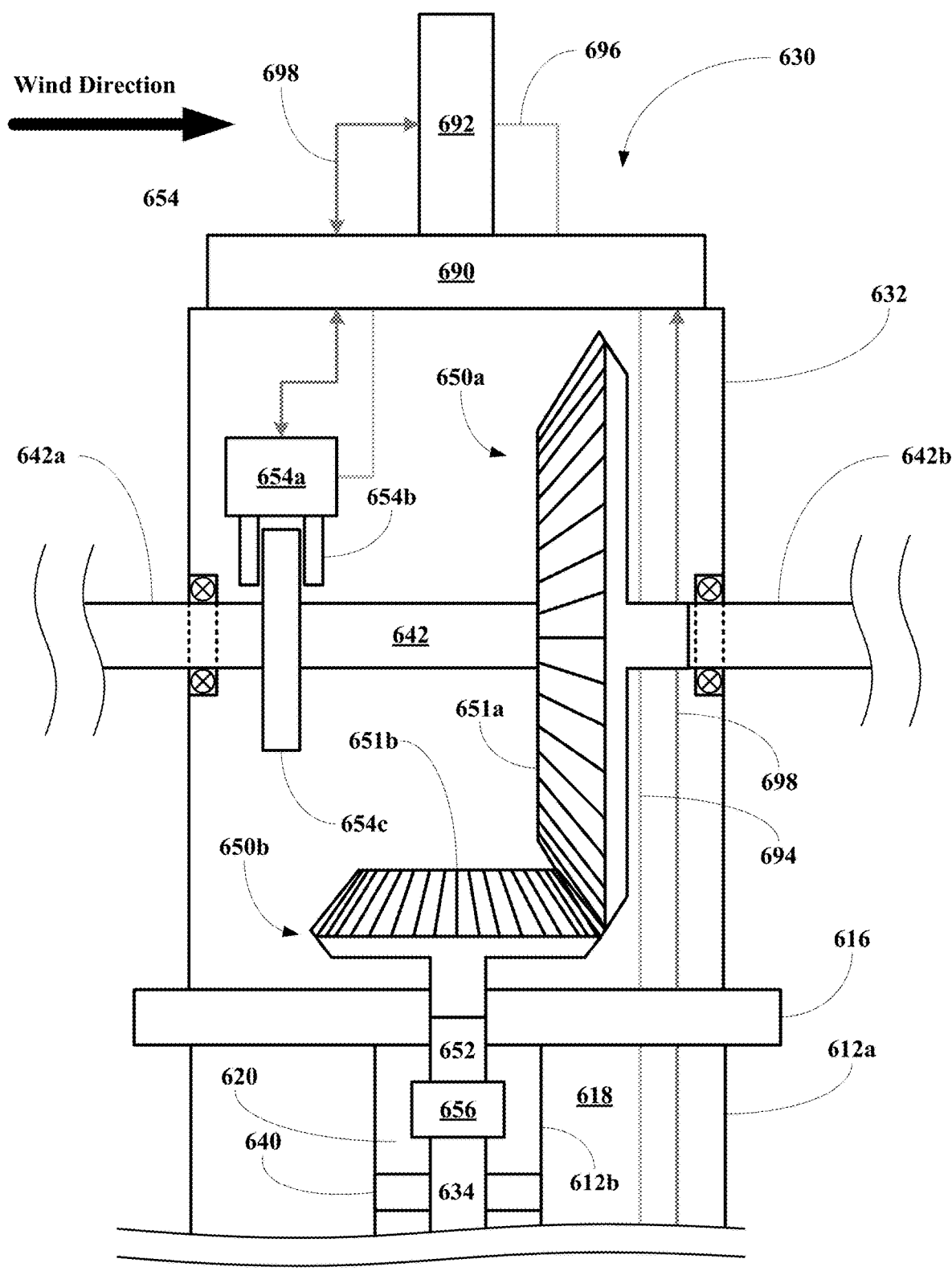

FIG. 6D depicts an embodiment of a direct drive embodiment.

FIGS. 7A-K depict vertical member shapes.

Figure 8A:
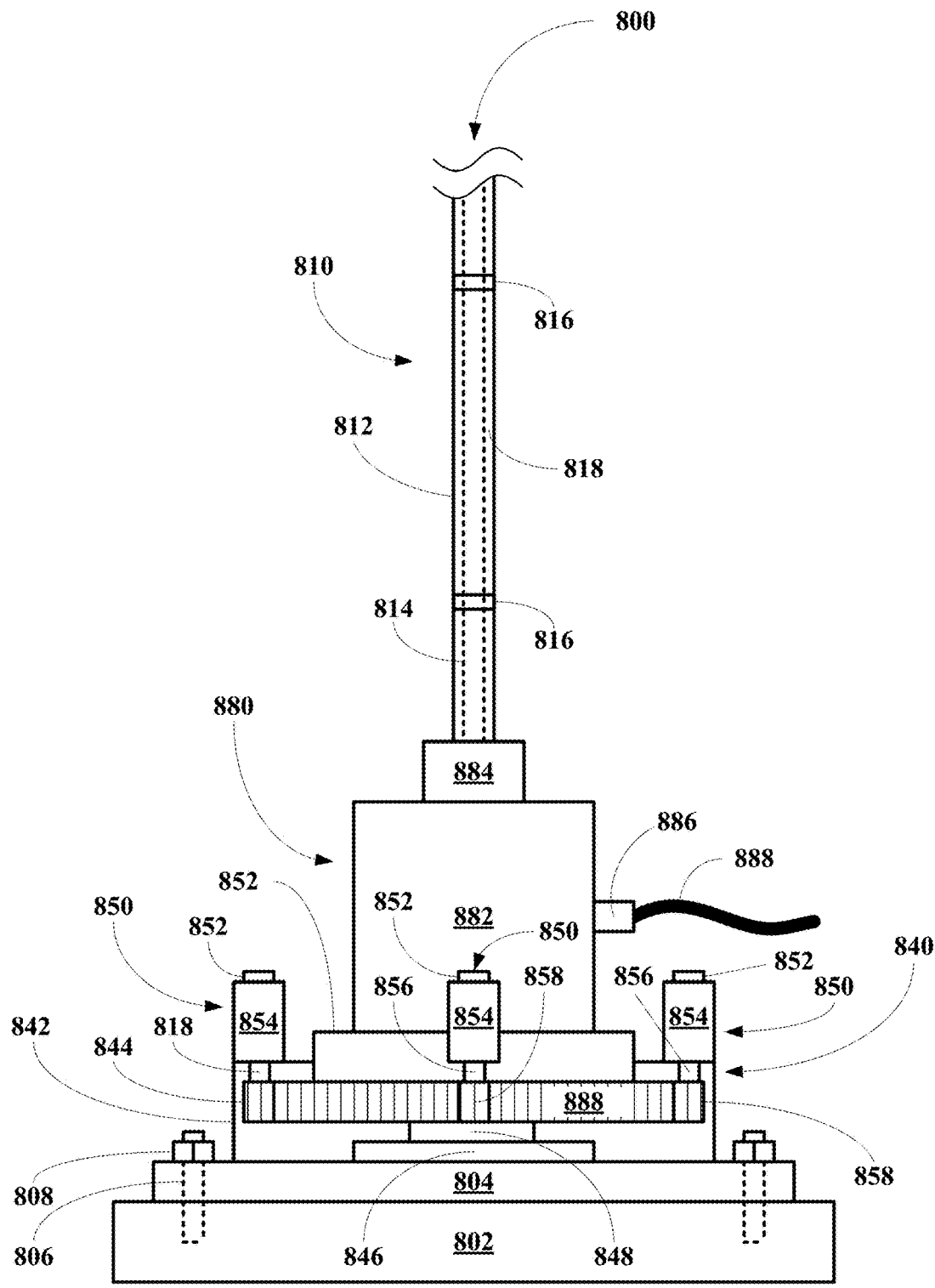

FIGS. 8A&B depict an embodiment of a bottom yaw assembly for the DWHAT apparatus of this disclosure.

Figure 9:
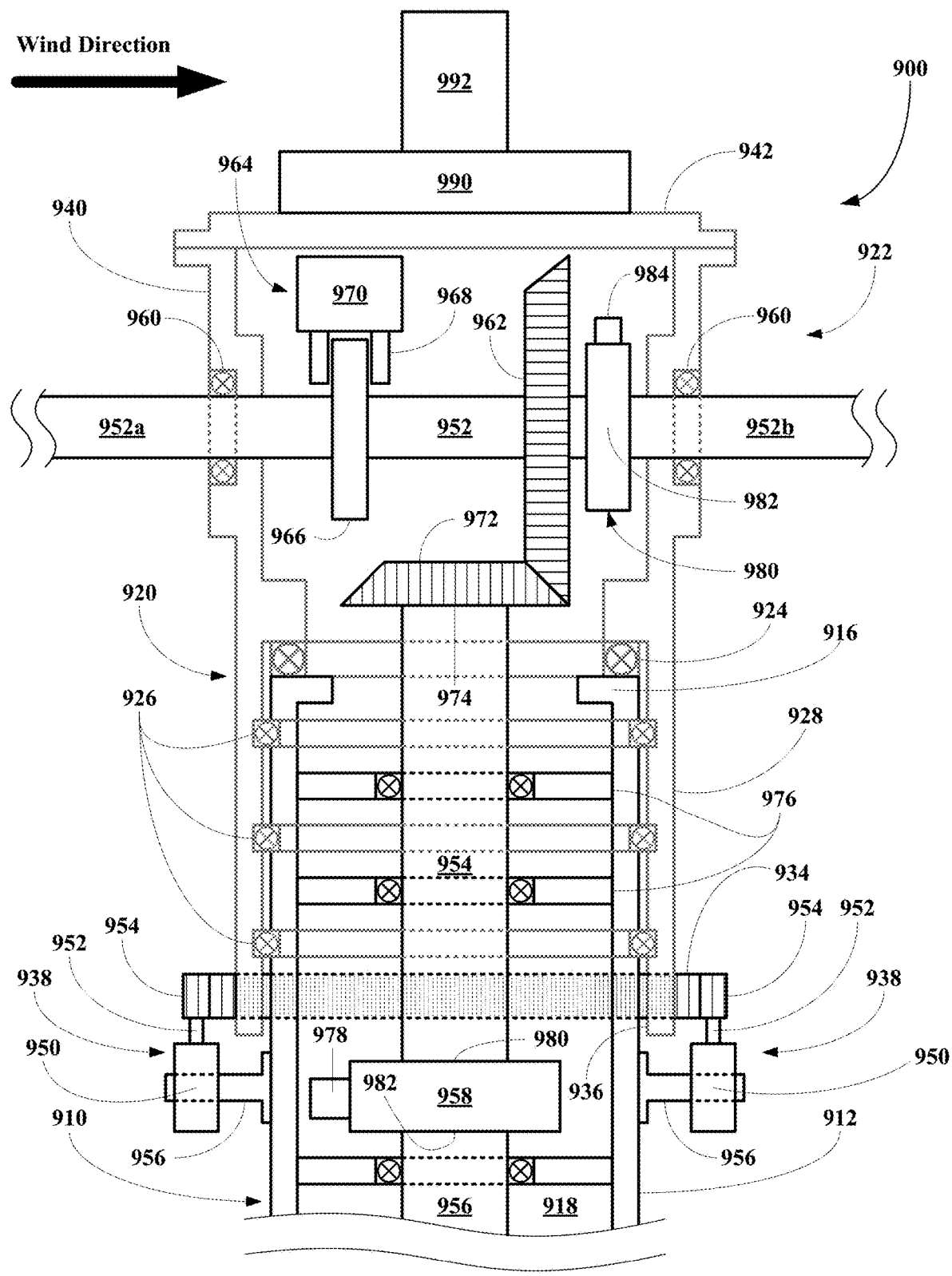

FIG. 9 depict another embodiment of a top yaw assembly for the DWHAT apparatus of this disclosure.

Figure 10:
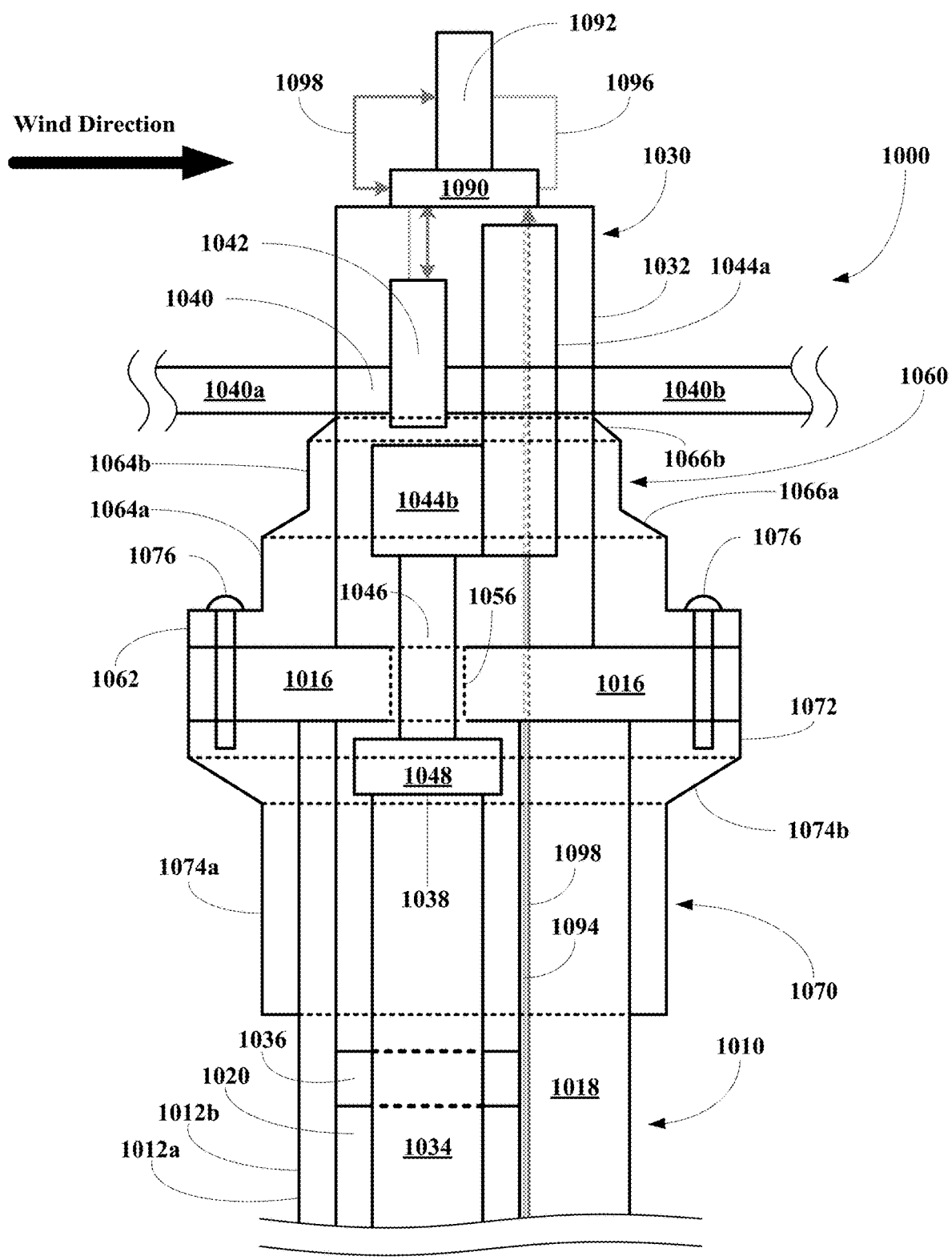

FIG. 10 depicts an embodiment of a pitch and roll stabilizer assembly for the DWHAT apparatus of this disclosure.

Figure 11A:
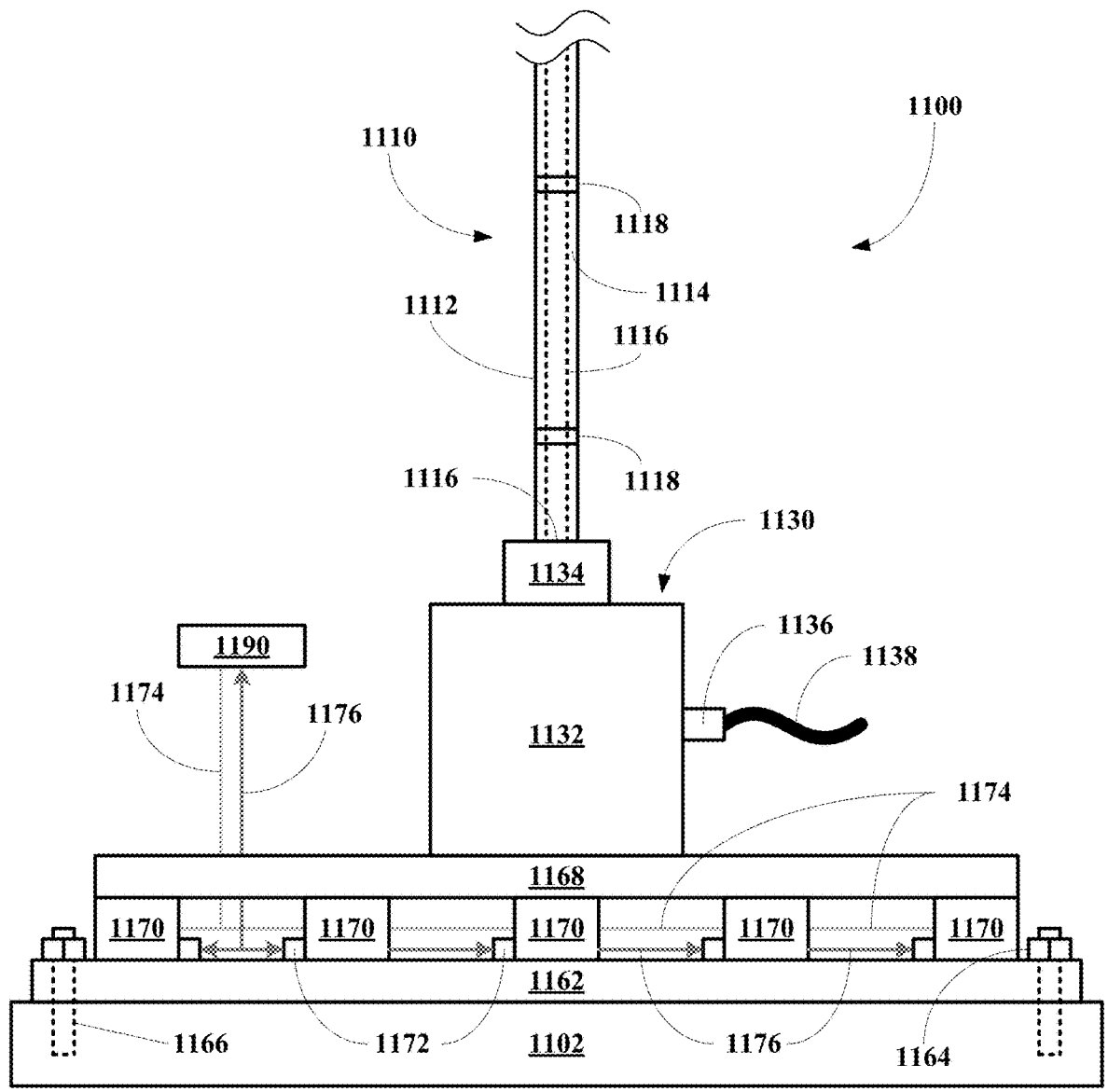

FIGS. 11A&B depict a raising and lowering assembly for a DWHAT apparatus of this disclosure.

Figure 12A:
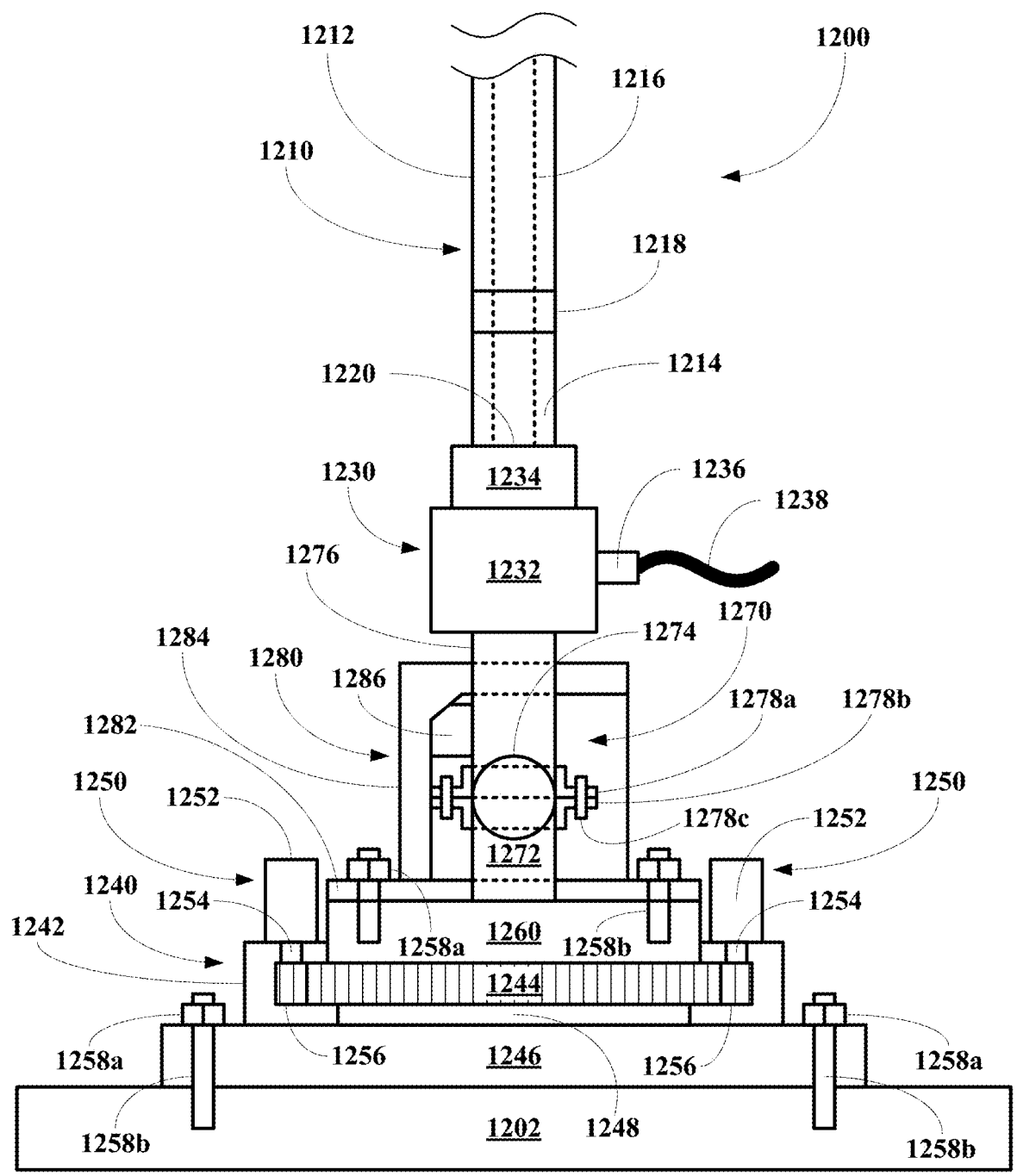
Figure 12B:
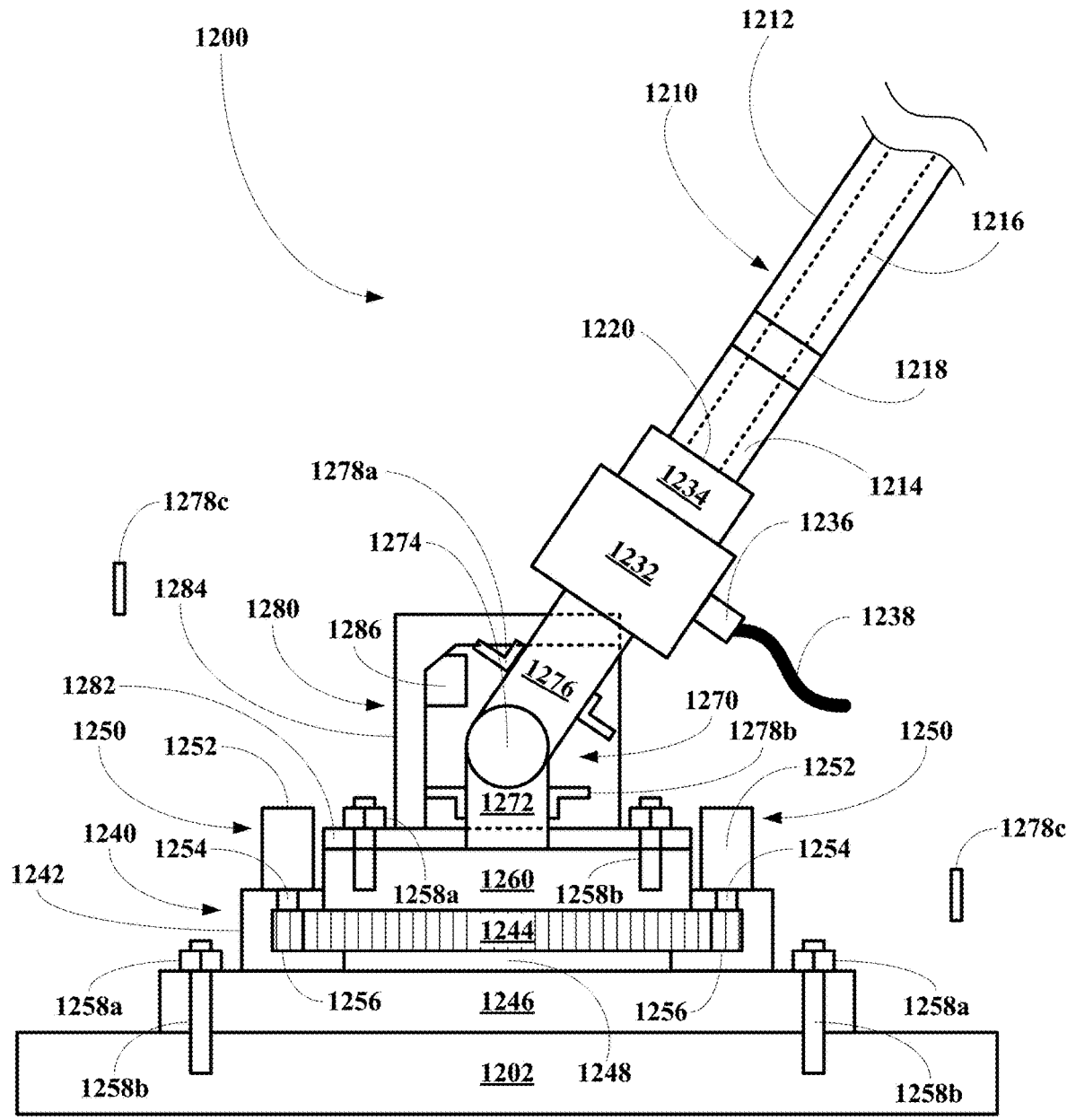
Figure 12C:
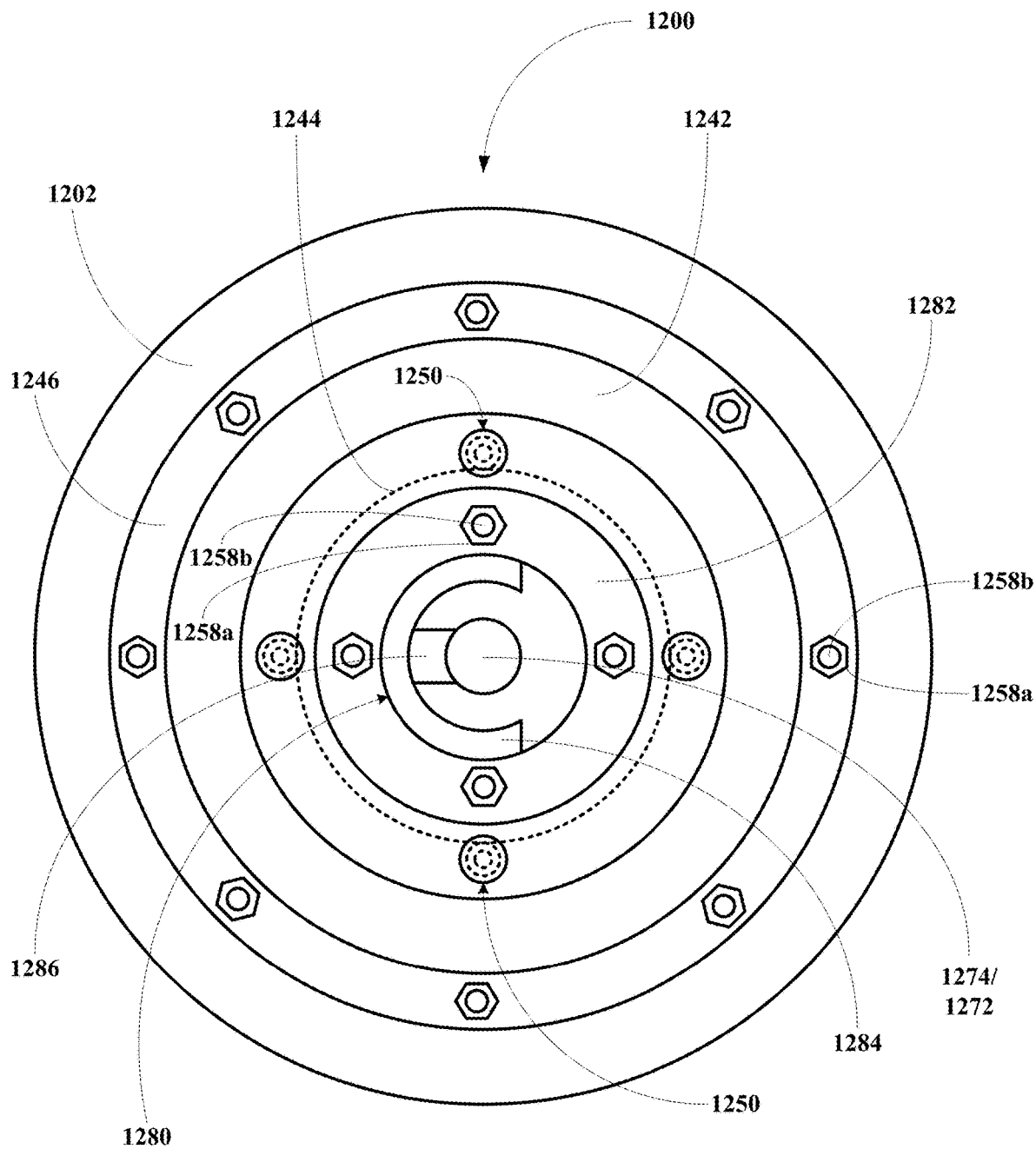

FIGS. 12A-C depict a tower DWHAT apparatus including a pivot assembly for lowering the top portion of the tower DWHAT apparatus for maintenance and repair.

FIGS. 13A-E depicts an embodiment of a sail attachment, a sail support, and a sail sheeting/trimming assembly.

Figure 13A:
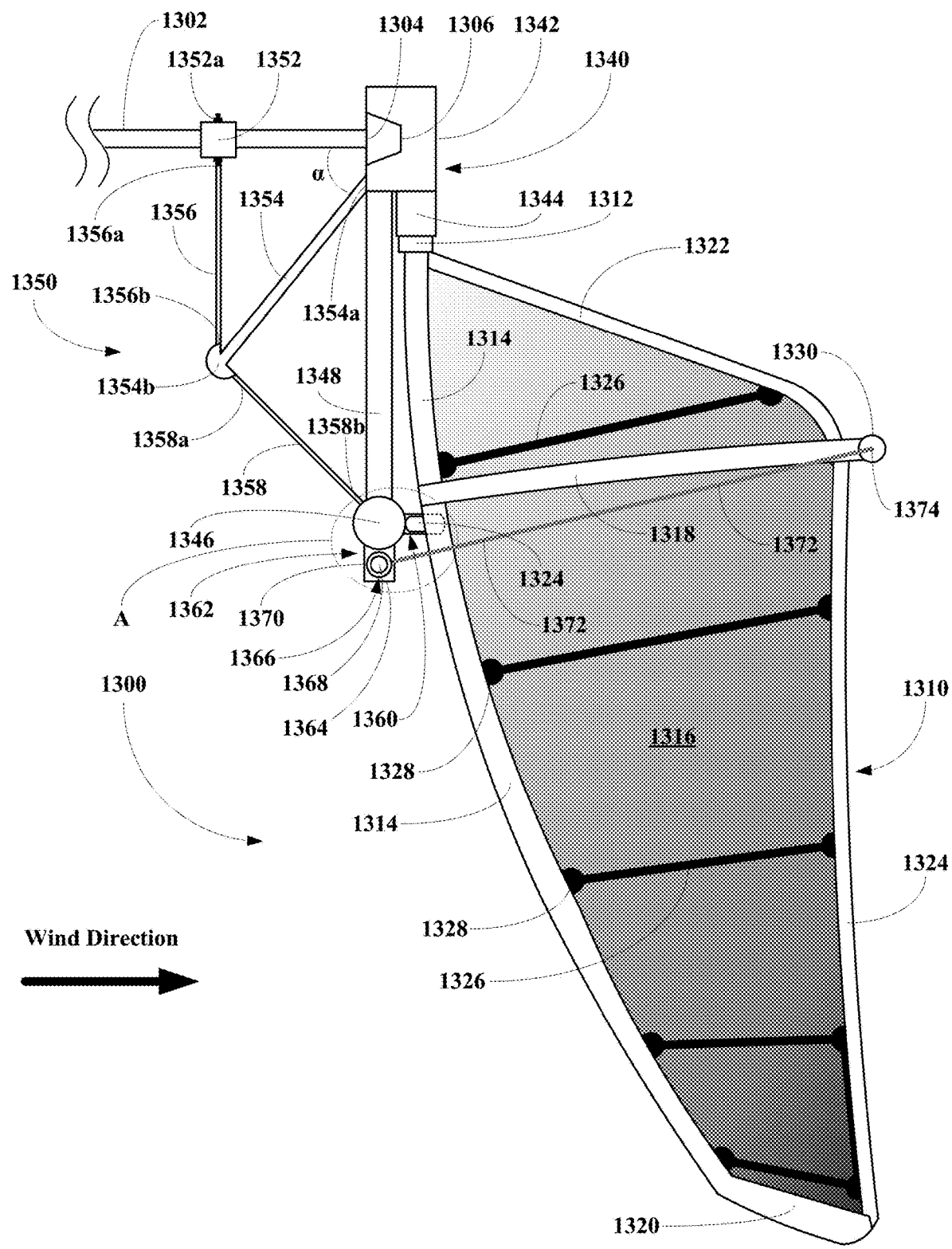
Figure 13F:
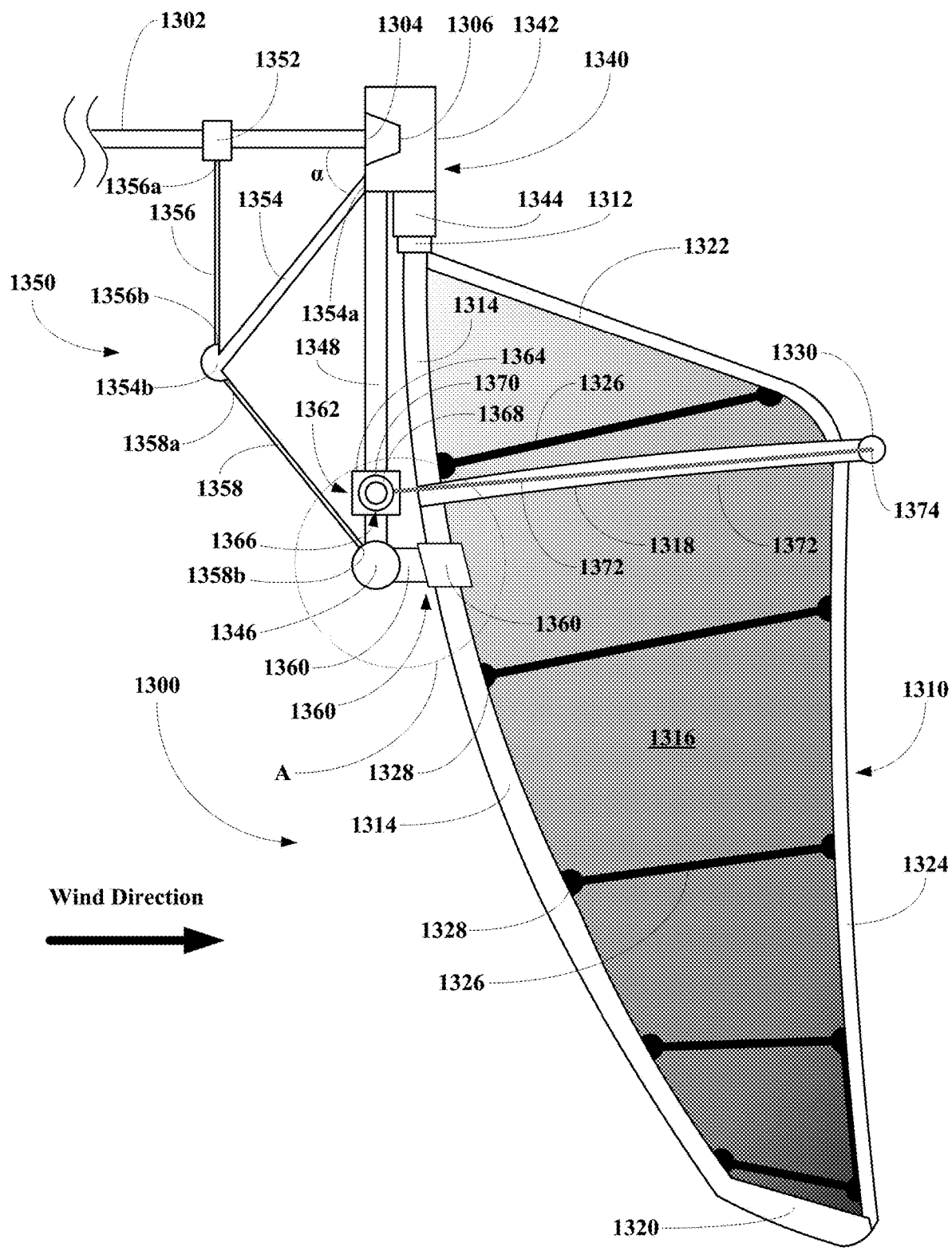
Figure 13G:
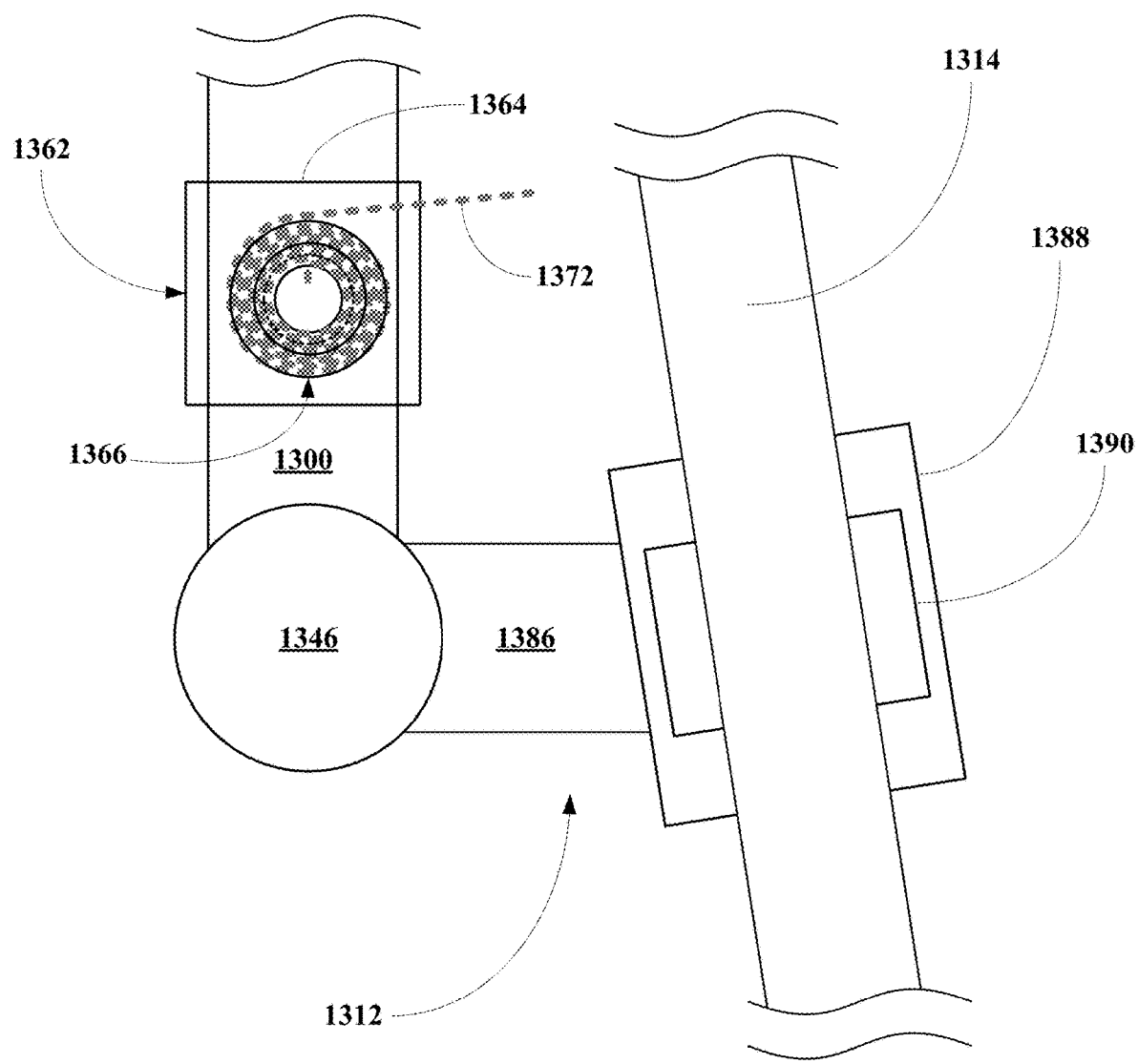

FIGS. 13F-G depicts another embodiment of a sail attachment, a sail support, and a sail sheeting/trimming assembly.

FIGS. 14A&B depict a sail hub and sail rotatable quick connection assembly.

FIGS. 15A&B depict a sail hub and sail rotatable connection assembly.

Figure 16A:
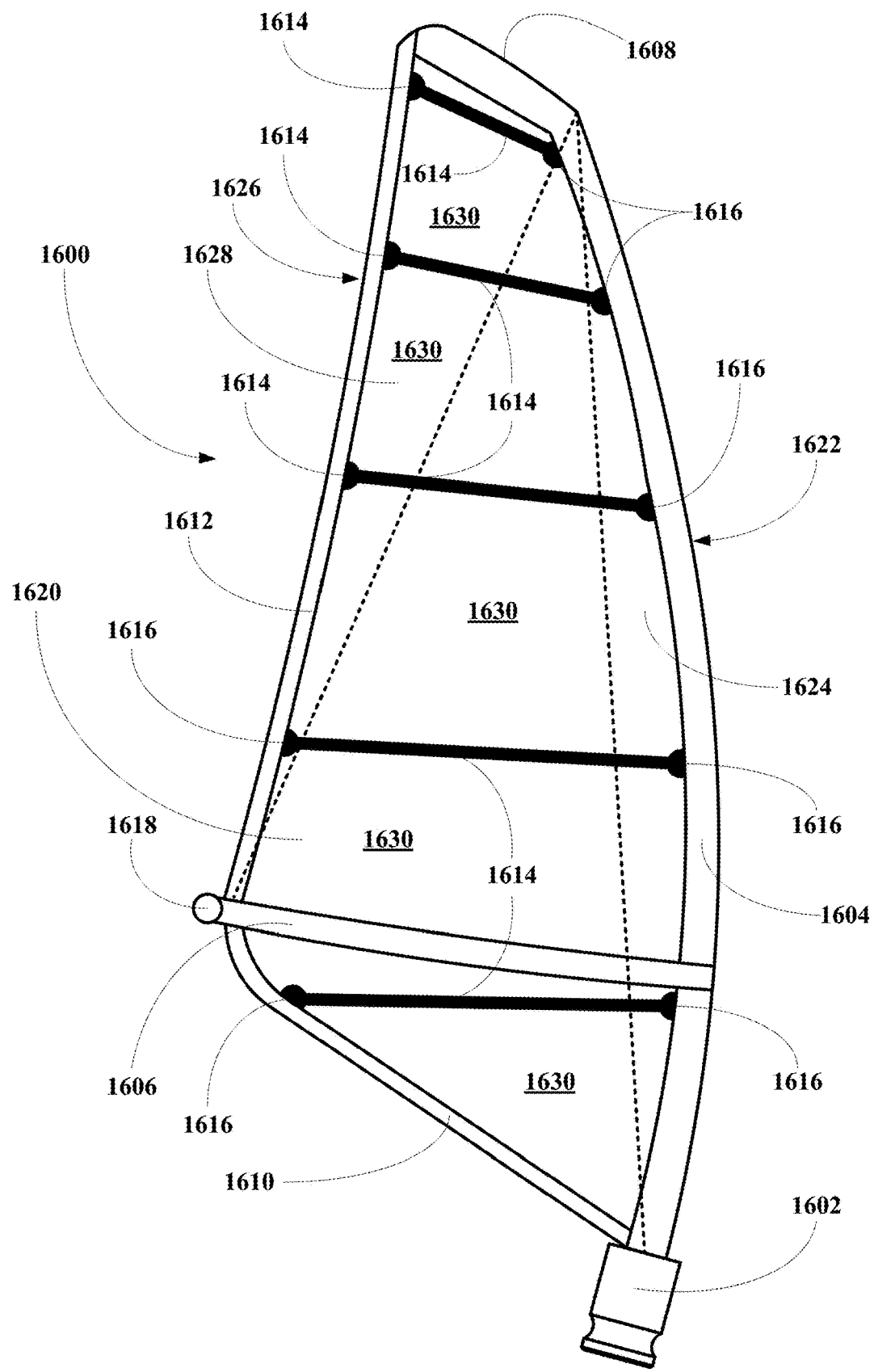

FIG. 16A depicts an embodiment of a sail with sail areas.

Figure 16B:
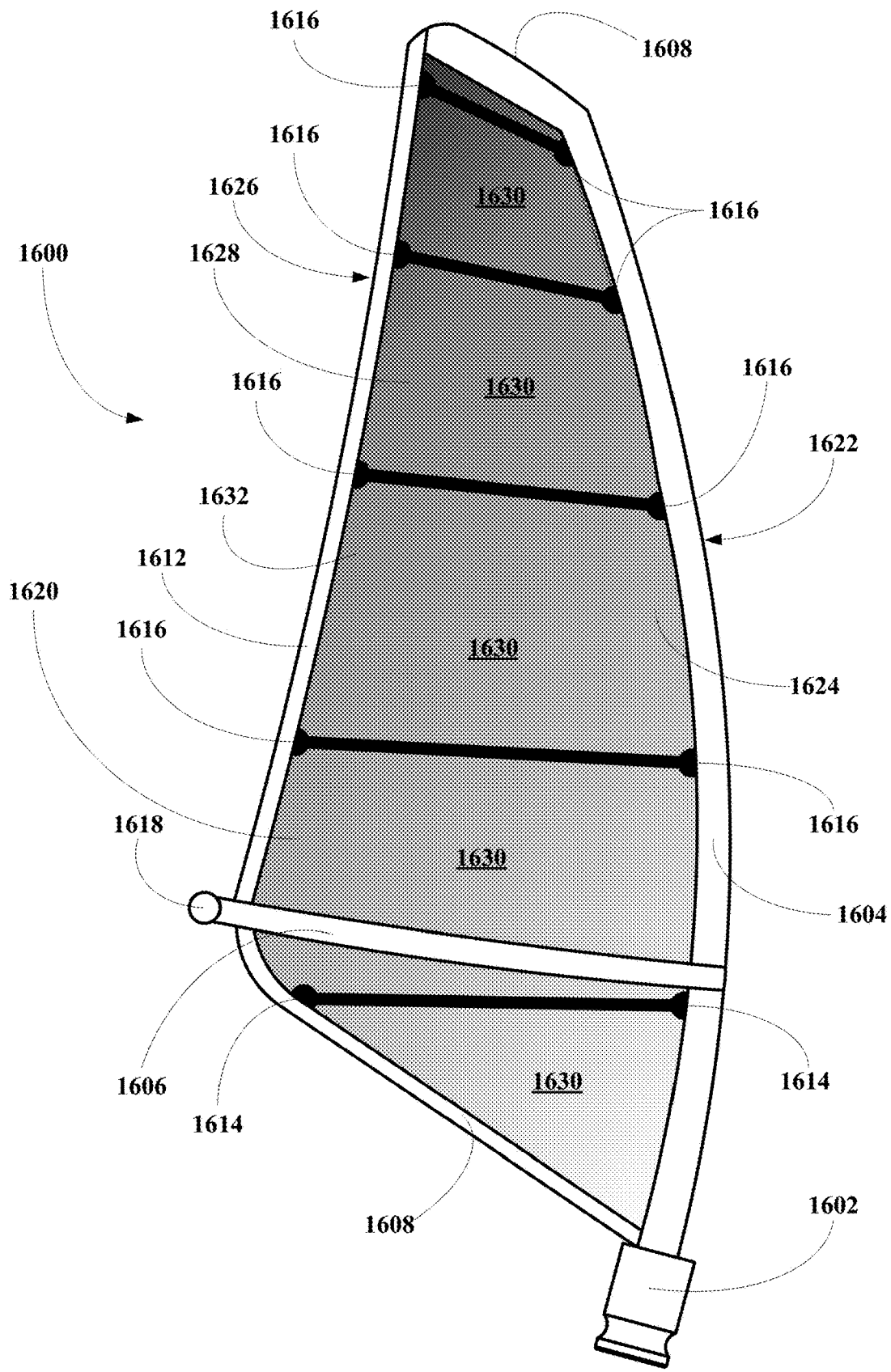

FIG. 16B depicts another embodiment of a sail with a design and with sail areas.

Figure 16C:
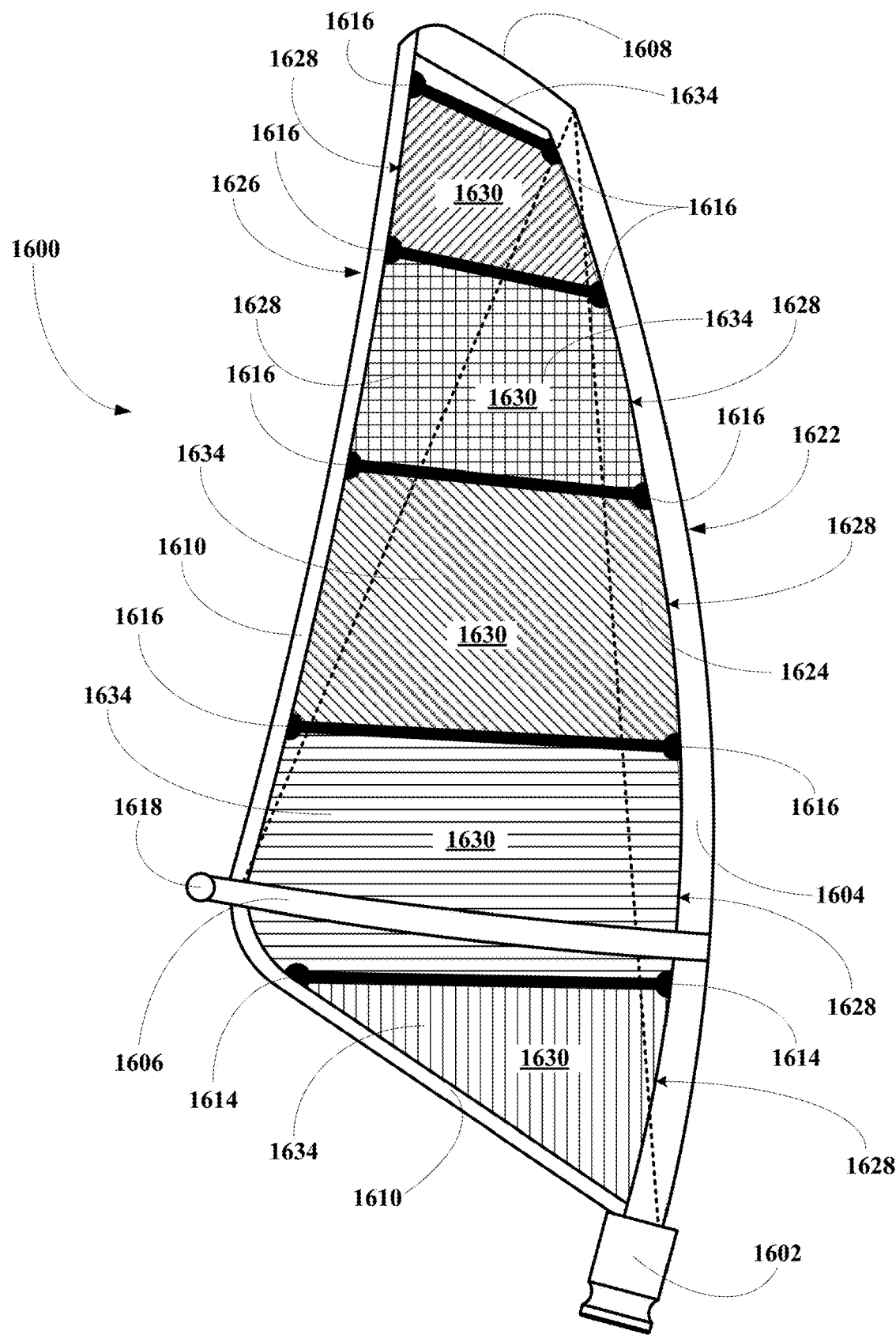

FIG. 16C depicts an embodiment of a sail with sail areas having designs.

Figure 17A:
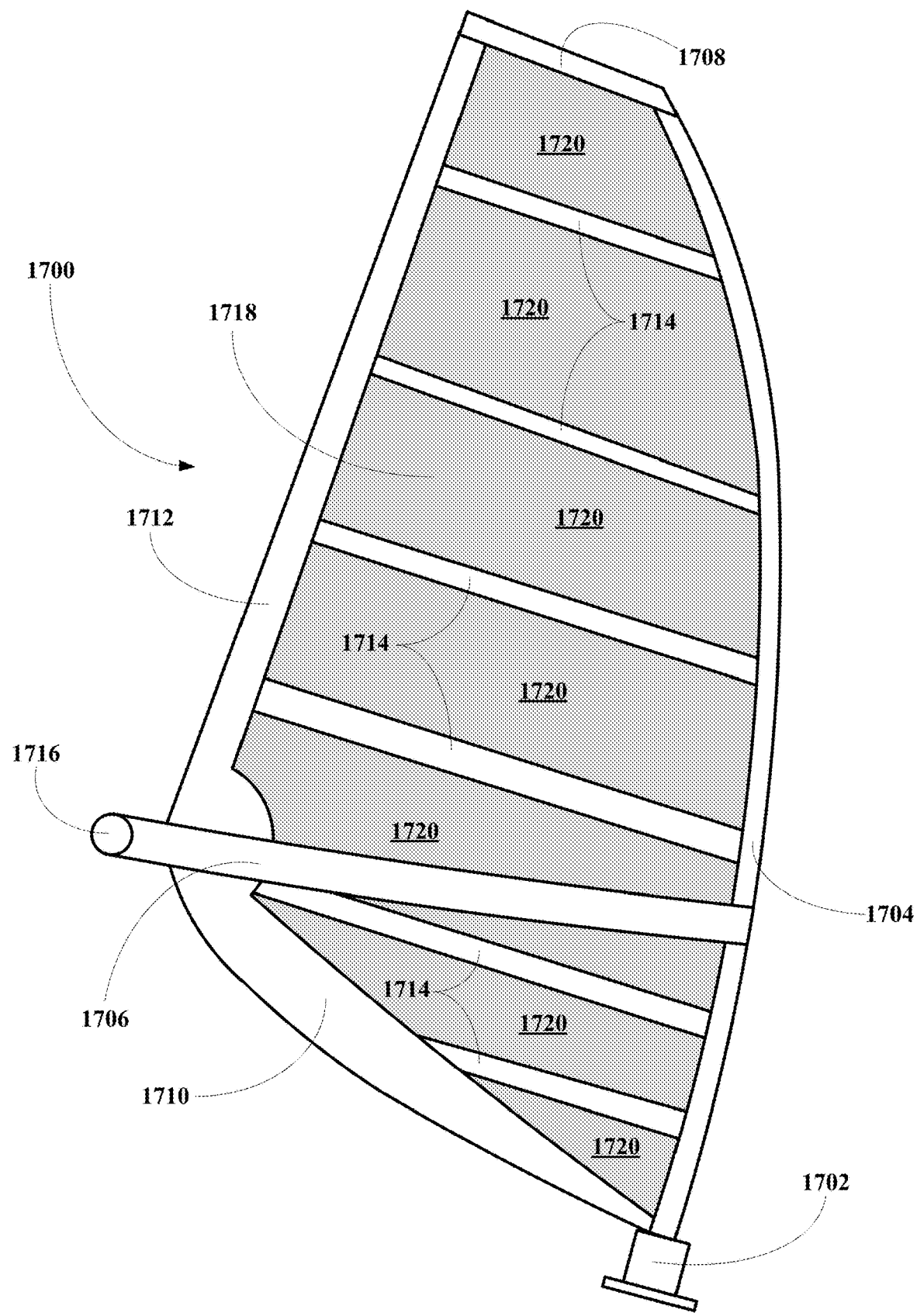

FIG. 17A depicts an embodiment of a sail with sail areas.

Figure 17B:
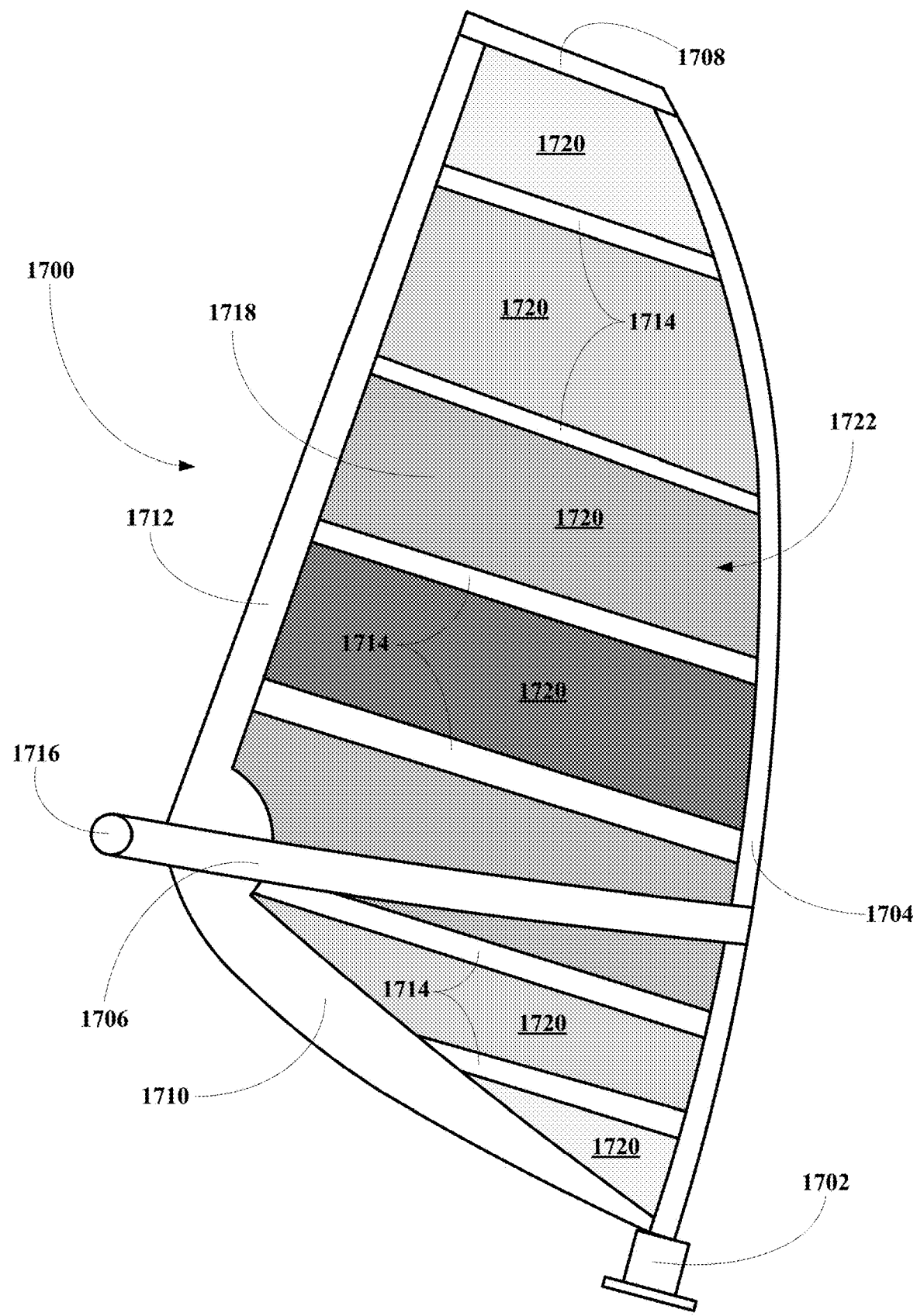

FIG. 17B depicts another embodiment of a sail with a design and with sail areas.

Figure 17C:
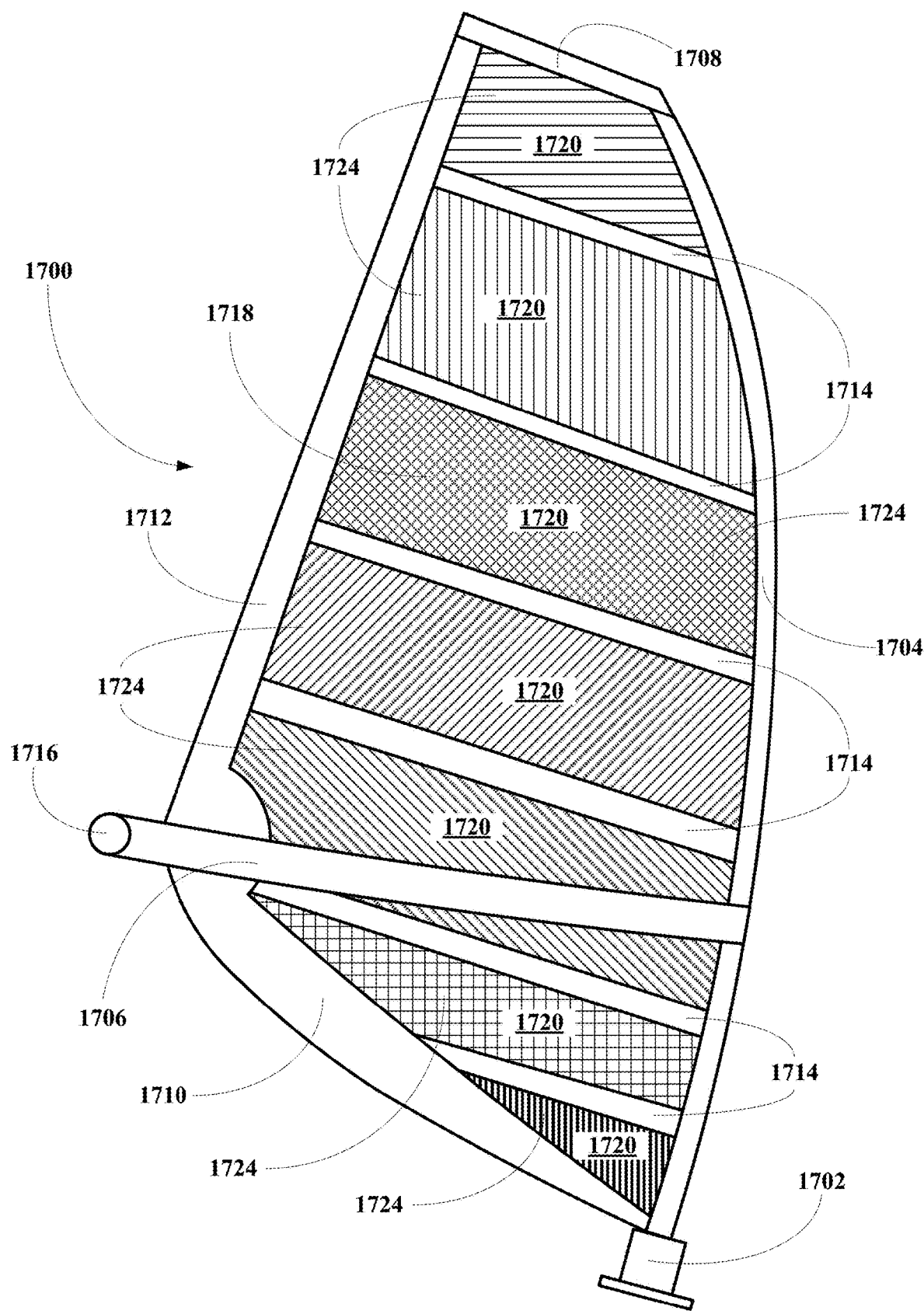

FIG. 17C depicts an embodiment of a sail with sail areas having designs.

Figure 18:
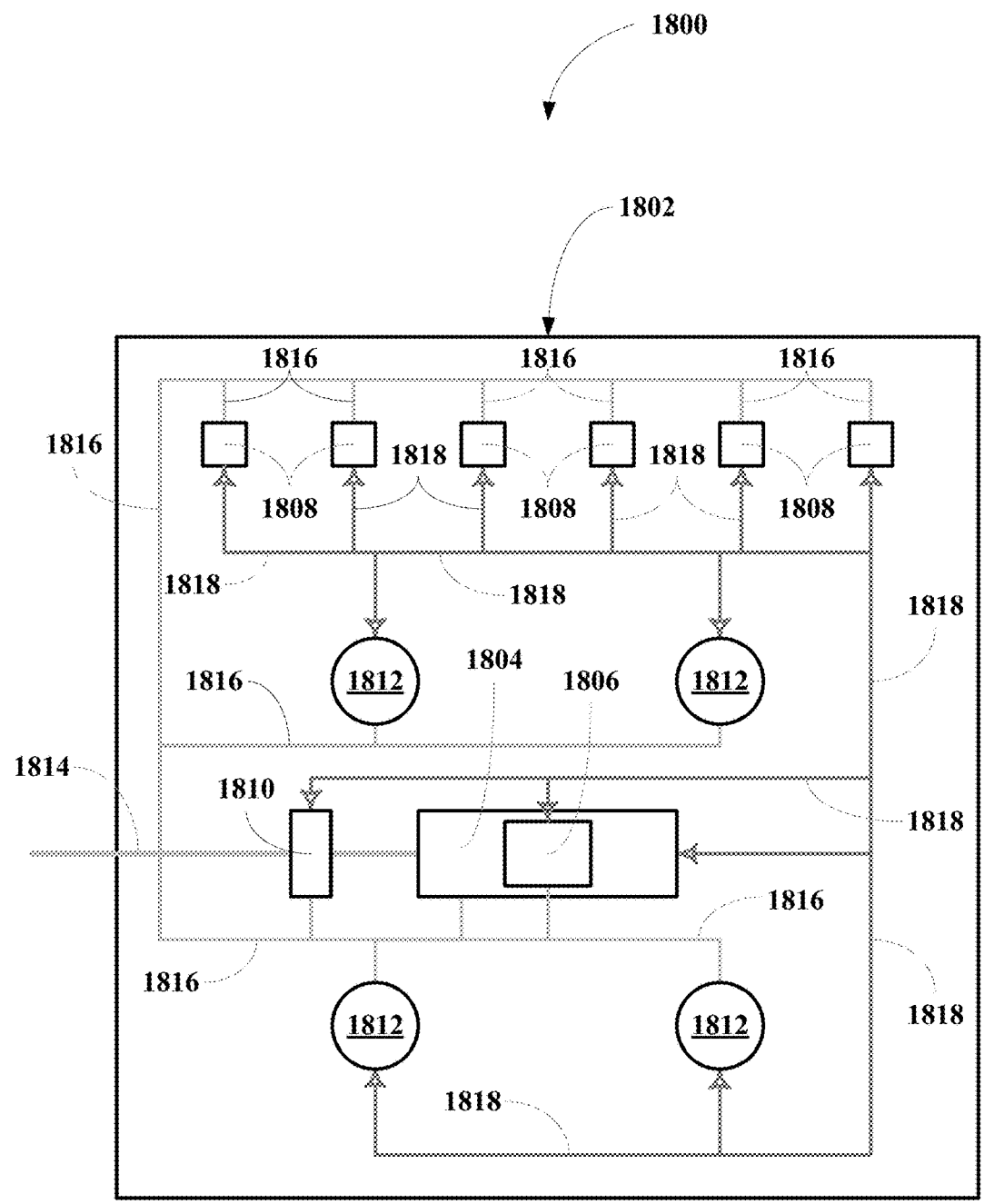

FIG. 18 depicts a control system for a DWHAT apparatus of this disclosure.

Figure 19A:
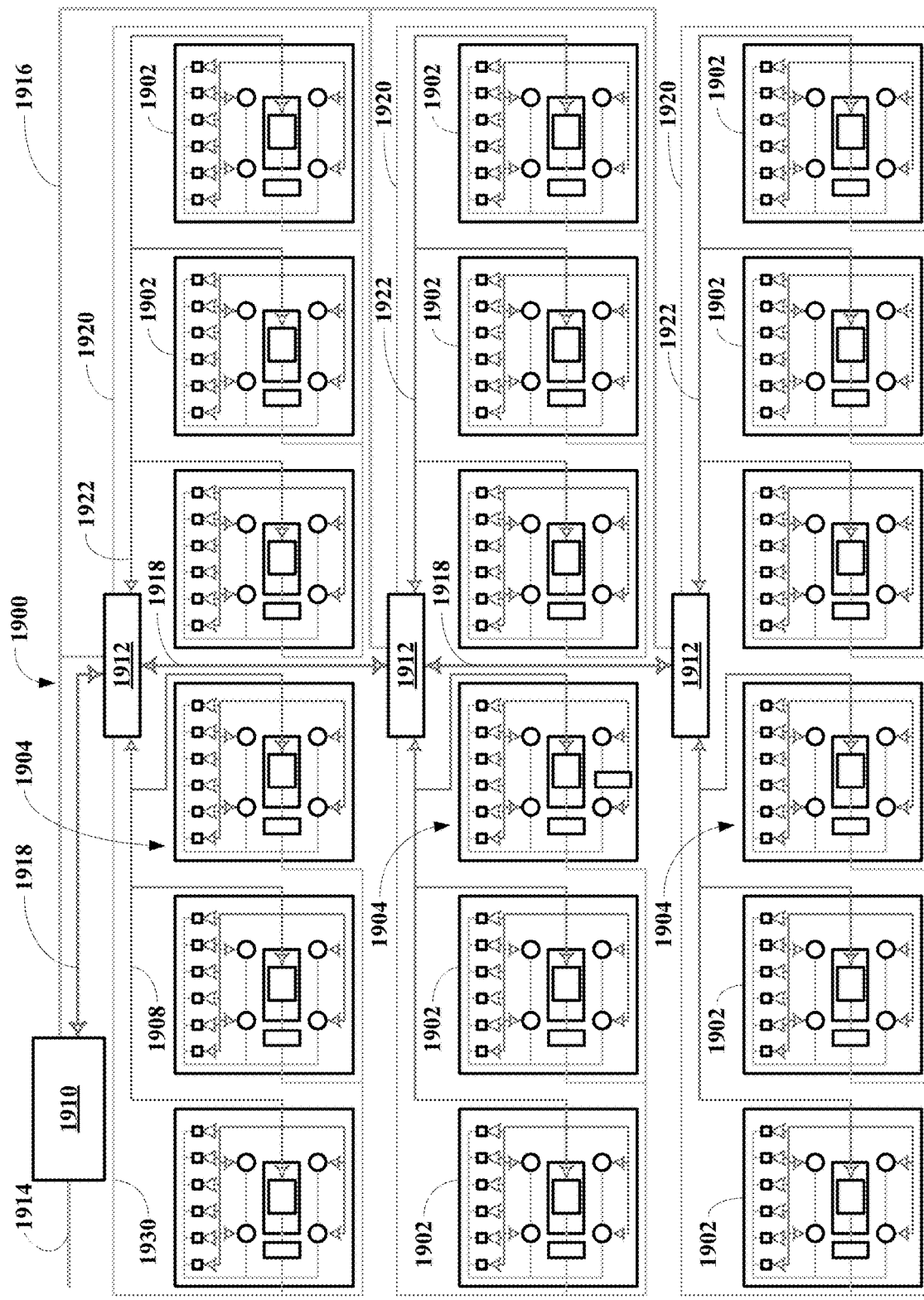

FIG. 19A depicts an embodiment of a control system for a 6×3 grid of DWHAT apparatuses of this disclosure.

Figure 19B:
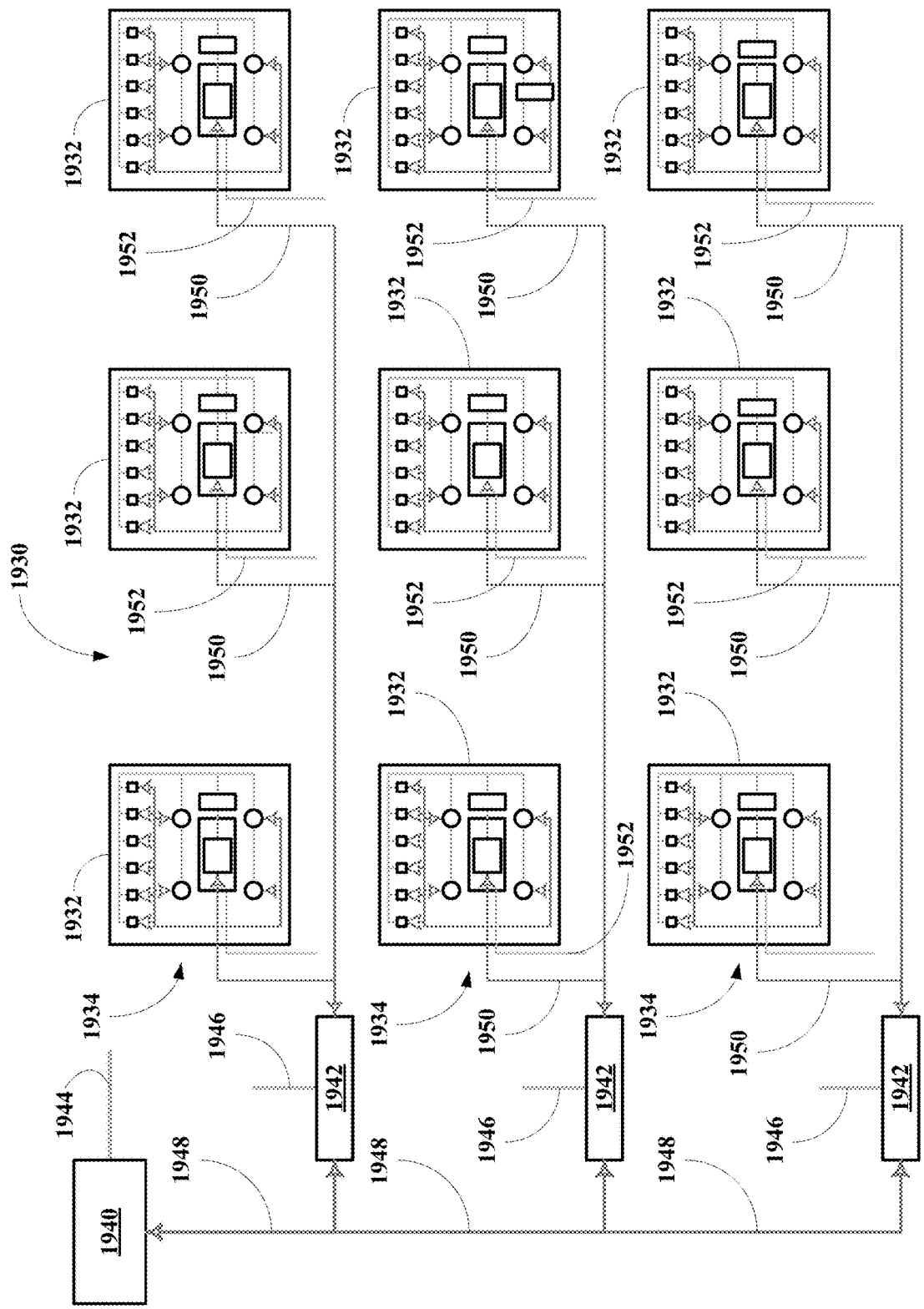

FIG. 19B depicts another embodiment of a control system for a 3×3 grid of DWHAT apparatuses of this disclosure.

Figure 19C:
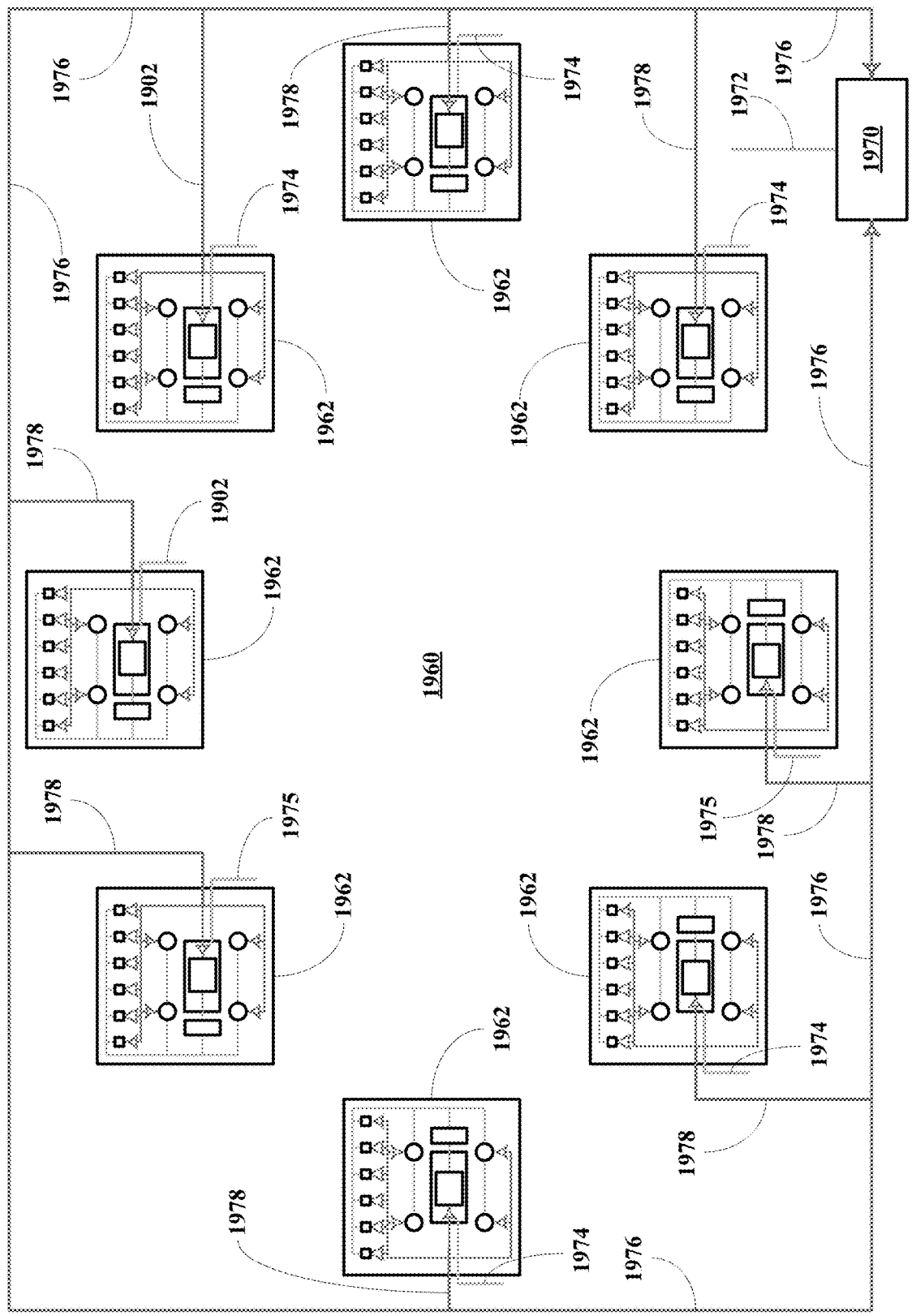

FIG. 19C depicts another embodiment of a control system for an elliptical array of DWHAT apparatuses of this disclosure.

DEFINITIONS USED IN THE DISCLOSURE

The term "at least one", "one or more" or "one or a plurality" are interchangeable terms interchangeable within this disclosure describing values of an item, a component, etc. from 1 to a realistic number greater than one that would be clear to an ordinary artisan in context. For example, at least one bolt affixing one member to another member the terms mean 1 or some number the is reasonable for the specific members.

The term "about" means that a value of a given quantity is within ±20% of the stated value. In other embodiments, the value is within ±15% of the stated value. In other embodiments, the value is within ±10% of the stated value. In other embodiments, the value is within ±5% of the stated value. In other embodiments, the value is within ±2.5% of the stated value. In other embodiments, the value is within ±1% of the stated value.

The term "substantially" means that a value of a given quantity is within ±5% of the stated value. In other embodiments, the value is within ±2.5% of the stated value. In other embodiments, the value is within ±2% of the stated value. In other embodiments, the value is within ±1% of the stated value. In other embodiments, the value is within ±0.1% of the stated value.

The term "UWHAT(s)" means up-wind horizontal axis turbine(s), a type of turbine in which the rotor faces the wind.

The term "DWHAT(s)" means down-wind horizontal axis turbine(s), a type of turbine in which the rotor is on the downwind side (lee side) of the tower, i.e., does not face the wind.

The term "control unit" means any control unit that includes one or more processing units, one or more memories including RAM, ROM, etc., one or more mass storage devices, battery backup hardware and software, communication hardware and software, one or more input devices, one or more output devices such as a display device, operating software, software routines for performing various needed function, and any other components needed to perform its desired tasks.

DETAILED DESCRIPTION OF THE DISCLOSURE

The inventor has found that a significantly improved wind turbine design construction representing a paradigm shift in wind turbine design may be constructed an implemented with reduced fingerprints, improved aesthetic, and reduced adverse environment impact. The wind turbine is capable of making wind-derived power more economical, scalable, efficient, less noisy, and less obtrusive. The inventor believes that the novel, economical, efficient, unique wind turbine designs, which uses existing technologies, will yield approximately a 50% reduction in cost compared to conventional up-wind horizontal axis turbine (UWHAT) designs. The inventor believes that the novel, economical, efficient, unique designs will have increased scalability for local environmental or power needs.

The improved wind turbine apparatus of this disclosure is a down-wind horizontal axis turbine (DWHAT) apparatus. The DWHAT apparatus comprises a large-scale downwind sail assembly mounted on a top of a relatively thin tower assembly or relatively small derrick assembly. The sail assembly is mounted on a proximal end of a horizontal drive shaft. A counterbalance weight is mounted on a distal end of the horizontal drive shaft. In certain embodiments, the counterbalance member may be replaced by a small UWHAT windmill to increase torque on the drive shaft to supplement the torque added by the DWHAT sails.

The large-scale downwind sail assembly includes a sail hub having a plurality of sail swivel connectors. The sail assembly also includes a set of soft sail or a plurality of soft sails, similar to wind-surfing sails in construction, including a detachably hub connector for pivotally connecting to the sail swivel connectors. Wind contacting on the sails of the sail assembly causes the sail assembly to rotate, which in turn rotates the horizontal drive shaft. The sail assembly also includes a sail support or boom ring including sail mast connectors for supporting the sails of the sail assembly. The horizontal drive shaft is a relatively long horizontal drive shaft with the sail assembly disposed downwind. The sail assembly also includes supporting braces, standing rigging, and brackets.

The new DWHAT apparatuses or systems may be designed to be smaller, more compact, and more aesthetically pleasing than the larger, traditional standard UWHAT apparatuses. The new DWHAT apparatuses or systems are more scalable, having a small or minimal environmental footprint, produce reduced or lower noise compared to standard UWHAT apparatuses and are capable of attractive, artistic designs, and/or unobtrusive design and appearance.

The new DWHAT apparatuses or systems represent a significant design, economic, and aesthetic improvement over the traditional UWHAT apparatuses. All ancillary equipment including a generator assembly, secondary gear boxes, controller, etc. may all now be mounted at ground level, allowing for a much thinner tower or derrick with a single, vertical drive axle or shaft contained inside the tower. The new DWHAT apparatuses or systems have a more compact nacelle housing of a 90° drive assembly relative to the tower or derrick support assembly, wherein the nacelle housing houses the energy-generating components including a shaft, a generator, and gearing to which the rotor and sails of the turbine are attached.

The new DWHAT apparatuses or systems reduce or eliminate a number of issued associated standard UWHAT apparatuses or systems. Standard UWHAT apparatus designs are expensive, obtrusive, hard to maintain, and prone to icing. Standard UWHAT apparatus designs include a large diameter tower supporting large turbine blades, which are dangerous and hard to manufacture and include elevated generator and ancillary equipment causing considerable tower shadowing and maintenance issues. The new DWHAT also solves several obstacles of previous DWHAT apparatuses including detrimental vibrational effects.

The new DWHAT apparatuses include a horizontal axial or drive shaft extending out a length that is equal to $nD_o$ from a top of a tower support or a top of a central derrick support, wherein $D_o$ is an outer diameter of the tower or central derrick tower and n is a number between 6 and 12. In certain embodiments, n is a number between 7 and 11. In other embodiments, n is a number between 8 and 10. A tower shadow is negligible after about $8D_0$ distance from the tower, wherein $D_o$ again is the tower diameter. The new DWHAT apparatuses also include an active yaw control that rotates the tower shadow towards a leeward area of rotation.

The new DWHAT apparatus are designed to have a minimum power output of about 1.2 MW per tower. As a design of the DWHAT apparatus matures and based on local environmental factors, the DWHAT apparatus may produce up to 1.5 MW or higher. Increased sail area and sail numbers and appropriate gearing will also allow increased power generation.

The new DWHAT apparatus may use existing wind-surfing sail designs, wherein the wind-surfing sail design may be optimized for single direction sail designs.

The vertical or internal drive shaft is disposed within the interior of the tower member and centered and supported within the interior by bearings disposed within the tower member and distributed along the length of the vertical drive shaft. The horizontal rotational motion of the horizontal drive shaft due to the sails rotating the sail hub assembly attached to the proximal end of the horizontal drive shaft and is converted, by the 90 degree gear assembly, into the vertical rotation of the vertical drive shaft down the tower member to the lower Power Take Off (PTO) attached to the generator assembly located at the base of the tower member.

The DWHAT apparatus uses a variable number (e.g., optimized for 12 sails using a 10' diameter hub or optimized for 6 sails using a 5' hub) of individual sail apparatuses including a mast including a sail fitting member, a boom, a leeward member, a plurality of sail battens, a head member, a foot member, and a sail. The sail sets are similar to wind-surfing sail assemblies. Horizontal axle is attached to a central rotating hub with sails attached to hub. A flexible, shock-mounted linkage is at each mast step. Existing wind-surfing sails would work well in the short term for this application. Since wind-surfing sails are an existing wing-sail design, their use would dramatically reduce initial the sail design engineering and material costs. Customized sail sets with custom boom and mast steps will be developed to increase efficiency and endurance of design.

The horizontal axle or drive shaft and the sail hub assembly driven by the sail set may rotate at between about 2 hz and about 8 hz, between about 2 hz and about 6 hz, between about 2 hz and about 4 hz, or between about 2 hz and about 3 hz, producing a blade tip speed ratio between about 3 and about 6.

The Sail Hub Assembly

The sails are to be stepped-mounted on a circular central sail hub having a radius $r_{sh}$ between about 5' and about 15', between about 5' and about 12', or between about 5' and about 10' and any subrange therebetween, where the ranges include the endpoint valves. A boom ring having a boom radius $r_{br}$ between about 2 and about 5 times the radius $r_{sh}$, between about 2 and about 4 times the radius $r_{sh}$, or between about 2 and about 3 times of the radius $r_{sh}$, or any subrange therebetween including endpoints. Equivalently, the boom radius $r_{br}$ has a value between about 10' and about 75', between about 10' and about 60', which is attached to the hub by supporting stanchions and standing rigging on the upwind side and a bracing structure on the downwind side. The hub and the boom will support the sail at the mast and at the boom head. The assembly will include sheeting drive assemblies adapted to control sheeting/trim of the sails. The sheeting drive assemblies pulls the boom ends to change the sail sheeting or trim to minimize hub rotation or to maximize hub rotation or to adjust hub rotation to any desired rotation rate.

The boom attachment points are located about ¼ to ½ of the mast height for mast and boom attachment and for boom sheet in-out location. The sails are stepped into the lower radius hub with locking collar and flexible shock mount joint to accommodate a bending moment and allow mast/boom rotation for sheeting in and out.

The number of sails mounted on the hub is dependent upon nominal wind conditions at installed site/location.

Each standalone wing sail assembly is comprised of a mast, a mast step, a curve-sided boom on leeward side of sail, a straight side boom on windward side of sail, and a curved sail with integral battens that pull the sail taut by tension from the boom end.

The sails are arranged in a uniform angular distance fashion or configuration around the central hub with the mast step attached to the hub on a shock mount of fitting, which may be a rotary quick connection system or a rotary non-quick connection system. The connection systems also include an integral universal pivot joint/shock joint.

Boom Ring

The sails are retained at the lower third or midsection of the mast, just below the boom attachment and at the end of the boom, by a supporting boom ring. The boom ring is also attached to the central hub by supporting struts and radial standing rigging.

Embodiments of DWHAT apparatus include (a) a tower member having a length between about 30 ft and about 40 ft with the vertical drive shaft mounted by bearings inside the tower member. The drive assembly is mounted at the top of tower member and the generator assembly is situated at a bottom of the tower assembly and may be mounted on a 21-ft. trailer for portability staked down for stability.

- a 2-tier power tower assembly comprising lower and upper sections is another possible configuration.
  - a 30-40 ft lower section, a tri or quad leg tower structure with appropriate foundation. Tower is joined at top to form a pyramid. Inside of legs at top of tower is outfitted with a center ring tube section in which the upper mast fits.
  - a 30-40 ft upper section, a hollow tube (mast) with DWHAT sitting atop the mast. Lower end of mast is fitted inside the center ring tube to react lateral loads and overturning moment. Rotational energy from the sail and hub is transferred through a 90° GB down through the center tube down to the platform with the generator assy. Central tube stalk is raised within the pyramid platform to elevate the DWHAT.

The horizontal axis (driven by sail-hub assembly) drives a 90° GB (est 5:1 gear step-up), which turns the primary drive axle down the inside of the tower pipe. The end of the drive axle at the lower end of the tower pipe is the PTO for the DC generator or other generator set. Maybe DC gen to battery with an inverter or a squirrel cage AC generator. The tower is 25-35 feet tall (hot dipped galvanized, polymer) supported by modest foundation with supporting side braces, stanchions, or side-standing stays. Tower is topped with the downwind sail-rotor assembly, horizontal axis of rotation, with a counterbalanced weight on the windward (upwind) end of the rotation axis. The sail forces will induce torque that drives the GB with 5-1 gear ratio step-up. The horizontal axial rotation translated to vertical axial rotation by the GB, then drives the central axial inside the tower pipe, which is linked to the generator at the lower-end PTO. An additional GB may be required at this PTO, or a direct drive to the generator set may be used. In certain embodiments, the counterbalance member may be replaced by a small UWHAT windmill to increase torque on the drive shaft to supplement the torque added by the DWHAT sails.

A different number of sails may be used to configure the sail hub wheel for different conditions. Different size sails may be used for variable wind, environmental conditions, and locations.

Relative wind velocities may be amplified by the interaction of each sail assembly upon the sail following it. There may be a cumulative additive effect of increased relative sail rotational velocity as the incident wind velocity is funneled in front of one sail and behind the next.

Low wing sail/hub assembly weight and low sail moment of inertia makes for agile sail movement/function given wind directional changes, as well as rapid rotational speed changes. Rotating counterbalance on upwind side of the horizontal shaft generates rotational inertia to compensate for wind gusts and wind slackening. In certain embodiments, the counterbalance member may be replaced by a small UWHAT windmill to increase torque on the drive shaft to supplement the torque added by the DWHAT sails.

The larger sail area per sail assembly design, relatively thin main tower pipe, along with shock-mounted hub/sail mast connection and active yaw control, alleviates tower shadowing and related vibration effect.

Active yaw control will allow the sail assembly to be rotated off the wind to the angle of greatest wind conversion efficiency. Each sail boom may be sheeted in or out automatically to change the angle of attack for each sail assembly to allow optimization of sail set condition. Sail boom assemblies may all be sheeted in to increase efficiency or sheeted out to protect for overwind conditions. The mast section above the boom is flexible enough to bend a few degrees and allow gusts or overwind conditions to spill out of the top of the sail.

All booms may be sheeted out to provide overwind protection and a brake may be applied. This full sheet out is the default fail safe condition that will allow rotation to stop.

Alternatively, active yaw control may also protect the entire tower/sail installation from over-wind condition. In case of high wind or just need to slow hub rotation, all sail set booms will sheet in and then actively yaw (nacelle rotates) the sail assembly up into the wind until the point the sails are back-winded. This will effectively bring the rotational forces enacted on the sails down to a minimum, relative to the sail area.

Only the horizontal axle or shaft, counterbalance, gear box, sail hub assembly with standing rigging and sail sets are elevated on the primary tower/driven axle or shaft, levered ring, base ring-sail step, outer ring support, outer ring boom ring, and torque ring plate. In certain embodiments, the counterbalance member may be replaced by a small UWHAT windmill to increase torque on the drive shaft to supplement the torque added by the DWHAT sails.

The DWHAT apparatuses have a substantially lower installed cost and has significantly lower noise and environmental impacts.

Aesthetically, the DWHAT apparatus designs will not generate anxiety (like current turbines) but may arouse curiosity. Additionally, a hub-mounted windsurfing-type sail apparatus could also be adapted to an upwind configuration.

DC Power is gathered from numerous towers and stored in DC batteries at a local power substation or transformed for either DC to AC inversion or power conditioning. Power from numerous towers is then ready to pass on to the distribution network or grid.

Each DWHAT apparatus is designed to generate between 1 MW and about 1.5 MW, but higher megawatt power outputs are possible. With appropriate gearing, the DWHAT may have a very low cut-in speed and a very high cut-out speed.

For safety purposes, the DWHAT apparatuses include at least 3 ways to stop horizontal rotation: (a) sheeting out, (b) actively yaw the entire hub/sail assembly to head up into the wind until sails are back-winded, (c) a braking system, or (d) any combination thereof.

The present novel DWHAT apparatus design has at least the following benefits: (a) unique blade design utilizing turbulent air flow, optimized over a large sail area, where the cumulative effect of the sails working together will increase efficiency, (b) unique tower design utilizes between 4-16 sails sets, (c) configurable to different wind and climate conditions, (d) scalable for different energy requirement conditions, (e) highly efficient unit design will have ultra-low wind, gear and power losses, (f) approaching an ideal wind turbine efficiency design known as the Benz limit. Cp=0.52, (g) tower and Sail Design solves tower shadowing problem, (h) significantly better Cp than for upwind turbines, and (i) tip speed ratio 3-4.

The novel DWHAT apparatuses also include a sensor unit. The sensor unit includes at least a wind velocity or speed sensor and a wind direction sensor. The sensor unit may also include a temperature sensor, a barometric pressure sensor, a humidity sensor, a rotation sensor, an accelerometer sensor, a torque sensor, a pitch sensor, a roll sensor, any other sensor, or any combination thereof.

Suitable Components for Use in the Disclosure

Suitable materials for constructing the base include, without limitation, concrete, reinforced concrete, other similar materials, or any combination thereof.

Suitable materials for constructing the tower or derrick assembly include, without limitation, metals, composites, reinforced composites, plastics, reinforced plastics, other structure building materials, or any combination thereof.

Suitable materials for constructing the sails, sail structures, the sail elements, and/or sail members include, without limitation, metals, composites, reinforced composites, plastics, reinforced plastics, fabrics, fiber glass, other structure building materials, or any combination thereof.

Suitable materials for constructing the sails include, without limitation, metals, composites, reinforced composites, plastics, reinforced plastics, fabrics, fiber glass, other structure building materials, or any combination thereof.

Suitable reinforcing materials for constructing the sails include, without limitation, polyamide fibers, polyamide woven or unwoven fabrics, polyimide fibers, polyimide woven or unwoven fabrics, carbon fibers, woven or unwoven carbon fabrics, nanotubes, metal wires, metal wire meshes, other reinforcing agents for plastics and composites, or any combination thereof.

Suitable gear boxes for converting horizontal rotation motion into vertical rotation motion (right angle gear boxes) include, without limitation, gear boxes manufactured by DieQua Corporation, Bloomingdale, IL; Cleveland Gear Company, Cleveland, OH; ElectroCraft, Inc., Stratham, NH; Geartechnic, DeForest, WI; IPTS, Inc., Riviera Beach, FL; Neugart USA, Charlotte, NC; Anaheim Automation Company, Anaheim, CA; Andantex USA, Inc., Wanamassa, NJ; Apex Dynamics, USA, Ronkonkoma, NY; ATLANTA Drive Systems, Inc., Wall Township, NJ; B&D Industrial, Macon, GA; Bison Gear & Engineering Corp., St. Charles, IL; Bloom Manufacturing Incorporated, Independence, IA; Bond Machine and Fabrication, Christiana, PA; Carter Motor Company, Monroe, WI; Cone Drive, Traverse City, MI; Cotta Transmission Company, Beloit, WI; Dalton Gear Company, Minneapolis, MN; Dana Brevini USA, Yorktown, IN; Deschner Corporation, Santa Ana, CA; Dorris Gear Drives, Fraser, MI; any other right angle gear box manufacturers, or any combination thereof.

Suitable generators for converting rotational energy include, without limitation, generators manufactured by ABB, Innotec Power PMG Technology, GE, Vestas, Siemens, Gamesa, Mitsubishi, Acciona, Nordex, other wind turbine generator manufacturers, or any combination thereof.

Suitable sail swivel connectors and the sail hub connectors for use in this disclosure include, without limitation, any suitable rotatable or swivel type connectors, and any female and male quick connectors, wherein the rotatable include two fixed ends attached to the mast and the hub with a rotary device interposed therebetween and wherein the quick connection include bayonet type quick connection, any other quick connections, or combinations thereof.

Suitable sheeting drive unit for use in this disclosure include, without limitation, any reciprocating devices, worm drives, cam devices, three bar reciprocating devices, four bar reciprocating devices, cable and reel devices, linear drive devices, any other reciprocating device, or combination thereof.

Processing Units

Suitable processing units for use in the present disclosure include, without limitation, digital processing units (DPUs), analog processing units (APUs), any other technology that can receive motion sensor output and generate command and/or control functions for objects under the control of the processing unit, or mixtures and combinations thereof.

Suitable digital processing units (DPUs) include, without limitation, any digital processing unit capable of accepting input from a plurality of devices and converting at least some of the input into output designed to select and/or control attributes of one or more of the devices. Exemplary examples of such DPUs include, without limitation, microprocessor, microcontrollers, or the like manufactured by Intel, Motorola, Ericsson, HP, Samsung, Hitachi, NRC, Applied Materials, AMD, Cyrix, Sun Microsystem, Philips, National Semiconductor, Qualcomm, or any other manufacture of microprocessors or microcontrollers.

Suitable analog processing units (APUs) include, without limitation, any analog processing unit capable of accepting input from a plurality of devices and converting at least some of the input into output designed to control attributes of one or more of the devices. Such analog devices are available from manufacturers such as Analog Devices Inc.

Other Components

Suitable motion sensors that may be used in conjunction with displays, keyboards, touch pads, touchless pads, sensors of any type, or other devices associated with a computer, a notebook computer or a drawing tablet or any mobile or stationary device, include, without limitation, any sensors capable of sensing motion such as touch pads, touchless pads, inductive sensors, capacitive sensors, optical sensors, acoustic sensors, thermal sensors, optoacoustic sensors, electromagnetic field (EMF) sensors, strain gauges, accelerometers, pulse or waveform sensor, any other sensor that senses movement or changes in movement, or mixtures and combinations thereof. The sensors may be digital, analog, or a combination of digital and analog. For camera systems, the systems may sense motion within a zone, area, or volume in front of the lens or a plurality of lens. Optical sensors may operate in any region of the electromagnetic spectrum including, without limitation, RF, microwave, near IR, IR, far IR, visible, UV or mixtures and combinations thereof. Acoustic sensor may operate over the entire sonic range which includes the human audio range, animal audio ranges, other ranges capable of being sensed by devices, or mixtures and combinations thereof. EMF sensors may operate in any frequency range of the electromagnetic spectrum and are capable of discerning motion with a given electromagnetic field (EMF) or combination of EMFs. Moreover, LCD screen(s), other screens and/or displays may be incorporated to identify which devices are chosen or the temperature setting, etc.

Suitable input devices include, without limitation, keyboards, cursor devices such as mouse devices, roll ball devices, etc., acoustic devices, optical devices, voice activated devices, touch screens, touch pads, any other type of input device, or any combination thereof.

Suitable input devices include, without limitation, display devices, acoustic devices, optical devices, any other type of output device, or any combination thereof.

DETAILED DESCRIPTION OF THE DRAWINGS

Tower Embodiment

Figure 1:
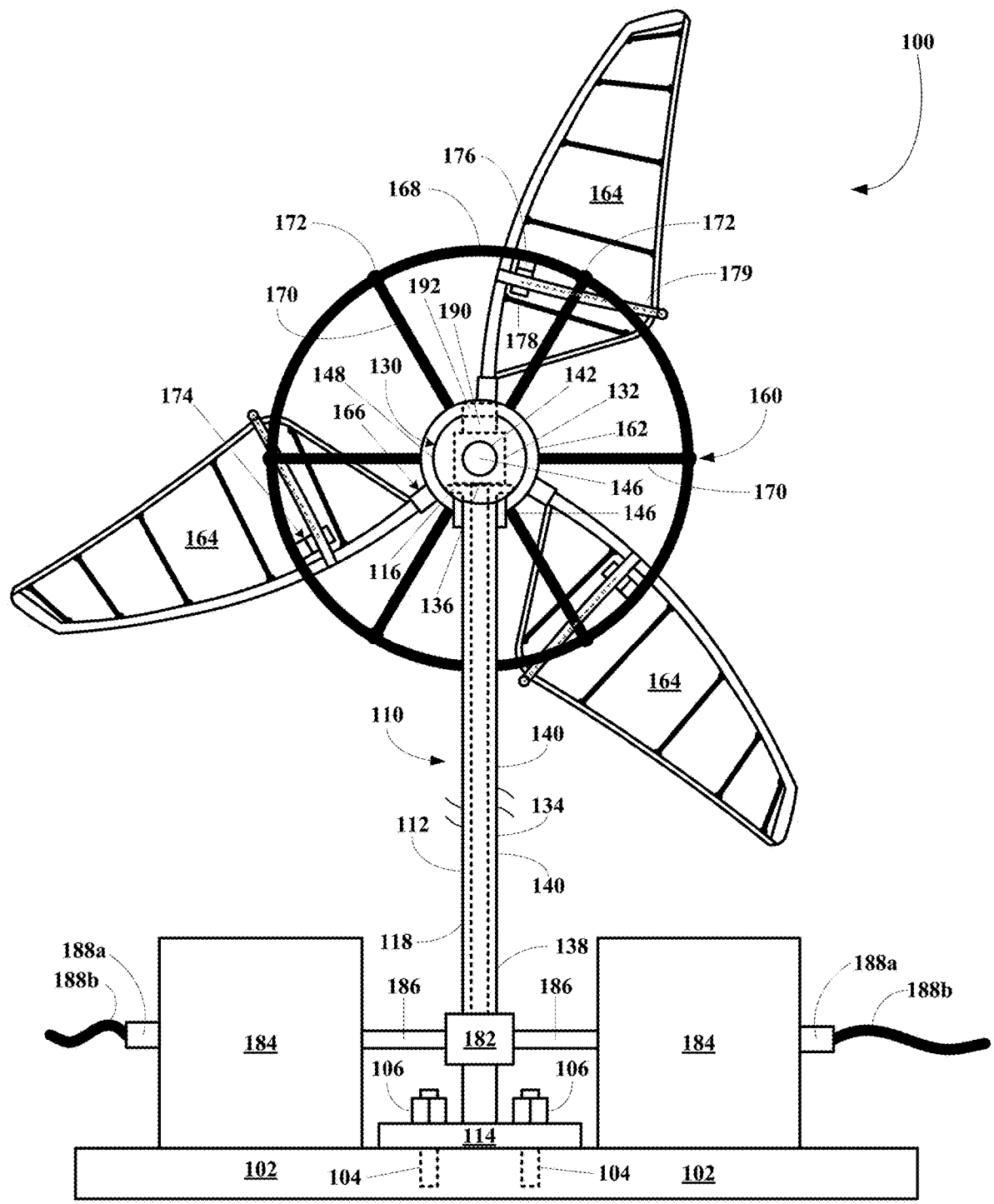
FIG. 1 depicts a tower DWHAT embodiment of an apparatus of this disclosure including a base, a tower assembly, a drive assembly, a sail support assembly, sails (three sails here), and a generator assembly.

Referring now to FIG. 1, a DWHAT tower type apparatus of this disclosure, generally 100, is shown to include a base structure 102 situated on the ground and including bolts 104 and nuts 106 and a tower assembly 110 including a vertical cylindrical member 112 having a bottom member 114 mounted to the base 102 by the bolts 104 and the nuts 106, a top support member 116, and an interior 118.

The apparatus 100 also includes a drive assembly 130 including a gear box 132 mounted on the top support member 116. The drive assembly 130 also includes a vertical drive shaft 134 having a proximal end 136 attached to the gear box 132 and a distal end 138. The vertical drive shaft 134 is disposed in the interior 118 of the cylindrical member 112 and rotationally centered in the interior 118 via bearings 140. The drive assembly 130 also includes a horizontal drive shaft 142 having a proximal end 144 (not shown) and a distal end 146 including a counterbalance weight member 148 and passing through the gear box 132. The gear box 132 includes gears (shown in other figures herein) that convert horizontal rotary motion of the horizontal drive shaft 142 into vertical rotary motion of the vertical drive shaft 134. The gear box 132 may also include a horizontal shaft braking unit as described herein.

The apparatus 100 also includes a sail assembly 160 including a sail hub 162. The sail hub 160 includes a plurality of sails 164 (here the plurality of three but may be as high as twelve or more depending on environmental, design, and aesthetic requirements) and an equal plurality of sail hub swivel connections 166 (one for each sail 164) and a sail support ring 168. The sail support ring 168 includes a plurality of radial support members 170 radiating outward from the hub 162 integral with the ring 168. The radial support member 170 may alternately include ring connectors 172 connecting the members 170 to the ring 168. The sail support ring 168 also includes a plurality of sail support assemblies 174 (one for each sail 164), which support the sails 164 and permit the sails 164 to swivel about the hub swivel connections 166 during sheeting operations. Each of the sail support assemblies 174 includes a boom support member 176 and a sheeting drive assembly 178 having rigging members 179, which are attached to the sails 164. The sheeting drive assemblies 178 and the rigging members 179 allow the sheeting of the sails 164 to be adjusted for maintenance, for slowing or increasing a horizontal rotation rate of the horizontal drive shaft 142, for optimizing the horizontal rotation rate of the horizontal drive shaft 142, or for stopping the horizontal rotation rate of the horizontal drive shaft 142. It is clear that the support right 168 is situated behind the tower assembly 110 making it clear that the wind direction is into the papers.

The apparatus 100 also includes a generator assembly 180 including a generator gear box 182 attached to the distal end 138 of the vertical shaft 134, generators 184 having generator drive shafts 186, power outlet terminals 188a, and power outlet cables 188b.

The apparatus 100 also includes a control unit 190 including a sensor unit 192, which is in communication with all controllable components including a braking system, sheeting assemblies, and sensor unit and is more fully described herein.

It should be recognized that the relative sizes of the system components are generally sized based on generated power, environmental, design, and aesthetic requirements as the figure is not meant to indicate actual relative sizes or dimensions of the individual components.

Tower Embodiment

Figure 2:
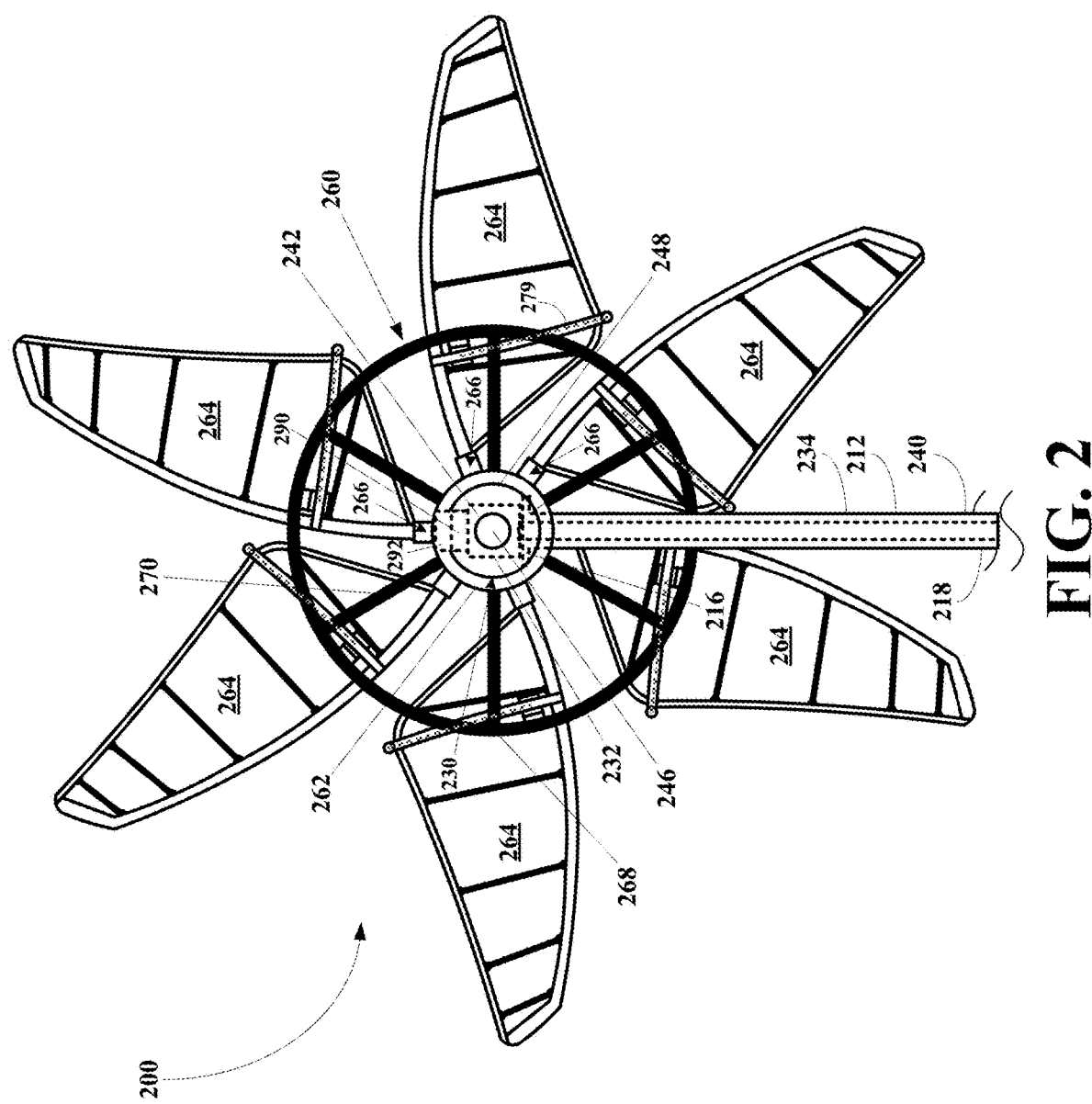
FIG. 2 depicts another tower DWHAT embodiment of another apparatus of this disclosure showing the upper portion of the tower assembly, the sail support assembly, and the sails (six sails here).

Referring now to FIG. 2, another DWHAT tower type apparatus of this disclosure, generally 200, is shown. Only a top portion of the apparatus 200 is shown in FIG. 2 assuming that all other components are the same or similar. The apparatus 200 includes a tower assembly 210 having a vertical cylindrical member 212 (only the top portion shown). The vertical cylindrical member 212 includes a top support member 216 and an interior 218.

The apparatus 200 also includes a drive assembly 230 including a gear box 232 mounted on the top support member 216. The drive assembly 230 also includes a vertical drive shaft 234 having a proximal end (not labeled) attached to the gear box 232 and a distal end (not shown). The vertical drive shaft 234 is disposed in the interior 218 of the cylindrical member 212 and rotationally centered in the interior 218 in the cylindrical member 212 via bearings 240. The drive assembly 230 also includes a horizontal drive shaft 242 having a proximal end 244 (not shown) and a distal end 246 (not labeled) including a counterbalance weight member 248 and passing through the gear box 232. The gear box 232 includes gears (shown in other figures herein) that convert horizontal rotary motion of the horizontal drive shaft 242 into vertical rotary motion of the vertical drive shaft 234. The gear box 232 may also include a horizontal shaft braking unit as described below.

The apparatus 200 also includes a sail support assembly 260 including a sail hub 262. The sail hub 262 includes a plurality of sails 264 (here the plurality of three but may be as high as twelve or more depending on environmental, design, and aesthetic requirements) and an equal plurality of sail hub swivel connectors 266 (one for each sail 264) and a sail support ring 268. The sail support ring 268 includes a plurality of radial support members 270 radiating outward from the hub 262 and integral with the ring 268. The sail support ring 268 also includes a plurality of sail support assemblies 274 (one for each sail 264), which support the sails 264 and permit the sails 264 to swivel about the hub swivel connections 266 during sheeting operations. Each of the sail support assemblies 274 (not labeled) includes a boom support member 276 (not labeled) and a sheeting drive assembly 278 (not labeled) having rigging members 279, which are attached to the sails 264. The sheeting drive assemblies 278 and the rigging members 279 allow the sheeting of the sails 264 to be adjusted for maintenance, for slowing or increasing a horizontal rotation rate of the horizontal drive shaft 242, for optimizing the horizontal rotation rate of the horizontal drive shaft 242, or for stopping the horizontal rotation rate of the horizontal drive shaft 242. It is clear that the support right 268 is situated behind the tower assembly 210 making it clear that the wind direction is into the papers.

The apparatus 200 also includes a control unit 290 including a sensor unit 292, the control assembly which is in communication with all controllable components including a braking system, sheeting assembly, and sensor unit and is more fully described herein.

The apparatus 200 also includes the remaining components of the apparatus of FIG. 1. It should also be recognized that the relative sizes of the system components are generally sized based on generated power, environmental, design, and aesthetic requirements as the figure is not meant to indicate actual relative sizes or dimensions of the individual components.

Derrick Embodiment

Figure 3:
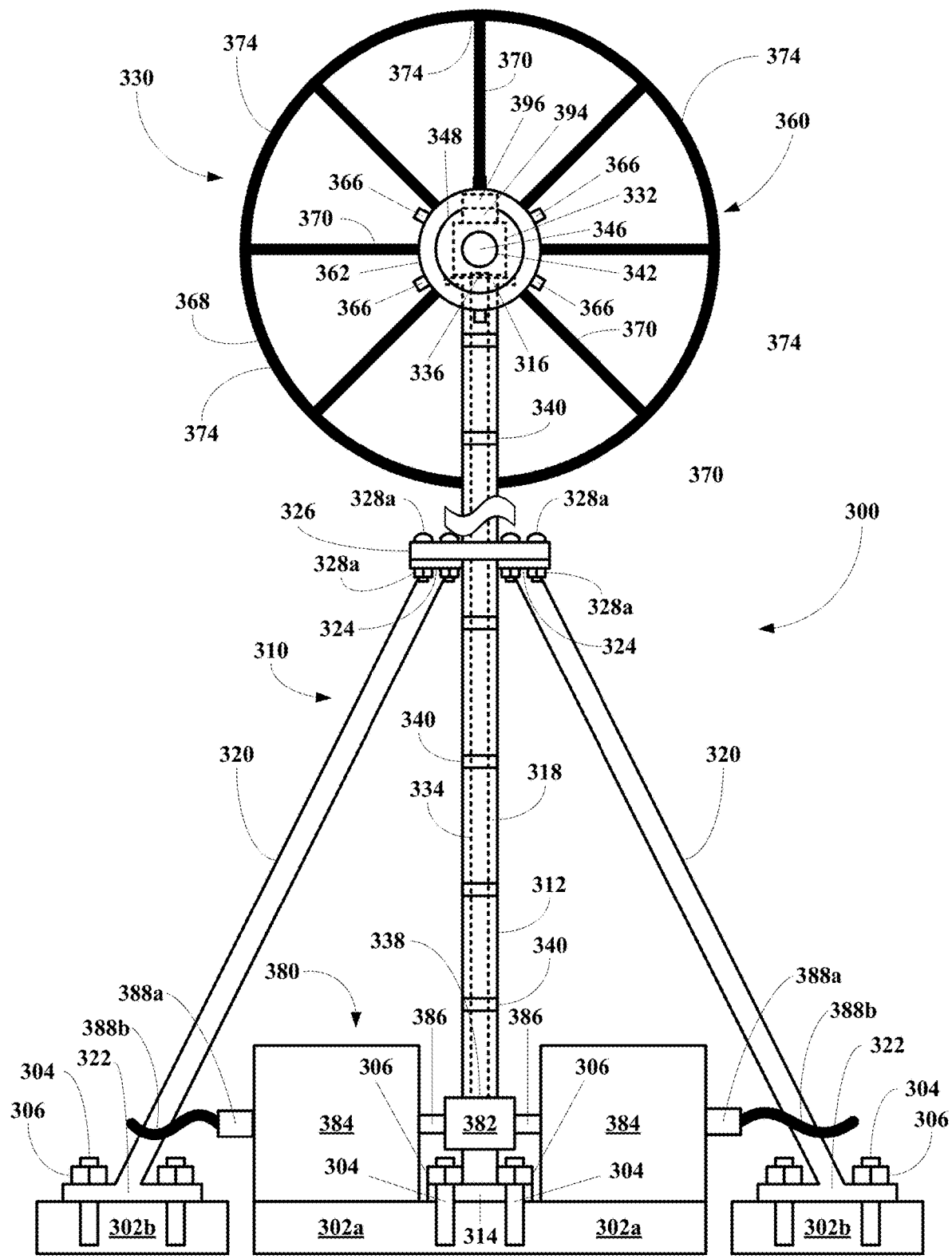
FIG. 3 depicts a derrick DWHAT embodiment of an apparatus of this disclosure including a base assembly, a derrick assembly, sail support assembly, and a generator assembly.

Referring now to FIG. 3, a DWHAT derrick type apparatus of this disclosure, generally 300, is shown. The derrick apparatus 300 is shown without the sails. The derrick apparatus 300 includes a base structure 302 including a derrick/generator base 302a situated on the ground and including bolts 304 and nuts 306 and derrick leg bases 302b situated on the ground and also including bolts 304 and nuts 306.

The apparatus 300 also includes a derrick assembly 310 including a vertical cylindrical member 312 having a bottom member 314 mounted to the derrick/generator base 302a by the bolts 304 and the nuts 306, a top support member 316, and an interior 318. The derrick assembly 310 also includes a plurality of derrick legs 320 anchored at their distal ends 322 to the derrick leg bases 302b via the bolts 304 and the nuts 306 and connected at their proximate ends 324 to a leg connection member 326 via bolts 328a and nuts 328b, wherein the leg connection member 326 is part of the cylindrical member 312.

The apparatus 300 also includes a drive assembly 330 including a gear box 332 mounted on the top support member 316. The drive assembly 330 also includes a vertical drive shaft 334 having a proximal end 336 attached to the gear box 332 and a distal end 338. The vertical drive shaft 334 is disposed in the interior 318 of the cylindrical member 312 and rotationally centered in the interior 318 of the cylindrical member 312 via bearings 340. The drive assembly 330 also includes a horizontal drive shaft 342 having a proximal end 344 (not shown) and a distal end 346 including a counterbalance weight member 348. The gear box 332 includes gears (shown in other figures herein) that convert horizontal rotary motion of the horizontal drive shaft 342 into vertical rotary motion of the vertical drive shaft 334. The gear box 332 may also include a horizontal shaft braking unit as described below.

The apparatus 300 also includes a sail assembly 360 including a sail hub 362. The sail hub 362 includes a plurality of sail hub swivel connectors 366 (one for each sail) and a sail support ring 368. The sail support ring 368 includes a plurality of radial support members 370 radiating outward from the hub 362 and integral with the ring 368. The sail support ring 368 also includes a plurality of sail support assemblies 374 (one for each sail 364), which support the sails 364 and permit the sails 364 to swivel about the hub swivel connections 366 during sheeting operations. It is clear that the support right 368 is situated behind the tower assembly 310 making it clear that the wind direction is into the papers.

The apparatus 300 also includes a generator assembly 380 including a generator gear box 382, generators 384 having generator drive shafts 386, power outlet terminals 388a, and power outlet cables 388b. It should be recognized that the relative sized of the sail hub 362 and the counterbalance weight member 348 may be sized on environmental, design, and aesthetic requirements as the figure is not meant to indicate actual relative sizes of the sail hub 362 and the counterbalance weight member 348 or any of the other components.

The apparatus 300 also includes a control unit 394 including a sensor unit 396, which is in communication with all controllable components including a braking system, sheeting assemblies, and sensor unit and is more fully described herein.

The apparatus 300 also includes the remaining components of the apparatuses of FIG. 1. It should also be recognized that the relative sizes of the system components are generally sized based on generated power, environmental, design, and aesthetic requirements as the figure is not meant to indicate actual relative sizes or dimensions of the individual components.

Derrick Embodiment

Figure 4:
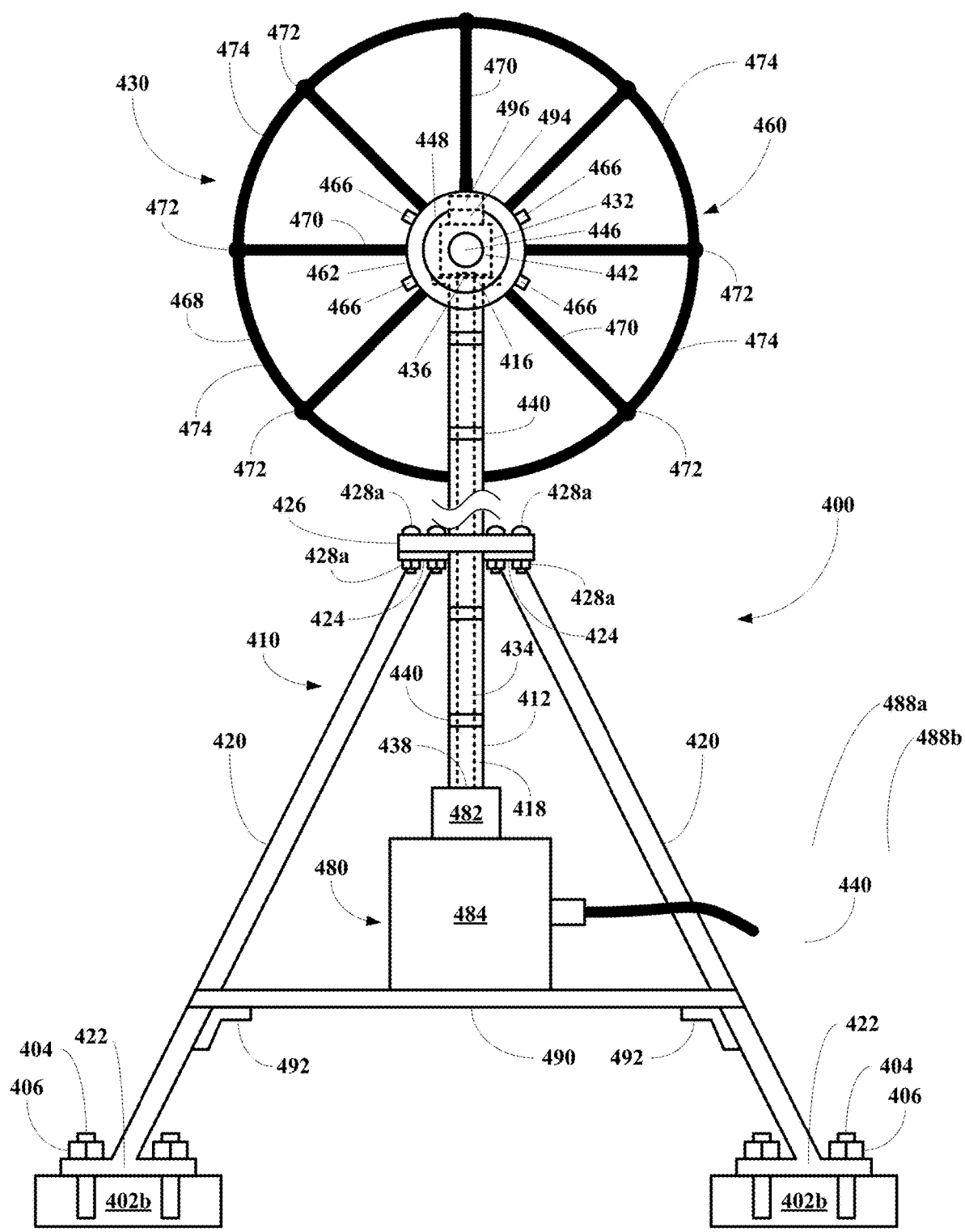
FIG. 4 depicts another derrick DWHAT embodiment of an apparatus of this disclosure including a base assembly, a derrick assembly, sail support assembly, and a generator assembly.

Referring now to FIG. 4, another DWHAT derrick type apparatus of this disclosure, generally 400, is shown. The derrick apparatus 400 is shown without the sails. The derrick apparatus 400 includes a derrick/generator base 402a situated on the ground and including bolts 404 and nuts 406 and derrick leg bases 402b situated on the ground and also including bolts 404 and nuts 406.

The apparatus 400 also includes a derrick assembly 410 including a cylindrical member 412 having a bottom member 414, a top support member 416, and an interior 418. The derrick assembly 410 also includes a plurality of derrick legs 420 anchored at their distal ends 422 to the derrick leg bases 402b via the bolts 404 and the nuts 406 and connected at their proximate ends 424 to a leg connection member 426 via bolts 428a and nuts 428b, wherein the leg connection member 426 is part of the cylindrical member 412.

The apparatus 400 also includes a drive assembly 430 including a gear box 432 mounted on the top support member 416. The drive assembly 430 also includes a vertical drive shaft 434 having a proximal end 436 attached to the gear box 432 and a distal end 438. The vertical drive shaft 434 is disposed in the interior 418 of the cylindrical member 412 and rotationally centered in the interior 418 of the cylindrical member 412 via bearings 440. The drive assembly 430 also includes a horizontal drive shaft 442 having a proximal end 444 (not shown) and a distal end 446 including a counterbalance weight member 448. The gear box 432 includes gears (shown in other figures herein) that convert horizontal rotary motion of the horizontal drive shaft 442 into vertical rotary motion of the vertical drive shaft 434. The gear box 432 may also include a horizontal shaft braking unit as described below.

The apparatus 400 also includes a sail support assembly 460 including a sail hub 462. The sail hub 462 includes a plurality of sail hub swivel connectors 466 (one for each sail 464) and a sail support ring 468. The sail support ring 468 includes a plurality of radial support members 470 radiating outward from the hub 462 and connected to the ring 468 via a plurality of ring connectors 472. It is clear that the support right 468 is situated behind the tower assembly 410 making it clear that the wind direction is into the papers.

The apparatus 400 also includes a generator assembly 480 including a generator gear box 482, generators 484 having generator drive shafts 486, power outlet terminals 488a, and power outlet cables 488b. The generator assembly 480 also includes a derrick support platform 490 attached to the legs 420 via support bracket member 492.

The apparatus 400 also includes a control unit 494 including a sensor unit 496, which is in communication with all controllable components including a braking system, sheeting assemblies, and sensor unit and is more fully described herein.

The apparatus 300 also includes the remaining components of the apparatuses of FIG. 1. It should also be recognized that the relative sizes of the system components are generally sized based on generated power, environmental, design, and aesthetic requirements as the figure is not meant to indicate actual relative sizes or dimensions of the individual components.

Indirect Drive Embodiments

Referring now to FIG. 5A, a specific embodiment of a tower type apparatus of this disclosure, generally 500, is shown to include a tower assembly 510 (only the top portion is shown). The tower assembly 510 includes an outer cylindrical member 512*a* and an inner cylindrical member 512*b*. The outer cylindrical member 512*a* includes a top support member 516 and an interior 518, and the inner cylindrical member 512*b* includes an interior 520.

The apparatus 500 also includes an indirect drive assembly 530 mounted on the top support member 516. The indirect drive assembly 530 includes a gear box 532, a vertical drive shaft 534 having a proximal end (not shown) and a distal end 538. The vertical drive shaft 534 is rotationally centered within the interior 520 of the inner cylindrical member 512*b* via bearings 540. The indirect drive assembly 530 also includes a horizontal drive shaft 542 passing through the gear box 532. The horizontal drive shaft 542 includes a proximal end (not shown) and a distal end 546 including a counterbalance weight member 548 attached thereto or integral therewith.

The gear box 532 includes a first gear box 550*a* having a first transfer drive shaft 552*a*, a second gear box 550*b* having a second transfer drive shaft 552*b*, and a braking unit 554. The first gear box 550*a* engages the horizontal drive shaft 542 converting a horizontal rotation rate of the horizontal drive shaft 542 into a higher horizontal rotation rate of the first transfer drive shaft 552*a*. Generally, the first gear box 550*a* has a gear ratio of between 3:1 and 8:1, between 4:1 to 6:1, or 5:1. The second gear box 550*b* engages the first transfer drive shaft 552*a* converting the horizontal rotation rate of the first transfer drive shaft 552*a* into a vertical rotation rate of the second transfer drive shaft 552*b*, wherein the rotation rate of the first transfer drive shaft 552*a* and a rotation rate of the second transfer drive shaft 552*b* may be the same or different, but generally the same. The indirect drive assembly 530 also includes a universal (U) joint member 556 coupling the second transfer drive shaft 556 to the vertical drive shaft 534.

The braking unit 554 engages the horizontal drive shaft 542 to stop or slow down a rotation of the horizontal drive shaft 542 in response to a stop or slow down command described below in conjunction with an apparatus control unit 590.

The indirect drive assembly 530 convert horizontal rotary motion of the horizontal drive shaft 542 into vertical rotary motion of the vertical drive shaft 534, while changing the rotation rate of the horizontal drive shaft 542 relative to the vertical drive shaft 534.

The apparatus 500 also includes a sail support assembly 560 including a sail hub 562. The sail hub 562 includes a plurality of sail hub swivel connectors 566 (one for each sail 564) and a sail support ring 568 (not shown). The sail support ring 568 includes a plurality of radial support members 570 radiating outward from the hub 562 and connected to the ring 568.

The apparatus 500 also includes a control unit 590 including a sensor unit 592, which is in communication with all controllable components including a braking system, sheeting assemblies, and sensor unit and is more fully described herein. The control unit include a supply power cable 594, power supply component cables 596, and bilateral communication pathways 598.

The apparatus 500 also includes the remaining components of the apparatuses of FIGS. 1-4. It should also be recognized that the relative sizes of the system components are generally sized based on generated power, environmental, design, and aesthetic requirements as the figure is not meant to indicate actual relative sizes or dimensions of the individual components. The Wind Direction is shown by the arrow proceeding from the counterbalance weight 548 to the hub assembly 560.

Referring now to FIGS. 5B&C, the apparatus 500 is shown here to include a fixed bladed fan 549 instead of the counterbalance 348 or 448. The fan 549 includes blades 549*a*, spokes 549*b*, an outer diameter 549*c*, an inner diameter 549*d*, a fan hub 549*e*, and a fan attachment nut 549*f*. The fan 549 is sized like the counterbalance 348 and 448 to that of the sail hub 362/462 and is designed to supply additional torque to the horizontal shaft 542 via the wind impinging on the central region of the apparatus 500 that does not impinge on the sails 164 or 264. The radius of the fan 549 and the boom ring 368 or 468 are set forth above.

Referring now to FIG. 5D, a specific embodiment of the indirect drive assembly 530 of FIG. 5D is shown to include the vertical drive shaft 534, the horizontal drive shaft 542 having a counterbalance section 542*a* and a sail hub section 542*b*, the first transfer drive shaft 552*a*, the second gear box 550*b*, and the second drive shaft 552*b*. The gear box 550*a* includes a first gear 553*a*, a second gear 553*b*, and a drive belt 553*c*. The drive belt 553*c* is similar to the drive belts used in vehicles. The first gear 553*a* and the second gear 553*b* have a gear ratio of 5 to 1 meaning that for each rotation of the first gear 553*a*, the second gear 553*b* rotates five times faster. The braking unit 554 include a control unit 554*a*, calipers 554*b* and a brake disc 554*c* mounted on the horizontal drive shaft 542. Wind Direction is shown with a large arrow.

The apparatus 500 also includes a control unit 590 including a sensor unit 592, which is in communication with all controllable components including a braking system, sheeting assemblies, and sensor unit and is more fully described herein. The control unit include a supply power cable 594, power supply component cables 596, and bilateral communication pathways 598.

The apparatus 500 also includes the remaining components of the apparatuses of FIGS. 1-4. It should also be recognized that the relative sizes of the system components are generally sized based on generated power, environmental, design, and aesthetic requirements as the figure is not meant to indicate actual relative sizes or dimensions of the individual components.

Referring now to FIG. 5E, another specific embodiment of the indirect drive assembly 530 of FIG. 5E is shown to include the vertical drive shaft 534, the horizontal drive shaft 542 having a counterbalance section 542*a* and a sail hub section 542*b*, the first transfer drive shaft 552*a*, the second gear box 550*b*, and the second drive shaft 552*b*. The gear box 550*a* includes a first toothed gear 553*d* having teeth 553*e*, a second toothed gear 553*f* having teeth 553*g*, and a drive chain 553h having a chain 553i and links 553j. As in FIG. 5D, the first toothed gear 553d and the second toothed gear 553f have a gear ratio of 5 to 1 meaning that for each rotation of the first toothed gear 553d, the second toothed gear 553f rotates five times faster. The braking unit 554 include a control unit 554a, calipers 554b and a brake disc 554c mounted on the horizontal drive shaft 540.

The apparatus 500 also includes a control unit 590 including a sensor unit 592, which is in communication with all controllable components including a braking system, sheeting assemblies, and sensor unit and is more fully described herein. The control unit include a supply power cable 594, power supply component cables 596, and bilateral communication pathways 598. Wind Direction is shown with a large arrow.

The apparatus 500 also includes the remaining components of the apparatuses of FIGS. 1-4. It should also be recognized that the relative sizes of the system components are generally sized based on generated power, environmental, design, and aesthetic requirements as the figure is not meant to indicate actual relative sizes or dimensions of the individual components.

Second Gear Box Embodiments

Referring now to FIG. 5F, a specific embodiment of the second gear box 550b of FIGS. 5C-5E is shown to include a housing 551a, a horizontal gear 551b attached to the first transfer drive shaft 552a and a vertical gear 551c attached to the second transfer drive shaft 552b, wherein the gears 551b and 551c may be the same or different gear ratio, but generally the same gear ratio. The gear box 550b is sometimes call a 90 degree gear box as it converts horizontal rotation into vertical rotation.

The apparatus 500 also includes a control unit 590 including a sensor unit 592, which is in communication with all controllable components including a braking system, sheeting assemblies, and sensor unit and is more fully described herein. The control unit include a supply power cable 594, power supply component cables 596, and bilateral communication pathways 598.

The apparatus 500 also includes the remaining components of the apparatuses of FIGS. 1-4. It should also be recognized that the relative sizes of the system components are generally sized based on generated power, environmental, design, and aesthetic requirements as the figure is not meant to indicate actual relative sizes or dimensions of the individual components.

Direct Drive Embodiments

Referring now to FIG. 6A, a specific embodiment of a tower type apparatus of this disclosure, generally 600, is shown to include a tower assembly 610. The tower assembly 610 includes an outer cylindrical member 612a and an inner cylindrical member 612b (only the top portion shown). The outer cylindrical member 612a includes a top support member 616 and an interior 618, and the inner cylindrical member 612b includes an interior 620. The apparatus 600 also includes a direct drive assembly 630 mounted on the top support member 616. The indirect drive assembly 630 includes a housing 632, a vertical drive shaft 634 rotationally centered within the interior 620 of the inner cylindrical member 612b via bearings 636 and having a proximal end 638 and a distal end (not shown), and a horizontal drive shaft 640 passing through the housing 632. The horizontal drive shaft 640 includes a proximal end 642 having a hub mount fitting 644 and a distal end 646 including a counterbalance weight member 648. The housing 632 includes a first gear member 650a, a second gear member 650b having a transfer drive shaft 652, and a braking unit 654. The first gear member 650a is attached to the horizontal drive shaft 640. The second gear member 650b is attached to the second transfer drive shaft 652. The direct drive assembly 630 also includes a universal (U) joint 656 coupling the transfer drive shaft 652 to the vertical drive shaft 634. The braking unit 654 engages the horizontal drive shaft 640 to stop a rotation of the horizontal drive shaft 640 in response to a stop command described below in conjunction with an apparatus control unit. The direct drive assembly 630 convert horizontal rotary motion of the horizontal drive shaft 640 into vertical rotary motion of the vertical drive shaft 634, while changing the rotation rate of the vertical drive shaft 634 relative to the horizontal drive shaft 640. In certain embodiments, the gear ratio of the first gear member 650a to the second gear member 650b is 5 to 1 meaning that for each rotation of the first gear member 650a, the second gear member rotates five times faster.

The apparatus 600 also includes a sail support assembly 660 including a sail hub 662. The sail hub 662 includes a plurality of sail hub swivel connectors 666 (one for each sail 664) and a sail support ring 668 (not shown). The sail support ring 668 includes a plurality of radial support members 670 radiating outward from the hub 662 and connected to the ring 668.

The apparatus 600 also includes a control unit 690 including a sensor unit 692, which is in communication with all controllable components including a braking system, sheeting assemblies, and sensor unit and is more fully described herein. The control unit include a supply power cable 594, power supply component cables 696, and bilateral communication pathways 698.

The apparatus 600 also includes the remaining components of the apparatuses of FIGS. 1-4. It should also be recognized that the relative sizes of the system components are generally sized based on generated power, environmental, design, and aesthetic requirements as the figure is not meant to indicate actual relative sizes or dimensions of the individual components. The Wind Direction is shown by the arrow proceeding from the counterbalance weight 648 to the hub assembly 660.

Referring now to FIGS. 6B&C, the apparatus 600 is shown here to include a fixed bladed fan 649 having blades 649a instead of the counterbalance 348 or 448. The fan 649 includes blades 649a, spokes 649b, an outer diameter 649c, an inner diameter 649d, a fan hub 649e, and a fan attachment nut 649f. The fan 649 is sized like the counterbalance 348 and 448 to that of the sail hub 362/462 and is designed to supply additional torque to the horizontal shaft 642 via the wind impinging on the central region of the apparatus 600 that does not impinge on the sails 164 or 264. The radius of the fan 649 and the boom ring 368 or 468 are set forth above.

Referring now to FIG. 6D, a specific embodiment of the direct drive assembly 630 of FIG. 6D is shown to include the vertical drive shaft 634, the horizontal drive shaft 642 having a counterbalance section 642a and a sail hub section 642b, and the drive shaft 652. The first gear member 650a comprises a first gear 651a. The second gear member 650b comprises a second gear 651b. The first gear 651a and the second gear 651b have a gear ratio of 5 to 1 meaning that for each rotation of the first gear 651a, the second gear 651b rotates five times faster. The braking unit 654 include a control unit 654a, calipers 654b and a brake disc 654c mounted on the horizontal drive shaft 640. Wind Direction is shown with a large arrow.

The apparatus 600 also includes a control unit 690 including a sensor unit 692, which is in communication with all controllable components including a braking system, sheeting assemblies, and sensor unit and is more fully described herein. The control unit include a supply power cable 594, power supply component cables 696, and bilateral communication pathways 698.

The apparatus 600 also includes the remaining components of the apparatuses of FIGS. 1-4. It should also be recognized that the relative sizes of the system components are generally sized based on generated power, environmental, design, and aesthetic requirements as the figure is not meant to indicate actual relative sizes or dimensions of the individual components.

Vertical Member Shape Embodiments

Referring now to FIGS. 7A-K, a number of tower vertical member designs are shown. Looking at FIG. 7A, the tower vertical member 700 has a circular cross-section. Looking at FIG. 7B, the tower vertical member 705 has an elliptical cross-section. Looking at FIG. 7C, the tower vertical member 710 has a rectangular cross-section. Looking at FIG. 7D, the tower vertical member 720 has an eye shaped cross-section including two convex curved surfaces 722 and two pointed ends 724. Looking at FIG. 7E, the tower vertical member 730 has a football shaped cross-section having two convex curved surfaces 732 and two rounded ends 734. Looking at FIG. 7F, the tower vertical member 740 has a modified eye shaped cross-section having two convex curved surface portions 742, two straight surface portions 744, and two pointed ends 746. Looking at FIG. 7G, the tower vertical member 750 has another modified eye shaped cross-section having two convex curved surface portions 752, two straight surface portions 754, and two rounded ends 756. Looking at FIG. 7H, the tower vertical member 760 has another modified eye shaped cross-section having two convex curved surface portions 762, two concaved curved surface portions 764, and two pointed ends 756. Looking at FIG. 7I, the tower vertical member 770 has another modified eye shaped cross-section having two convex curved surface portions 762, two concaved curved surface portions 764, and two rounded ends 776. Looking at FIG. 7J, the tower vertical member 780 has a isosceles triangular cross-section having two long side surfaces 782 and a short side surface 784. Looking at FIG. 7K, the tower vertical member 790 has a tear drop cross-section having a circular surface portion 792, two arcuate surface portions 794, two concave curved surface portions 796 and pointed end 798.

Yaw Apparatus Embodiments

Bottom Yaw Apparatus Embodiment

FIGS. 8A&B depict an embodiment of yaw assembly for the DWHAT apparatus of this disclosure, generally 800, is shown. The DWHAT apparatus 800 includes a slab 802 anchored in the ground, a base 804 attached to the slab 802 via bolts 806 and nuts 808. The DWHAT apparatus 808 includes a tower assembly 810, a yaw assembly 840, and a generator assembly 880.

The tower assembly 810 includes a vertical tower member 812 having a vertical drive shaft 814 centered via bearing 816 in an interior 818 of the member 812.

The yaw assembly 840 includes a housing 842, a main yaw gear 844, a main gear mount 846, a main gear rotary member 848, a plurality of yaw drive assemblies 850, each of the drive assemblies 850 includes a control unit 852, a motor 854, a drive shaft 856, and a drive gear 858 adapted to engage the main gear 844 to rotate the tower assembly 810 and the generator assembly 880 to adjust the tower assembly 810 to a wind direction.

The generator assembly 880 includes a generator 882, a generator gear box 884, a power cable outlet fitting 886 and an output power cable 888, which attaches to a grid or substation.

Figure 8B:
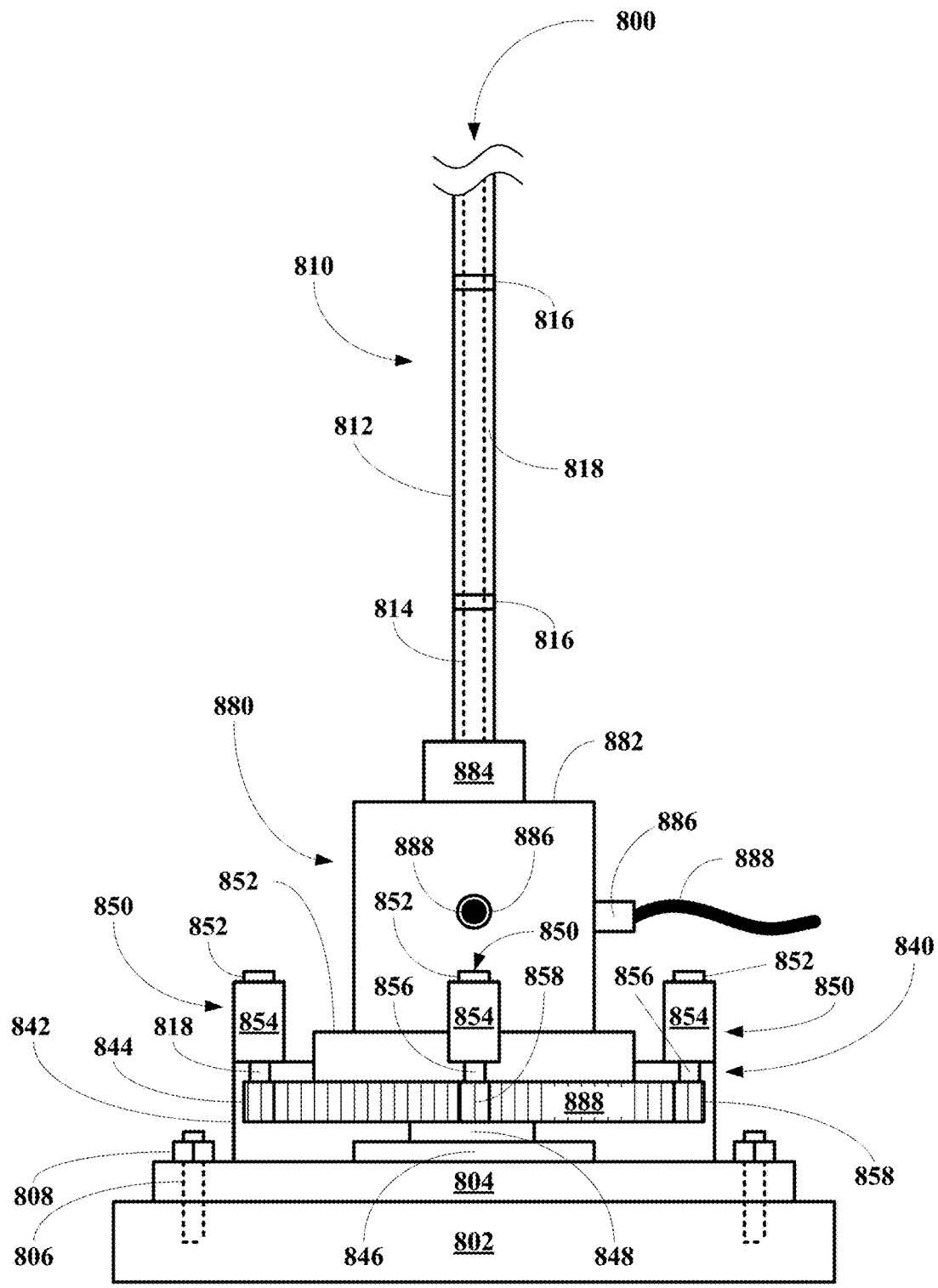

Looking at FIG. 8A and FIG. 8B, the tower assembly 810 and the generator assembly 880 have been rotated by 90 degrees evidencing a 90 degree shift in the wind direction. Of course, it should be recognized that the degree of rotation may be any degrees from 0 degrees to 360 degrees (beginning it back to 0 degrees).

Top Yaw Apparatus Embodiment

Referring now to FIG. 9, an embodiment of DWHAT apparatus of this disclosure, generally 900, is shown to include a tower assembly 910, a yaw assembly 930 rotationally mounted on the tower assembly 910, and a drive assembly 960. Wind Direction is shown with a large arrow.

The tower assembly 910 includes a tower member 912, a top member 916, and an interior 918.

The yaw assembly 920 includes a hat assembly 922 rotationally mounted on the tower member 912 by a top bearing 924 situated on the top tower member 916 and radial bearings 926 distributed along a lower portion 928 of the hat assembly 922. The hat assembly 922 also includes an upper portion 930 and a top member 932. The yaw assembly 920 also includes a yaw gear 934 mounted on, affixed to, or integral with a bottom end 936 of the lower portion 928 of the hat assembly 922. The yaw assembly 920 also includes one or more yaw drive assemblies 938, each yaw drive assembly 938 includes a yaw drive motor 940, a drive shaft 942, and a drive gear 944. Each of the yaw drive motors 940 is mounted to the tower member 912 by brackets 946.

The drive assembly 950 includes a horizontal drive shaft 952, a vertical transfer drive shaft 954, a tower vertical drive shaft 956, and a fluid or manual clutch unit 958. The horizontal drive shaft 952 passes through the upper portion 930 of the hat assembly 922 and is supported by horizontal shaft bearings 960. The drive assembly 950 also includes a vertical gear 962 mounted on the horizontal drive shaft 952 and a brake assembly 964 including a disc 966 mounted on the horizontal drive shaft 952, calipers 968, and a motor and control unit 970. The vertical transfer drive shaft 954 includes a horizontal gear 972 mounted on a distal end 974 of the vertical transfer drive shaft 964 and is rotationally centered in the interior 918 of the tower member 912 by bearings 976. The fluid or manual clutch unit 958 include a control unit 978 and is mounted between a proximal end 980 of the vertical transfer drive shaft 954 and a distal end 982 of the vertical tower drive shaft 956. The fluid or manual clutch unit 958 is adapted to disengage the vertical transfer drive shaft 964 and the vertical tower drive shaft 956 when the yaw motors engage to rotate the hat assembly 922 to optimize the sails to wind direction and re-engage the vertical transfer drive shaft 954 and the vertical tower drive shaft 956 once the hat assembly 922 is properly oriented.

The fluid or manual clutch 958 may be any clutch assembly known in the art including clutches manufactured by Cook Bonding & Manufacturing Co., Inc., Cleveland, OH; ProTec Friction Group, Mount Kisco, NY; Accurate Specialties, Waukesha, WI; The Rowland Company, Philadelphia, PA; Cleveland Oak, Canton, OH; Northern Friction Technology, Concord, ON; Champion Technologies, Inc., Eugene, OR; PMA Friction Products, Inc., Batavia, IL; Asbury Carbons, Asbury, NJ; Akebono Brake Corporation, Elizabethtown, KY; ALL FRICTIONS CO., LLC, Portland, CT; Alto Products Corp., Atmore, AL; American Friction, Humble, TX; American Metal Fibers, Inc., Lake Bluff, IL; Brake & Equipment Warehouse, Minneapolis, MN; Brake Parts Inc., McHenry, IL; Bremskerl North America Inc., South Elgin, IL; Cardolite Corporation, Newark, NJ; or any other clutch manufacturer.

The DWHAT apparatus 900 also may also include a clutch assembly 980 including a clutch 982 and a clutch control unit 984, under control of the control unit 990. It should be recognized that the clutch assembly 980 is designed to disengage the horizontal drive shaft at the gear box so that the hub assembly is free to rotate without imparting any rotary motion to the gears and the vertical drive shaft. This clutch assembly 980 may be present in any of the DWHAT apparatuses of this disclosure.

The DWHAT apparatus 900 also includes a control unit 990 and a sensor unit 992 mounted on top member 942 of the hat assembly 932. The control unit 990 is provides power to the clutch control unit 990 and is in bilateral communication with the clutch control unit 990 so that the control unit 990 is capable of controlling the operation of the yaw assembly and the clutch during yaw adjustments.

Pitch and Roll Stabilizer Embodiments

Referring now to FIG. 10, an embodiment of DWHAT apparatus of this disclosure including a pitch and roll stabilizer assembly, generally 1000, is shown to include a tower assembly 1000 (only the top portion is shown). The tower assembly 1010 includes an outer cylindrical member 1012a and an inner cylindrical member 1012b. The outer cylindrical member 1012a includes a top support member 1016 and an interior 1018, and the inner cylindrical member 1012b includes an interior 1020. Wind Direction is shown with a large arrow.

The apparatus 1000 also includes a direct drive assembly 1030 mounted on the top support member 1016. The drive assembly 1030 includes a housing 1032, a vertical drive shaft 1034 rotationally centered within the interior 1020 of the inner cylindrical member 1012b via bearings 1036 and having a proximal end 1038 and a distal end (not shown), and a horizontal drive shaft 1040 passing through the housing 1032. The housing 1032 includes a braking unit 1042, a first gear box 1044a, and a second gear box 1044b having a transfer drive shaft 1046. The first gear box 1044a has a gear ratio of 5:1 so that the rotation rate of the vertical drive shaft 1034 is five time that of the rotation rate of the horizontal drive shaft 1040. The second gear box 1044b converts horizontal rotation into vertical rotation, while the transfer drive shaft 1046 is coupled to the vertical drive shaft 1034 via a universal (U) joint member 1048. The braking unit 1042 is adapted to engage the horizontal drive shaft 1040 to stop or reduce a rotation of the horizontal drive shaft 1040 in response to a stop or slow down command from a control unit 1090.

The apparatus 1000 also includes a top pitch and roll stabilizing collar 1060 and a bottom pitch and roll stabilizing collars 1070. The top pitch and roll stabilizing collar 1060 includes a flange 1062 adapted to engage the tower platform 1016, a first straight section 1064a and a first angled section 1064b, and a second straight section 1066a and a second angled section 1066b. Of course, the exact form of the top collar 1060 may be of any other geometrical design such as one that includes no angled sections, just one straight section. The bottom pitch and roll stabilizing collars 1070 includes a flange 1072 adapted to engage the tower platform 1016, a straight section 1074a and an angled section 1074b. Again, the bottom collar 1070 may be of any geometrical design such as one that include no angled sections.

The top and bottom pitch and roll stabilizing collars 1060 and 1070 are mounted on the top platform 1016 via bolts 1076. The top and bottom pitch and roll stabilizing collars 1060 and 1070 are designed to reduce or eliminate pitch and/or roll forces acting on the top portion of the apparatus 1000.

The apparatus 1000 also includes a control unit 1090 including a sensor unit 1092, which is in communication with all controllable components including a braking system, sheeting assemblies, and sensor unit and is more fully described herein. The control unit include a supply power cable 1094, power supply component cables 1096, and bilateral communication pathways 1098.

The apparatus 1000 also includes the remaining components of the apparatuses of FIGS. 1-4. It should also be recognized that the relative sizes of the system components are generally sized based on generated power, environmental, design, and aesthetic requirements as the figure is not meant to indicate actual relative sizes or dimensions of the individual components.

Tower or Derrick Raising and Lower Embodiments

Referring now to FIGS. 11A&B, depict a DWHAT tower apparatus of this disclosure, generally 1100, is shown to include a slab or base member 1102. The DWHAT tower apparatus 1100 also includes a tower assembly 1010 including a vertical member 1012 having an interior 1014. The tower assembly also includes a vertical drive shaft 1016 centered in the interior 1114 via bearings 1018 and having a distal end 1020.

The DWHAT tower apparatus 1100 also includes a generator assembly 1030, the generator assembly 1030 includes a generator 1032, a gear box 1034, a power output fitting 1036, and a power output cable 1038.

The DWHAT tower apparatus 1100 also includes a tower raising and lowering assembly 1060, the tower raising and lowering assembly 1060 a bottom member 1062 attached to the slab 1102 via nuts 1064 and bolts 1066. The tower raising and lowering assembly 1160 also include a top member 1068 and a plurality of raising and lowering units 1070, each of the raising and lowering units 1170 include a raising and lowering control unit 1072, a power input cable 1074 and a bilateral communication pathways 1076. The raising and lowering units 1170 may be hydraulic raising and lowering units, worm drive units, solenoid drive units, or any other type of unit that may raise or lower the tower assembly 1110 and the generator assembly 1130.

The DWHAT tower apparatus 1100 also includes a control unit 1190 associated with the top of the tower assembly 1110 (not shown). The power cable 1174 may be connected to the control unit 1190 or may have its own power supply (not shown) or may be powered by the generator 1132. The bilateral communication pathways 1176 are connected to the control unit 1190 either via wires or via wireless communication protocols.

Figure 11B:
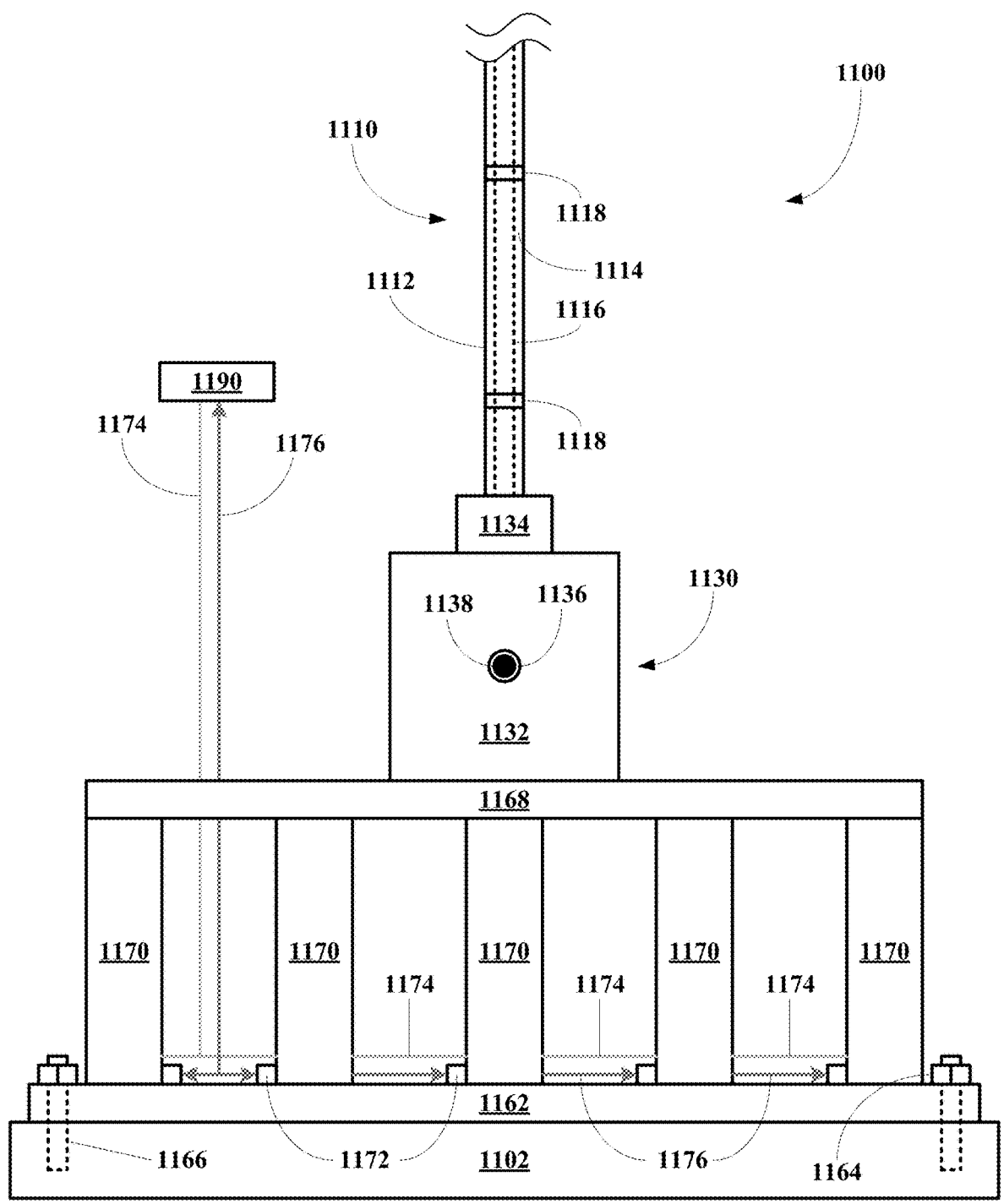

Looking at FIG. 11A, the tower raising and lowering assembly 1160 is shown in is lowered state, while looking at FIG. 11B, the tower raising and lowering assembly 1160 is shown in its raised state.

It should be recognized that the apparatus 1100 may include some or all of the other features associated with FIGS. 1-9.

Tower Pivot Assembly Embodiment

Referring now to FIGS. 12A-C, a DWHAT apparatus of this disclosure, generally 1200, is shown to include a slab or base member 1202. The DWHAT apparatus 1200 also includes a tower assembly 1210 including a vertical member 1212 having an interior 1214. The tower assembly 1210 also includes a vertical drive shaft 1216 centered in the interior 1214 via a bearing 1218 and having a distal end 1220.

The DWHAT apparatus 1200 also includes a generator assembly 1230, the generator assembly 1230 includes a generator 1232, a gear box 1234, a power output fitting 1236, and a power output cable 1238.

The yaw assembly 1240 includes a housing 1242, a main yaw gear 1244, a main gear mount 1246, a main gear rotary member 1248, a plurality of yaw drive assemblies 1250, each of the drive assemblies 1250 includes a motor unit 1252 including a control unit (not shown but integrated into the motor unit), a drive shaft 1254, and a drive gear 1256 adapted to engage the main gear 1244 to rotate the tower assembly 1210 and the generator assembly 1230 to adjust the tower assembly 1210 to a wind direction. The mount 1246 is anchored to the slab 1202 by nuts 1258a and bolts 1258b. The yaw assembly 1240 also includes a mounting member 1260 situated on the main yaw gear 1244.

The DWHAT tower apparatus 1200 also includes a tower pivot assembly 1270 adapted to lower the tower assembly 1210 for maintenance and repair. The pivot assembly 1270 includes a bottom vertical member 1272 mounted on, affixed to or integral with the mounting member 1260, a pivoting joint member 1274 (shown here as a ball joint member) by nuts 1258a and bolts 1285b, and a top vertical member 1276. The bottom vertical member 1272 and the top vertical member 1276 engage the pivoting joint member 1274 so that the tower assembly 1210 may be lowered and raised. The pivot assembly 1270 also includes a compression collar 1278 having a top collar section 1278a and a bottom collar section 1278b, which are held in place by two clamps 1278c.

The pivot assembly 1250 also includes a cradle assembly 1280. The cradle assembly 1280 includes a base member 1282 attached to the mounting member 1260 by nuts 1258a and bolts 1258b. The cradle assembly 1280 also includes a partial cylindrical member 1284 and a brace/stop member 1286. The brace/stop member 1286 is adapted to stop and engage the top vertical member 1276 so that the compression collar 1278 is attached and the tower assembly is upright.

Sail Hub Attachment and Sheeting/Trim Embodiments

Curved Channel Embodiment

Referring now to FIG. 13A, a sail mounting and sheeting apparatus of this disclosure, generally 1300, is shown to include a horizontal drive shaft 1302 having a proximal end 1304 including a hub mount fitting member 1306, a sail support assembly 1340, and a plurality of sails 1310 (only one shown here). Wind Direction is shown with a large arrow.

The sail 1310 include a male quick connector 1312 attached to, affixed to, or integral with a sail mast 1314. The sail 1310 also include a sail 1316, a boom member 1318, a head member 1320, a foot member 1322, a leech member 1324, a plurality of batten members 1326, batten connectors 1328, a sheeting connector 1330 designed to engage rigging members for controlling a sheeting/trim configuration of the sails 1310, and a sail support engagement member 1332. Of course, the mail quick connector 1312 may be a female quick connector.

The sail support assembly 1340 includes a sail hub 1342 mounted on the hub fitting member 1306. The sail hub 1342 includes a plurality of sail hub swivel female quick connectors 1344 (here only one shown) and a sail support ring 1346. Of course, the quick connector may be male as long as the mast quick connector is female. The sail support ring 1346 includes a plurality of radial support members 1348 (only one shown here) radiating outward from the sail hub 1342. The radial support members 1348 may be connected to the support ring 1346 via connectors or may be integral with the support ring 1346. The sail support ring 1346 also includes a plurality of force spreading assemblies 1350 (only one shown here). The force spreading assembly 1350 includes a mount 1352 attached to the horizontal drive shaft 1302, a tension member 1354, a vertical member 1356, and an angled member 1358. The tension member 1354 is attached to, affixed to, or integral with the sail hub 1342 at its proximal end 1354a making an angle α relative to the horizontal drive shaft 1302 and include a distal end attachment member 1354b. The vertical member 1356 is attached to or affixed to (via connections 1352a), or integral with the mount 1354 at its proximal end 1356a and to the distal end attachment member 1354b of the tension member 1354 at its distal end 1356b. The angled member 1358 is attached to, affixed to, or integral with the tension member 1354 at its proximal end 1358a and to the sail support ring 1346 at its distal end 1358b.

The sail support ring 1346 also includes a plurality of sail support assemblies 1360 (only one shown here) adapted to engage the sail support engagement members 1332. The sail support assembly 1360 and the quick connections (1312 and 1344) to the hub 1342 support the sails 1310 and permit the sails 1310 to swivel about the sail hub swivel female quick connector 1344 during sheeting operations. The sail support ring 1346 also includes a sheeting drive assembly 1362. The sheeting drive assembly 1362 includes a sheeting drive mount 1364 and a drive unit 1366 mounted on the mount 1364. The drive unit 1366 also includes sheeting drive motor 1368, a reel 1370, and a sheeting rigging cable 1372 having a distal end 1374 detachably connected to the sheeting connector 1330 of the sail 1310. The motor 1368 reels the rigging cable 1372 in and out to change the sheeting or trim of the sail 1310 to maximize or minimize a rotational force of the sail 1310 due to wind. Here that sail 1310 is shown in its fully sheeted configuration, which slows or stops the rotation of the horizontal drive shaft 1302. It should be recognized that the sheeting drive assembly 1362 may be any mechanical device that is capable of sheeting the sails 1310 such as three or four bar reciprocating drive units, cam drive units, or any other type of mechanism that transitions from a short length position to a long length state—e.g., a sheet in or short length position and a sheet out or long length position.

Referring now to FIG. 13B, an expanded drawing of the portion A of FIG. 13A showing (a) the sail support engagement member 1332 and the support ring sail support assembly 1360, and (b) the drive assembly 1362 includes the sheeting drive mount 1364 and a drive unit 1366 mounted on the mount 1364. The drive unit 1366 also includes sheeting drive motor 1368, a reel 1370, and a sheeting rigging cable 1372 having a distal end 1374 detachably connected to the sheeting connector 1330 of the sail 1310. The reel 1370 includes an inner shaft 1376 rotatable by the motor 1368 via bearing 1378 mounted in the mount 1364. The motor 1368 reels the rigging cable 1372 in and out of the reel 1370 to change the sheeting or trim of the sail 1310 to maximize or minimize a rotational force of the sail 1310 due to wind. The sail support engagement member 1332 including a curved distal end 1380, and the support ring sail support assembly 1360 comprises an elongated concave trench, recess, or channel 1382 and a distal end stop 1384. The curved distal end 1380 of the sail support engagement member 1332 is adapted sit inside the recess 1382 and travel up and down the recess 1382 during sail sheeting/trim operations.

Referring now to FIG. 13C, an expanded cross-sectional drawing of the portion B of FIG. 13B showing the sail support engagement member 1332 and the support ring sail support member 1360 in the fully sheeted configuration—eliminate or minimize horizontal rotation.

Referring now to FIG. 13D, an expanded cross-sectional drawing of the portion B of FIG. 13B showing the sail support engagement member 1332 and the support ring sail support member 1360 as the sail is sheeted to maximize horizontal rotation.

Referring now to FIG. 13E, an expanded drawing of the portion C of FIG. 13B showing the drive assembly 1362 includes the sheeting drive mount 1364 and a drive unit 1366 mounted on the mount 1364. The drive unit 1366 also includes sheeting drive motor 1368, a reel 1370, and a sheeting rigging cable 1372 having a distal end 1374 detachably connected to the sheeting connector 1330 of the sail 1310. The reel 1370 includes an inner shaft 1376 rotatable by the motor 1368 via bearing 1378 mounted in the mount 1364. Wind Direction is shown with a large arrow.

Bearing Embodiment

Referring now to FIG. 13F, a sail mounting and sheeting apparatus of this disclosure, generally 1300, is shown to include a horizontal drive shaft 1302 having a proximal end 1304 including a hub mount fitting member 1306, a sail support assembly 1340, and a plurality of sails 1310 (only one shown here).

The sail 1310 include a male quick connector 1312 attached to, affixed to, or integral with a sail mast 1314. The sail 1310 also include a sail 1316, a boom member 1318, a head member 1320, a foot member 1322, a leech member 1324, a plurality of batten members 1326, batten connectors 1328, a sheeting connector 1330 designed to engage rigging members for controlling a sheeting/trim configuration of the sails 1310. Of course, the mail quick connector 1312 may be a female quick connector.

The sail support assembly 1340 includes a sail hub 1342 mounted on the hub fitting member 1306. The sail hub 1342 includes a plurality of sail hub swivel female quick connectors 1344 (here only one shown) and a sail support ring 1346. Of course, the quick connector may be male as long as the mast quick connector is female. The sail support ring 1346 includes a plurality of radial support members 1348 (only one shown here) radiating outward from the sail hub 1342. The radial support members 1348 may be connected to the support ring 1346 via connectors or may be integral with the support ring 1346. The sail support ring 1346 also includes a plurality of force spreading assemblies 1350 (only one shown here). The force spreading assembly 1350 includes a mount 1352 attached to the horizontal drive shaft 1302, a tension member 1354, a vertical member 1356, and an angled member 1358. The tension member 1354 is attached to, affixed to, or integral with the sail hub 1342 at its proximal end 1354a making an angle α relative to the horizontal drive shaft 1302 and include a distal end attachment member 1354b. The vertical member 1356 is integral with the mount 1354 at its proximal end 1356a and to the distal end attachment member 1354b of the tension member 1354 at its distal end 1356b. The angled member 1358 is attached to, affixed to, or integral with the tension member 1354 at its proximal end 1358a and to the sail support ring 1346 at its distal end 1358b.

The sail support ring 1346 also includes a plurality of sail support assemblies 1360 (only one shown here). The sail support assembly 1360 and the quick connections (1312 and 1344) to the hub 1342 support the sails 1310 and permit the sails 1310 to swivel about the sail hub swivel female quick connector 1344 during sheeting operations. The sail support ring 1346 also includes a sheeting drive assembly 1362. The sheeting drive assembly 1362 includes a sheeting drive mount 1364 and a drive unit 1366 mounted on the mount 1364. The drive unit 1366 also includes sheeting drive motor 1368, a reel 1370, and a sheeting rigging cable 1372 having a distal end 1374 detachably connected to the sheeting connector 1330 of the sail 1310. The motor 1368 reels the rigging cable 1372 in and out to change the sheeting or trim of the sail 1310 to maximize or minimize a rotational force of the sail 1310 due to wind. Here that sail 1310 is shown in its fully sheeted configuration, which slows or stops the rotation of the horizontal drive shaft 1302. It should be recognized that the sheeting drive assembly 1362 may be any mechanical device that is capable of sheeting the sails 1310 such as three or four bar reciprocating drive units, cam drive units, or any other type of mechanism that transitions from a short length position to a long length state—e.g., a sheet in or short length position and a sheet out or long length position. The sail support assembly 1360 including a Referring now to FIG. 13G, an expanded drawing of the portion A of FIG. 13F showing (a) the support ring sail support assembly 1360, and (b) the drive assembly 1362 includes the sheeting drive mount 1364 and a drive unit 1366 mounted on the mount 1364. The drive unit 1366 also includes sheeting drive motor 1368, a reel 1370, and a sheeting rigging cable 1372 having a distal end 1374 detachably connected to the sheeting connector 1330 of the sail 1310. The reel 1370 includes an inner shaft 1376 rotatable by the motor 1368 via bearing 1378 mounted in the mount 1364. The motor 1368 reels the rigging cable 1372 in and out of the reel 1370 to change the sheeting or trim of the sail 1310 to maximize or minimize a rotational force of the sail 1310 due to wind. The support ring sail support assembly 1360 comprise a support member 1386 attached to, affixed to, or integral with (as shown here) the support ring 1346 and a rotary member 1388 attached to, affixed to, or integral with (as shown here) the support member 1386. The rotary member 1388 includes having a bearing 1390 adapted to engage the mast 1314 so that the sails 1310 may rotate at the quick connections (1312 and 1344) and at the rotary member 1388 via the bearing 1390.

Sail Hub Connection Embodiments

Quick Connection Embodiment

Referring now to FIGS. 14A&B, a sail hub and sail rotatable quick connection assembly, generally 1400, is shown. The rotatable quick connection assembly 1400 includes a male quick connector member 1410 having a first straight section 1412, a concave curved section 1414, a second straight 1416, and a tapered end section 1418. The male quick connector member 1410 is affixed to a distal section 1420 of a sail mast 1422.

The rotatable quick connection assembly 1400 also includes a female quick connector member 1430 includes a top straight section 1432, a middle straight section 1434, and a bottom straight section 1436. The female quick connector member 1430 also includes a collar 1438 including a slot 1440 and an aperture 1442. The female quick connector member 1430 also includes two handles 1444 including a head portion 1446 including a convex arcuate engaging surface 1448, an aperture (not shown), and a locking pin member 1450. The convex arcuate engaging surface 1448 is designed to engage the concave curves section 1414 of the male connector 1410 via the slot 1440 as the handles 1444 are rotated downward. The female quick connector member 1430 is affixed to a distal section 1452 of a sail connector 1454 of the sail hub (not shown).

Looking at FIG. 14A, the quick connection assembly 1400 is shown in its unlocked and separated state, while looking at FIG. 14B, the quick connection assembly 1400 is shown in its connected and locked state.

Fixed Rotatable Connection Embodiment

Referring now to FIGS. 15A&B, a sail hub and sail rotatable connection assembly, generally 1500, is shown. The rotatable connection assembly 1500 includes a sail connector 1502 having bolt apertures 1504. The rotatable connection assembly 1500 also includes a rotary member 1506 including a top connector 1508 having bolt apertures 1510 and a bottom connector 1512 having bolt apertures 1514. The rotatable connection assembly 1500 also includes a hub connector 1516 having bolts apertures 1518. The rotatable connection assembly 1500 also includes bolts 1520 and nuts 1522. The bolts 1520 are adapted to be inserted through the top rotary member apertures 1510 and through the sail connector apertures 1504 and secured by nuts 1522. The bolts 1520 are also adapted to be inserted through the bottom rotary member apertures 1514 and through the hub connector apertures 1518 and secured by nuts 1522. The sail connector 1502 is affixed to a distal end 1524 of a sail mast 1526, while the sail hub connector 1516 is attached to a distal end 1528 of a sail hub connector 1530.

Looking at FIG. 15A, the rotatable connection assembly 1500 is shown in its unlocked and separated state, while looking at FIG. 15B, the rotatable connection assembly 1500 is shown in its connected and secured state.

Sail Embodiments

Referring now to FIG. 16A, a sail apparatus of this disclosure, generally 1600 is shown to include a sail mounting quick connector 1602 (see FIGS. 14A&B) attached to a mast member 1604. The sail apparatus also includes a boom member 1606, a head member 1608, a foot member 1610, a leech member 1612, a plurality of batten members 1614, batten connectors 1616, a sheeting connector 1618 designed to engage rigging members for controlling a sheeting/trim configuration of the sail apparatus 1600. The sail apparatus 1600 also includes a sail 1620 including a luff 1622 and a luff area 1624, a leech 1626 and a leech area 1628, and sail areas 1630.

Referring now to FIG. 16B, a sail apparatus of this disclosure, generally 1600 is shown to include a sail mounting connector 1602 designed to detachably engage the hub sail connectors described and shown above. The sail apparatus 1600 also includes a mast member 1604, a boom member 1606, a head member 1608, a foot member 1610, a leech member 1612, a plurality of battens 1614 and batten connectors 1616, and a sheeting connector 1618 designed to engage the rigging members for controlling the sheeting/trim configuration of the sail apparatus 1600. The sail apparatus 1600 also includes a sail 1620 including a luff 1622 and a luff area 1624, a leech 1626 and a leech area 1628, and sail areas 1630. The sail 1620 is made or constructed out of any material sufficient for the generation of electric power and may include a sail pattern or design 1632 such as an artistic rendering, a patriotic rendering, an event specific rendering, a theme-based rendering, an advertisement rendering, or any other type of sail pattern.

Referring now to FIG. 16C, a sail apparatus of this disclosure, generally 1600 is shown to include a sail mounting connector 1602 designed to detachably engage the hub sail connectors described and shown above. The sail apparatus 1600 also includes a mast member 1604, a boom member 1606, a head member 1608, a foot member 1610, a leech member 1612, a plurality of battens 1614 and batten connectors 1616, and a sheeting connector 1618 designed to engage the rigging members for controlling the sheeting/trim configuration of the sail apparatus 1600. The sail apparatus 1600 also includes a sail 1620 including a luff 1622 and a luff area 1624, a leech 1626 and a leech area 1628, and sail areas 1630. The sail 1620 is made or constructed out of any material sufficient for the generation of electric power. The sail areas 1630 may include a sail area patterns 1634, wherein each sail area pattern 1632 may independently comprise an artistic rendering, a patriotic rendering, an event specific rendering, a theme-based rendering, an advertisement rendering, or any other type of sail area pattern.

Referring now to FIG. 17A, a sail apparatus of this disclosure, generally 1700, is shown to include a sail mounting connector 1702 designed to detachably engage the hub sail connectors (see FIGS. 15A&B) and attached to a mast member 1704. The sail apparatus 1700 also includes a boom member 1706, a head member 1708, a foot member 1710, a leech member 1712, a plurality of battens 1714, and a sheeting connector 1716 designed to engage the rigging members for controlling the sheeting/trim configuration of the sail apparatus 1700. In this embodiment, the mast member 1704, the boom member 1706, the head member 1708, the foot member 1710, the leech member 1712, and the battens 1714 form an integral construct. The sail apparatus 1700 also includes a sail 1718 including sail areas 1720.

Referring now to FIG. 17B, a sail apparatus of this disclosure, generally 1700, is shown to include a sail mounting connector 1702 designed to detachably engage the hub sail connectors described and shown above. The sail apparatus 1700 also includes a mast member 1704, a boom member 1706, a head member 1708, a foot member 1710, a leech member 1712, a plurality of battens 1714, and a sheeting connector 1716 designed to engage the rigging members for controlling the sheeting/trim configuration of the sail apparatus 1700. In this embodiment, the mast member 1704, the boom member 1706, the head member 1708, the foot member 1710, the leech member 1712, and the battens 1714 form an integral construct. The sail apparatus 1700 also includes a sail 1718 including sail areas 1720. The sail 1718 is made or constructed out of any material sufficient for the generation of electric power and may include a sail pattern 1722 such as an artistic rendering, a patriotic rendering, an event specific rendering, a theme-based rendering, an advertisement rendering, or any other type of sail pattern.

Referring now to FIG. 17C, a sail apparatus of this disclosure, generally 1700, is shown to include a sail mounting connector 1702 designed to detachably engage the hub sail connectors described and shown above. The sail apparatus 1700 also includes a mast member 1704, a boom member 1706, a head member 1708, a foot member 1710, a leech member 1712, a plurality of battens 1714, and a sheeting connector 1716 designed to engage the rigging members for controlling the sheeting/trim configuration of the sail apparatus 1700. In this embodiment, the mast member 1704, the boom member 1706, the head member 1708, the foot member 1710, the leech member 1712, and the battens 1714 form an integral construct. The sail apparatus 1700 also includes a sail 1718 including sail areas 1720. The sail 1718 is made or constructed out of any material sufficient for the generation of electric power. The sail areas 1720 may include a sail area patterns 1724, wherein each sail area pattern 1724 may independently comprise an artistic rendering, a patriotic rendering, an event specific rendering, a theme-based rendering, an advertisement rendering, or any other type of sail area pattern.

DWHAT Control Embodiments

Single DWHAT Apparatus

Referring now to FIG. 18, a DWHAT control system, generally 1800, for a single DWHAT apparatus of this disclosure is shown. The system control 1800 to include a DWHAT apparatus 1802. The DWHAT apparatus 1802 includes a control unit 1804, a sensor unit 1806, a plurality of sheeting/trim assembly drive units 1808, a brake unit 1810, and a plurality of yaw assembly drive units 1812. The control unit 1804 includes a main power supply cable 1814 (light grey). The control unit 1804 also includes component power supply cables 1816 (light grey), wherein the power supply cables 1816 (light grey) supply power to the sensor unit 1806, the sheeting/trim assembly drive unit 1808, the brake unit 1810, and the yaw assembly drive units 1812. The control unit 1804 also includes component bilateral or bidirectional communication pathways 1818 (dark grey), wherein the communication pathways 1818 provide communication between the control unit 1804 and the sensor unit 1806, the sheeting/trim assembly drive unit 1808, the brake unit 1810, and the yaw assembly drive units 1812 so that the control unit 1804 can receive input data from the sensor unit 1806, the sheeting/trim assembly drive unit 1808, the brake unit 1810, and the yaw assembly drive units 1812 and transmitted command output to the sensor unit 1806, the sheeting/trim assembly drive unit 1808, the brake unit 1810, and the yaw assembly drive units 1812 for accurate and efficient control of the DWHAT apparatus 1802 based on weather properties (temperature, barometric pressure, humidity, etc.), system performance, wind speed and direction, etc. The control unit 1804 will issue command output to the sheeting/trim assembly drive unit 1808, the brake unit 1810, and the yaw assembly drive units 1812 to adjust or control the trim of the sails, to adjust and control the yaw of the apparatus 1802 so that electric power generation may be optimized or maximized based on the weather properties (temperature, barometric pressure, humidity, etc.), system performance, wind speed and direction, etc.

Grid of DWHAT Apparatuses

Referring now to FIG. 19A, a grid control system, generally 1900, for a grid of 18 DWHAT apparatuses of FIG. 18, is shown. The grid control system 1900 includes 18 DWHAT apparatus 1902 of FIG. 18 arranged in a 6×3 grid pattern including six columns and three rows 1904. It should be recognized that the grid pattern may be any grip pattern depending on available land, environmental conditions, etc. including linear patterns (grid patterns with a single row) or any n×m grid, wherein n and m are integers having values between 1 and 20 or more. Additionally, the grid patterns do not have to be linear, but may be curvilinear again depending on terrain, environmental conditions, weather patterns, etc.

The grid control system 1900 includes a central control unit 1910 and three row control units 1912. The central control unit 1910 includes a power supply cable 1914 (light grey line), and each of the row control units 1912 includes a power supply cable 1916 (light grey lines). The central control unit 1910 also includes bilateral communication pathways 1918 between each of the row control units 1912 and between each of the row control units 1912 themselves. Each of the row control units 1912 includes power supply cables 1920 to the DWHAT apparatuses 1902 of their respective row 1904. Each of the row control units 1912 also includes bilateral communication pathways 1922 between each of the DWHAT apparatuses 1902 of their respective row 1904. Of course, each apparatus control unit may be in bilateral communication with each other. Again, the communication pathways may be wireless or wired or any combination thereof. It should also be recognized that each control unit may include batteries and battery backup hardware and software in addition to power supply cables. Of course, each apparatus control unit may be in bilateral communication with each other. Again, the communication pathways may be wireless or wired or any combination thereof.

Referring now to FIG. 19B, a grid control system, generally 1930, for a grid of 9 DWHAT apparatuses of FIG. 18, is shown. The grid control system 1930 includes 9 DWHAT apparatus 1932 of FIG. 18 arranged in a 3×3 grid pattern including six columns and three rows 1934. It should be recognized that the group pattern may be any pattern depending on available land, environmental conditions, etc.

The grid control system 1900 includes a central control unit 1940 and three row control units 1942. The central control unit 1940 includes a main power supply cable 1944 (light grey line), and each of the row control units 1942 includes a power supply cable 1946 (light grey lines). The central control unit 1940 also includes bilateral communication pathways 1948 between each of the row control units 1942 and between each of the row control units 1942 themselves. Each of the row control units 1942 includes bilateral communication pathways 1950 between each of the DWHAT apparatuses 1932 of their respective row 1934. Each of the DWHAT apparatuses 1932 includes a power supply cable 1952. Of course, each apparatus control unit may be in bilateral communication with each other. Again, the communication pathways may be wireless or wired or any combination thereof.

Referring now to FIG. 19C, a grid control system, generally 1960, for a grid of 8 DWHAT apparatuses of FIG. 18, is shown. The grid control system 1960 includes 8 DWHAT apparatus 1962 of FIG. 18 arranged in an elliptical pattern. It should be recognized that the pattern may be any pattern depending on available land, environmental conditions, etc. such as circular, semi-circular, semi-elliptical, closed or opened rectangular, closed or opened square, closed or opened octagonal, or any closed or open curvilinear arrangement, wherein the term closed or opened refers to the communication pathway being in a loop arrangement of a curvilinear arrangement.

The grid control system 1960 includes a central control unit 1970. The central control unit 1970 includes a power supply cable 1972 (light grey line), and each of the DWHAT apparatuses 1962 includes a power supply cable 1974 (light grey lines). The central control unit 1970 also includes a bilateral communication loop 1976 and bilateral communication pathways 1978 from the loop 1976 and the DWHAT apparatuses 1962, which also provided bilateral communication between the DWHAT apparatuses 1962. Again, the communication pathways may be wireless or wired or any combination thereof, if wireless, then the loop 1976 is through the air.

EMBODIMENTS OF THE DISCLOSURE

Embodiment 1. A DWHAT apparatus comprising:
a base assembly comprising:
  one or more base structures or slabs;
a tower assembly comprising:
  a vertical assembly including:
    a single vertical member, or
    an inner vertical member and an outer vertical member,
  a top platform member, and
  a bottom mounting member mounted to one of the base structures or slabs;
a drive assembly comprising:
  a gear box,
  a vertical drive shaft, rotationally centered therein by a plurality of bearings within either the single vertical member or the inner vertical member, including:
    a proximal end rotationally coupled to the gear box, and
    a distal end, and
  a horizontal drive shaft, which passes through the gear box, including:
    an upwind end including a counterbalance weight attached thereto, affixed thereto, or integral therewith, and
    a downwind end;
a sail assembly comprising:
  a sail hub assembly including:
    a sail hub, attached to, affixed to, or integral with the downwind end of the horizontal drive shaft, having:
      a plurality of sail connectors,
      a support ring including:
        a plurality of support members extending from the sail hub to the support ring, wherein the support members are attached to, affixed to, or integral with the sail hub and/or the support ring;
  a plurality of sails comprising:
    a mast including:
      a sail connector adapted to rotationally engage one of the hub connectors,
    a boom,
    a leeward member,
    a plurality of sail battens,
    a head member,
    a foot member, and
    a sail;
  a plurality of sail sheeting/trim assembly, each of the sail sheeting/trim assemblies including:
    a sail support member,
    a sail sheeting/trim drive having:
      a motor, and
      a reciprocating unit adapted to sheet its sail in and out;
a generator assembly comprising:
  one or more generators including:
    a power outlet, and
    a power cable for connecting the apparatus to a power grid.

Embodiment 2. The apparatus of Embodiment 1, further comprising:
a pitch and roll stabilizing assembly.

Embodiment 3. The apparatus of Embodiment 1, further comprising:
a yaw assembly.

Embodiment 4. The apparatus of Embodiment 1, further comprising:
a pivotally mount assembly.

Embodiment 5. The apparatus of Embodiment 1, further comprising:
a raising and lowering assembly.

Embodiment 6. The apparatus of Embodiment 1, wherein the reciprocating unit comprises:
a reel, and
a cable,
  wherein the motor turns the reel to wind up or wind out the cable to change the sheeting or trim of its sail.

Embodiment 7. The apparatus of Embodiment 1, wherein the reciprocating unit comprises:
a three-bar reciprocating unit,
wherein the motor causes the three-bar reciprocating unit to change the sheeting or trim of its sail.

Embodiment 8. The apparatus of Embodiment 1, wherein the reciprocating unit comprises:
a four-bar reciprocating unit,
wherein the motor causes the four-bar reciprocating unit to change the sheeting or trim of its sail.

Embodiment 9. The apparatus of Embodiment 1, wherein the reciprocating unit comprises:
a worm drive,
wherein the motor causes the worm drive to change the sheeting or trim of its sail.

Embodiment 10. The apparatus of Embodiment 1, wherein the reciprocating unit comprises:
a cam drive,
wherein the motor causes the cam drive to change the sheeting or trim of its sail.

Embodiment 11. An apparatus comprising:
a base assembly comprising:
  one or more base structures or slabs;
a tower assembly comprising:
  a vertical assembly including:
    a single vertical member, or
    an inner vertical member and an outer vertical member,
  a top platform member, and
  a bottom mounting member mounted to one of the base structures or slabs;

a drive assembly comprising:
a gear box,
a vertical drive shaft, rotationally centered therein by a plurality of bearings within either the single vertical member or the inner vertical member, including:
a proximal end rotationally coupled to the gear box, and
a distal end, and
a horizontal drive shaft, which passes through the gear box, including:
an upwind end including a small upwind fixed blade fan attached thereto, affixed thereto, or integral therewith, and
a downwind end;
a downwind sail assembly comprising:
a sail hub assembly including:
a sail hub, attached to, affixed to, or integral with the downwind end of the horizontal drive shaft, having:
a plurality of sail connectors,
a support ring including:
a plurality of support members extending from the sail hub to the support ring, wherein the support members are attached to, affixed to, or integral with the sail hub and/or the support ring;
a plurality of sails comprising:
a mast including:
a sail connector adapted to rotationally engage one of the hub connectors,
a boom,
a leeward member,
a plurality of sail battens,
a head member,
a foot member, and
a sail;
a plurality of sail sheeting/trim assembly, each of the sail sheeting/trim assemblies including:
a sail support member,
a sail sheeting/trim drive having:
a motor, and
a reciprocating unit adapted to sheet its sail in and out;
a generator assembly comprising:
one or more generators including:
a power outlet, and
a power cable for connecting the apparatus to a power grid.

Embodiment 12. The apparatus of Embodiment 11, further comprising:
a pitch and roll stabilizing assembly.

Embodiment 13. The apparatus of Embodiment 11, further comprising:
a yaw assembly.

Embodiment 14. The apparatus of Embodiment 11, further comprising:
a pivotally mount assembly.

Embodiment 15. The apparatus of Embodiment 11, further comprising:
a raising and lowering assembly.

Embodiment 16. The apparatus of Embodiment 11, wherein the reciprocating unit comprises:
a reel, and
a cable,
wherein the motor turns the reel to wind up or wind out the cable to change the sheeting or trim of its sail.

Embodiment 17. The apparatus of Embodiment 11, wherein the reciprocating unit comprises:
a three-bar reciprocating unit,
wherein the motor causes the three-bar reciprocating unit to change the sheeting or trim of its sail.

Embodiment 18. The apparatus of Embodiment 11, wherein the reciprocating unit comprises:
a four-bar reciprocating unit,
wherein the motor causes the four-bar reciprocating unit to change the sheeting or trim of its sail.

Embodiment 19. The apparatus of Embodiment 11, wherein the reciprocating unit comprises:
a worm drive,
wherein the motor causes the worm drive to change the sheeting or trim of its sail.

Embodiment 20. The apparatus of Embodiment 11, wherein the reciprocating unit comprises:
a cam drive,
wherein the motor causes the cam drive to change the sheeting or trim of its sail.

Embodiment 21. A power generation facility comprising a plurality of apparatuses of Embodiments 1 through 20.

Embodiment 22. The apparatus of Embodiment 11, wherein the plurality of apparatuses of Embodiments 1 through 20 comprising between 5 and 10,000 apparatuses of Embodiments 1 through 20, between 5 and 1,000 apparatuses of Embodiments 1 through 20, between 5 and 500 apparatuses of Embodiments 1 through 20, between 5 and 250 apparatuses of Embodiments 1 through 20, or any subrange of these ranges include endpoints.

Embodiment 23. The apparatus of Embodiment 11, wherein the plurality of apparatuses of Embodiments 1 through 20 are arranged in a circular configuration, an oval configuration, a rectangular configuration, a grid configuration, any other suitable configuration depending on location and terrain.

Embodiment 24. A method comprising:
generating electric power from an apparatus of Embodiments 1 through 23; and
supplying the generated electric power to drive a facility.

Embodiment 25. A method comprising:
generating electric power from an apparatus of Embodiments 1 through 23; and
supplying the generated electric power to grid; and
distributing the generated power to end-users.

CLOSING PARAGRAPH OF THE DISCLOSURE

All references cited herein are incorporated by reference. Although the disclosure has been disclosed with reference to its preferred embodiments, from reading this description those of skill in the art may appreciate changes and modification that may be made which do not depart from the scope and spirit of the disclosure as described above and claimed hereafter.

I claim:
1. An apparatus comprising:
a base assembly comprising:
one or more base structures or slabs;
a tower assembly comprising:
a vertical assembly including:
a single vertical member, or
an inner vertical member and an outer vertical member,
a top platform member, and
a bottom mounting member mounted to one of the base structures or slabs;

a drive assembly comprising:
  a gear box,
  a vertical drive shaft, rotationally centered therein by a plurality of bearings within either the single vertical member or the inner vertical member, including:
    a proximal end rotationally coupled to the gear box, and
    a distal end, and
  a horizontal drive shaft, which passes through the gear box, including:
    an upwind end including a counterbalance weight attached thereto, affixed thereto, or integral therewith, and
    an downwind end;
a downwind sail assembly comprising:
  a sail hub assembly including:
    a sail hub, attached to, affixed to, or integral with the downwind end of the horizontal drive shaft, having:
      a plurality of sail hub connectors,
      a support ring including:
        a plurality of support members extending from the sail hub to the support ring, wherein the support members are attached to, affixed to, or integral with the sail hub and/or the support ring;
a plurality of sails comprising:
  a mast including:
    a sail mast connector adapted to rotationally engage one of the sail hub connectors,
  a boom,
  a leeward member,
  a plurality of sail battens,
  a head member,
  a foot member, and
  a sail;
a plurality of sail sheeting/trim assemblies, each of the sail sheeting/trim assemblies including:
  a sail support member,
  a sail sheeting/trim drive having:
    a motor, and
    a reciprocating unit adapted to sheet one of the plurality of sails in and out;
a generator assembly comprising:
  one or more generators including:
    a power outlet, and
    a power cable for connecting the apparatus to a power grid; and
an apparatus control system comprising:
  an apparatus control unit, and
  a sensor unit,
wherein the apparatus control system is in bilateral communication with the plurality of sail sheeting/trim assemblies and the generator assembly.

2. The apparatus of claim 1, further comprising:
a pitch and roll stabilizing assembly comprising:
  a top collar comprising:
    a flange adapted to engage the tower platform,
  a bottom collar comprising:
    a flange adapted to engage the tower platform, and
    bolts adapted to affix the top and bottom collars to the tower platform.

3. The apparatus of claim 1, further comprising:
a yaw assembly comprising:
  a housing,
  a main yaw gear,
  a main gear mount,
  a main gear rotary member,
  a plurality of yaw drive assemblies, each of the drive assemblies including:
    a motor unit including:
      a control unit in bilateral communication with the apparatus control system,
      a drive shaft, and
      a drive gear adapted to engage the main gear to rotate the tower assembly and the generator assembly to adjust the tower assembly to a wind direction,
  a yaw assembly mounting member situated on the main yaw gear and anchored to the base assembly.

4. The apparatus of claim 1, further comprising:
a pivotally mount assembly comprising:
  a bottom vertical member mounted on, affixed to, or integral with the bottom mounting member,
  a pivoting joint member,
  a top vertical member,
  a compression collar including:
    a top collar section and
    a bottom collar section, and
    clamps to hold the collar sections together,
  a cradle assembly including:
    a base member attached to the base mounting assembly,
    a partial cylindrical member, and
    a brace/stop member, the brace/stop member is adapted to stop and engage the top vertical member to maintain the tower assembly is upright,
  wherein the bottom vertical member and the top vertical member are adapted to engage the pivoting joint member so that the tower assembly may be lowered and raised.

5. The apparatus of claim 1, further comprising:
a raising and lowering assembly comprising:
  a bottom member attached to the base assembly,
  a top member, and
  a plurality of raising and lowering units, each of the raising and lowering units including:
    a raising and lowering control unit in bilateral communication with the apparatus control system, and
    a power input cable.

6. The apparatus of claim 1, wherein the reciprocating unit comprising:
a reel, and
a cable,
wherein the motor turns the reel to wind up or wind out the cable to change a sheeting or trim of the one of the plurality of sails.

7. The apparatus of claim 1, wherein the reciprocating unit comprising:
a three bar reciprocating unit,
wherein the motor cause the three bar reciprocating unit to change a sheeting or trim of the one of the plurality of sails.

8. The apparatus of claim 1, wherein the reciprocating unit comprising:
a four bar reciprocating unit,
wherein the motor cause the four bar reciprocating unit to change a sheeting or trim of the one of the plurality of sails.

9. The apparatus of claim 1, wherein the reciprocating unit comprising:
a worm drive,
wherein the motor cause the worm drive to change a sheeting or trim of the one of the plurality of sails.

10. The apparatus of claim 1, wherein the reciprocating unit comprising:
a cam drive,
wherein the motor cause the cam drive to change a sheeting or trim of the one of the plurality of sails.

11. An apparatus comprising:
a base assembly comprising:
one or more base structures or slabs;
a tower assembly comprising:
a vertical assembly including:
a single vertical member, or
an inner vertical member and an outer vertical member,
a top platform member, and
a bottom mounting member mounted to one of the base structures or slabs;
a drive assembly comprising:
a gear box,
a vertical drive shaft, rotationally centered therein by a plurality of bearings within either the single vertical member or the inner vertical member, including:
a proximal end rotationally coupled to the gear box, and
a distal end, and
a horizontal drive shaft, which passes through the gear box, including:
an upwind end including a small upwind fixed blade fan attached thereto, affixed thereto, or integral therewith, and
an downwind end;
a downwind sail assembly comprising:
a sail hub assembly including:
a sail hub, attached to, affixed to, or integral with the downwind end of the horizontal drive shaft, having:
a plurality of sail hub connectors,
a support ring including:
a plurality of support members extending from the sail hub to the support ring, wherein the support members are attached to, affixed to, or integral with the sail hub and/or the support ring;
a plurality of sails comprising:
a mast including:
a sail mast connector adapted to rotationally engage one of the sail hub connectors,
a boom,
a leeward member,
a plurality of sail battens,
a head member,
a foot member, and
a sail;
a plurality of sail sheeting/trim assembly, each of the sail sheeting/trim assemblies including:
a sail support member,
a sail sheeting/trim drive having:
a motor, and
a reciprocating unit adapted to sheet of the plurality of sails in and out;
a generator assembly comprising:
one or more generators including:
a power outlet, and
a power cable for connecting the apparatus to a power grid; and
an apparatus control system comprising:
an apparatus control unit, and
a sensor unit,
wherein the apparatus control system is in bilateral communication with the plurality of sail sheeting/trim assemblies and the generator assembly.

12. The apparatus of claim 11, further comprising:
a pitch and roll stabilizing assembly comprising:
a top collar comprising:
a flange adapted to engage the tower platform,
a bottom collar comprising:
a flange adapted to engage the tower platform, and
bolts adapted to affix the top and bottom collars to the tower platform.

13. The apparatus of claim 11, further comprising:
a yaw assembly comprising:
a housing,
a main yaw gear,
a main gear mount,
a main gear rotary member,
a plurality of yaw drive assemblies, each of the drive assemblies including:
a motor unit including:
a control unit,
a drive shaft, and
a drive gear adapted to engage the main gear to rotate the tower assembly and the generator assembly to adjust the tower assembly to a wind direction,
a mounting member situated on the main yaw gear and anchored to the base assembly.

14. The apparatus of claim 11, further comprising:
a pivotally mount assembly comprising:
a bottom vertical member mounted on, affixed to, or integral with the bottom mounting member,
a pivoting joint member,
a top vertical member,
a compression collar including:
a top collar section and
a bottom collar section, and
clamps to hold the collar sections together,
a cradle assembly including:
a base member attached to the base mounting assembly,
a partial cylindrical member, and
a brace/stop member, the brace/stop member is adapted to stop and engage the top vertical member to maintain the tower assembly is upright,
wherein the bottom vertical member and the top vertical member are adapted to engage the pivoting joint member so that the tower assembly may be lowered and raised.

15. The apparatus of claim 11, further comprising:
a raising and lowering assembly comprising:
a bottom member attached to the base assembly,
a top member, and
a plurality of raising and lowering units, each of the raising and lowering units including:
a raising and lowering control unit in bilateral communication with the apparatus control system, and
a power input cable.

16. The apparatus of claim 11, wherein the reciprocating unit comprising:
a reel, and
a cable,
wherein the motor turns the reel to wind up or wind out the cable to change a sheeting or trim of one of the plurality of sails.

17. The apparatus of claim 11, wherein the reciprocating unit comprising:

a three bar reciprocating unit,
wherein the motor cause the three bar reciprocating unit to change a sheeting or trim of the one of the plurality of sails.

18. The apparatus of claim 11, wherein the reciprocating unit comprising:
a four bar reciprocating unit,
wherein the motor cause the four bar reciprocating unit to change a sheeting or trim of the one of the plurality of sails.

19. The apparatus of claim 11, wherein the reciprocating unit comprising:
a worm drive,
wherein the motor cause the worm drive to change a sheeting or trim of the one of the plurality of sails.

20. The apparatus of claim 11, wherein the reciprocating unit comprising:
a cam drive,
wherein the motor cause the cam drive to change a sheeting or trim of one of the plurality of sails.

\* \* \* \* \*